United States Patent [19]
Tahara et al.

[11] Patent Number: 5,854,318
[45] Date of Patent: Dec. 29, 1998

[54] CEMENT ADDITIVE, METHOD FOR PRODUCING THE SAME, AND CEMENT COMPOSITION

[75] Inventors: Hideyuki Tahara, Osaka; Hiroshi Ito, Takatsuki; Yasuhiro Mori, Matsuzaka; Makoto Mizushima, Suita, all of Japan

[73] Assignee: Nippon Shokubai Kagaku Kogyo Co, Ltd., Osaka, Japan

[*] Notice: The term of this patent shall not extend beyond the expiration date of Pat. No. 5,476,855.

[21] Appl. No.: 759,435

[22] Filed: Dec. 5, 1996

Related U.S. Application Data

[60] Continuation of Ser. No. 498,704, Jul. 3, 1995, abandoned, which is a division of Ser. No. 668,513, Mar. 25, 1991, Pat. No. 5,476,885.

[30] Foreign Application Priority Data

| Jul. 25, 1989 | [JP] | Japan | 1-190656 |
| Oct. 9, 1989 | [JP] | Japan | 1-262242 |
| Nov. 17, 1989 | [JP] | Japan | 1-297455 |
| Sep. 5, 1998 | [JP] | Japan | 1-228313 |

[51] Int. Cl.$^6$ .............. C08K 3/00; C04B 28/00; C08F 220/00
[52] U.S. Cl. .............. 524/5; 524/3; 524/4; 524/650; 106/713
[58] Field of Search ............ 525/330.1, 328.5, 525/330.3; 524/3, 4, 5; 106/713

[56] References Cited

U.S. PATENT DOCUMENTS

| 3,687,909 | 8/1972 | Vaughn | 525/330.1 |
| 4,120,839 | 10/1978 | Emmons et al. | 525/208 |
| 4,338,239 | 7/1982 | Dammann | 524/549 |
| 4,666,983 | 5/1987 | Tsubakimoto et al. | 525/329.7 |
| 4,727,111 | 2/1988 | Pettit, Jr. et al. | 525/190 |
| 4,743,301 | 5/1988 | Ito et al. | 524/2 |
| 4,758,641 | 7/1988 | Hsu | 526/208 |
| 4,764,554 | 8/1988 | Tonge | 526/318.4 |
| 4,857,580 | 8/1989 | Patzschke et al. | 525/327.3 |
| 4,870,120 | 9/1989 | Tsubakimoto et al. | 524/5 |
| 4,980,088 | 12/1990 | Boeckh et al. | 525/327.6 |
| 5,064,563 | 11/1991 | Yamaguchi et al. | 252/175 |
| 5,104,951 | 4/1992 | Seelmann-Eggbert et al. | 526/318.2 |
| 5,135,677 | 8/1992 | Yamaguchi et al. | 526/318.2 |
| 5,159,041 | 10/1992 | Khoshdel et al. | 526/318.2 |
| 5,183,707 | 2/1993 | Herron et al. | 428/364 |
| 5,298,570 | 3/1994 | Tahara et al. | 525/329.7 |
| 5,476,885 | 12/1995 | Tahara et al. | 524/8 |

FOREIGN PATENT DOCUMENTS

| 0 240 586 | 4/1986 | European Pat. Off. . |
| 0 256 144 | 7/1986 | European Pat. Off. . |
| A 0 291 590 | 11/1988 | European Pat. Off. . |
| 0 377 448 | 7/1990 | European Pat. Off. . |
| 2 377 421 | 8/1978 | France . |
| 2 525 121 | 10/1983 | France . |
| 1 948 755 | 4/1970 | Germany . |

| 54-52196 | 4/1979 | Japan . |
| 54-139929 | 10/1979 | Japan . |
| 60-16851 | 1/1985 | Japan . |
| 60-161365 | 8/1985 | Japan . |
| 61-31497 | 2/1986 | Japan . |
| 61-31498 | 2/1986 | Japan . |
| 62-30648 | 2/1987 | Japan . |
| 62-119147 | 5/1987 | Japan . |
| 62-216950 | 9/1987 | Japan . |
| 62-241855 | 10/1987 | Japan . |
| 62-292664 | 12/1987 | Japan . |
| 63-162562 | 7/1988 | Japan . |
| 63-291840 | 11/1988 | Japan . |
| 63-305199 | 12/1988 | Japan . |
| 63-305200 | 12/1988 | Japan . |

(List continued on next page.)

OTHER PUBLICATIONS

Polymer Preprints, Japan, vol. 38, No. 3 (1989).

*Primary Examiner*—Tae Yoon
*Attorney, Agent, or Firm*—Armstrong, Westerman, Hattori, McLeland & Naughton

[57] ABSTRACT

A cement additive is added to increase flowability of a cement composition and to prevent a slump loss, but those characters are insufficient, or the cement additive becomes ununiform in the cement composition and causes a trouble of the hardening inferiority.

Thus, to solve the subjects, the present invention provides a cement additive composed of a crosslinked polymer in which, between main chains having a water-soluble polymer structure of a molecular weight from 500 to 100,000, a bond having as a structural unit at least one group selected from divalent groups as shown in the following formula (I) is formed.

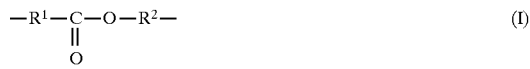

[In the formula (I), $R^1$ and $R^2$ independently denote any one of the following.

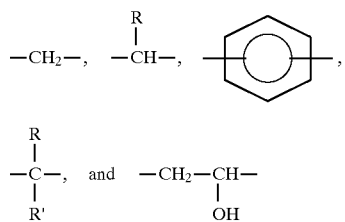

However, $R^1$ may not be required in a case of that $R^2$ is the following.

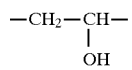

Moreover, R and R' independently denote an alkyl group of carbon number of 1 to 5.]

38 Claims, 2 Drawing Sheets

FOREIGN PATENT DOCUMENTS

| | | |
|---|---|---|
| 1-122947 | 5/1989 | Japan . |
| 1-306411 | 12/1989 | Japan . |
| 2-36210 | 2/1990 | Japan . |
| 1 285 609 | 8/1972 | United Kingdom . |
| 1 510 190 | 5/1978 | United Kingdom . |
| 87 02 044 | 4/1987 | WIPO . |

14,318

CEMENT ADDITIVE, METHOD FOR PRODUCING THE SAME, AND CEMENT COMPOSITION

This application is a continuation of application Ser. No. 08/498,704, filed Jul. 3, 1995, now abandoned, which is a divisional of application Ser. No. 07/668,513, filed Mar. 25, 1991 now U.S. Pat. No. 5,476,885.

[TECHNICAL FIELD]

The present invention relates to a cement additive having an ability to prevent slump loss and, in detail, relates to a chemical which is combined with a cement composition such as cement mortar and concrete etc. and elevates efficiency in the workability by that the flowability of the cement composition is increased and its decrease with time passage (hereinafter, referred to as the "slump loss") is prevented, and relates to a method for producing such a cement additive. Furthermore, the present invention relates to a cement composition which is combined with a cement additive of the above kind.

[BACKGROUND ART]

The cement composition such as mortar and concrete etc. shows a decrease in consistency with time passage after combination by the hydration of cement with water or others and thereby, the efficiency in the execution of works lowers. This phenomenon is generally called as a slump loss.

The slump loss in the cement composition causes, on ready mixed concrete, trouble such as limitation of time allowed for transportation, degeneration of quality and impairment of workability owing to a waiting time in a concrete-placing field, and a decrease in durability due to a cold joint and so on. Also, in a factory for producing concrete secondary products, when transportation of a cement composition by a pump pressure is temporarily stopped by taking a lunch time or due to any trouble and, some times later, the transportation by pressure is reopened, the slump loss may cause such an accident as a sudden increase in the transportation pressure or full closure of a pump and may cause such a problem as incomplete filling in a delaying case of moulding such as compaction for some reason. Therefore, in the factories for producing ready-mixed concrete and for producing concrete secondary products and in the other places, the slump loss in a cement composition is an important subject to be solved in order to control the quality of cement compositions and to improve the efficiency in the execution of works.

As a method to prevent the slump loss have been so far known the following methods.

(1) A method in which an unit amount of water in concrete is increased.
(2) A method which comprises a post-addition of a cement additive.
(3) A method which comprises a repeating addition of a cement additive.
(4) A method which comprises an addition of a retarder or a combined use with a cement additive.
(5) A method in which a cement additive of a granular type is used.
(6) A method in which a cement additive is contained in an organic hydrogel.
(7) A method which comprises an addition of a cement additive that undergoes slow-release of a dispersing effect for cement resulting from slow hydrolysis by an alkali.

Said method (1) comprises an increase of an unit amount of water which is estimated with the slump loss up to placing of a cement composition and, even if an improvement in the workability is attempted by this method, the method may accompany such a disadvantage in quality as a loss of strength of a hardening product and crack occurrence resulting from drying shrinkage cause a decrease in durability or such a disadvantage in economy as an increase in an unit amount of cement which needs to get a defined strength.

Said method (2) is a temporary improvement for a flowability and a cement additive remains locally in the cement composition after an attempt to maintain the slump has finished and, as a result, there will be brought a bad effect such as occurrence of local bleeding and thereby, a loss of strength.

Said method (3) comprises a readdition of an additive at a time of that the slump loss takes place, and it is not a complete prevention for the slump loss. Also, there is a disadvantage in the workability and economy due to the repeating addition.

Said method (4) intends maintenance of the flowability by that a delay of time necessary for coagulation of a cement composition is intended by using only a delaying agent such as a hydroxycarboxylate, a ligninsulfonate, a dextrin, and a humic acid etc. or by using those in combination with a cement additive and, therefore, in a case of an excess addition there is a danger of accidents such as a loss of strength and inferior setting.

The method (5) is the one in which a condensation product of naphthalenesulfonic acid with formalin is granulated and gradually dissolved in a cement composition to prevent the slump loss (Japanese Official Patent Provisional Publication, showa 54-139929) or the one in which a copolymer of an olefin with an ethylenic unsaturated dicarboxylic acid anhydride gradually undergoes hydrolysis in a cement composition to prevent the slump loss (Japanese Official Patent Provisional Publications, showa 60-16851 and heisei 1-122947). But in both the methods, the granular additive is dispersed in solution, the methods involve localization of the additive and a problem in storage stability. Furthermore, to prevent said localization of an additive and the problem in storage stability, there has been proposed a method in which a finely granulated cement additive is obtained by that a solution being dispersed with a copolymer of a vinylic compound with an ethylenic unsaturated dicarboxylic acid anhydride is stirred with a rigid body media (Japanese Official Patent Provisional Publication, showa 62-241855), but this method requires a device such as a sand mill for stirring, so that the production process becomes complex.

The method (6) is the one in which a cement-dispersing agent is contained in such an organic water-containing gel as polyacrylic acid etc. and it gradually releases in the cement paste (Japanese Official Patent Provisional Publication, showa 63-162562), but because it involves a gel which is not dissolved in water, there is a problem in storage stability such as separation and precipitation etc.

The method (7) comprises a method in which as a cement additive, a poly(meth)acrylic acid ester is used in combination with such a cement-dispersing agent as sodium ligninsulfonate, sodium melaminesulfonate, and sodium polyacrylate (Japanese Official Patent Provisional Publication, showa 60-161365), and a method in which dispersion of cement particles is intended by using methyl poly(meth)acrylate or a copolymer of t-butyl maleate with isobutylene [A. Ohta, Y. Tanaka, and T. Uryu: Polymer Preprints, Japan Volume 38, No. 3 (1989)]. In the polymers which are used as cement additives of the forementioned kinds, the carboxyl groups directly binding to a carbon atom of the main chain are all esterified. Because of this, when the polymers are combined with a cement composition, they are hardly compatible with water and the cement composition becomes non-uniform and the setting inferiority etc. often takes place due to local existence of the additive.

Like this, all the methods have their own defects and there has not been found any satisfactory cement additive.

Thus, the first subject of the present invention is to provide a cement additive which, by being added to a cement composition, is able to improve said defects, enhance its flowability, and prevent the slump loss. The second subject of the present invention is to provide a method for producing such a superior cement additive as forementioned and also, with which a molecular structural design is easy.

The third subject of the present invention is to provide a production method which can produce such a superior cement additive as forementioned by taking only a short process. Furthermore, the fourth subject of the present invention is to provide a cement composition in which said superior cement additive is combined.

[DISCLOSURE OF INVENTION]

The present inventors have considered, in order to improve the defects in said methods of (1) to (4), that the use of a cement additive which gradually displays a dispersing effect on the cement in a cement composition is essential, and thus we carried out examination of the cement additive. However, since the cement additive in said method (5) uses a phenomenon of that a solid gradually dissolves into an aqueous solution, and since the cement additive in said method (6) contains a cement-dispersing agent in an organic water-containing gel, there has occurred such a problem as the additive exists locally, as the forementioned. In the cement additive of said method (7) the carboxyl groups directly binding with a main chain of the polymer are all esterified, so that a problem of the above kind also takes place.

On the other hand, if a cement additive takes form of an aqueous solution or a water dispersing form by being mixed beforehand with a part of water for mixing and kneading, there is an advantage that its handling may be very easy, but such a form in use may be not possible in the case of a solid which does not dissolve in ordinary water or in the case of a cement additive composed of a hydrogel. Among the hitherto-used cement additives which described above, a cement additive of which the dissolving proceeds with hydrolysis may be preserved in mixing with ordinary water, but such a problem takes place that storage stability are inferior because a dispersing state in water is not maintained and the additive precipitates.

Therefore, the present inventors considered that, if not to display gradually the dispersing effect of a cement additive with dissolution of a solid into an aqueous solution or with release of a component being contained in a hydrogel, but to display gradually the dispersing effect with conversion of a polymer into a compound of low molecular weight is arranged, such a problem of that a cement additive exists locally in a cement composition or the storage stability in water is inferior may be solved. Thus, we carried out examination of such polymers. As a result, we found that a crosslinked polymer containing a defined crosslinking chain is effective, and we attained the present invention.

Accordingly, to solve said first subject, the present invention provides a cement additive composed of a crosslinked polymer in which, between the main chains having a water-soluble polymer structure of a molecular weight of 500 to 100,000, a bond having as a structural unit at least one group selected from the divalent groups as shown in the following formula (I) is formed.

[In the formula (I) $R^1$ and $R^2$ independently denote any one of

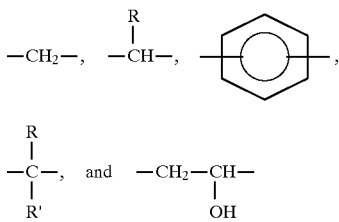

However, $R^1$ may be none if

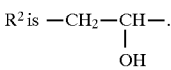

Moreover, R and R' independently denote an alkyl group of carbon number of 1 to 5.]

Said main chain has, for example, at least one kind selected from the functional groups of the undermentioned ① to ⑤.

[Here, m is 0 or an integral number of 1 to 50; n is 0 or 1; M is any one of a hydrogen atom or a monovalent, divalent, or trivalent metal, or an ammonium group or an organic amine group; $R^5$ and $R^6$ independently denote an alkylene group of carbon number of 2 to 4; $R^7$ denotes an alkylene group of carbon number of 1 to 5. Moreover, when m is 2 or more, a plural $R^5O$ all do not need to be an identical group and, when a plural $R^5O$ are one another a different group, their arrangement may be regular or irregular.]

Also, said main chain has, for example, at least one kind of functional group selected from the functional groups of said ① to ⑤ and at least one kind of functional group selected from the functional groups of said ⑥ to ⑫ as well.

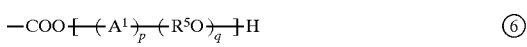

-continued

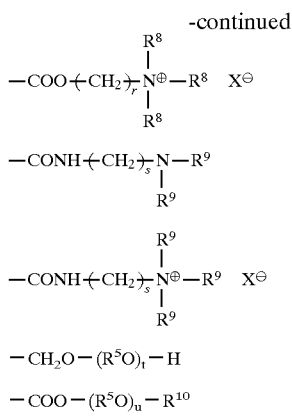

$-CH_2O-(R^5O)_t-H$  (11)

$-COO-(R^5O)_u-R^{10}$  (12)

[Here, p is an integral number of 1 to 10; q is 0 or an integral number of 1 to 100; r and s are, respectively, an integral number of 1 to 3; t and u are, respectively, an integral number of 1 to 100; $A^1$ is a divalent or trivalent ring-opened group of an alkyleneimine of carbon number of 2 to 4 ( in a case of the divalent, $A^1$ is a straight chain type and, in a case of the trivalent, it is a branched type); $R^5$ is an alkylene group of carbon number of 2 to 4: $R^8$ is $CH_3$ or $C_2H_5$; $R^9$ is H, $CH_3$, or $C_2H_5$; $R^{10}$ is H or an alkyl group of carbon number of 1 to 5; and $X^{\ominus}$ is an anionic pair ion. Besides, when p is two or more, a plural $A^1$ all do not need to be an identical group and, when a plural $A^1$ are one another a different group, their arrangement may be regular or irregular. When q is not 0, the arrangement of $A^1$ and $R^5O$ may be normal or reverse and may be regular or irregular. When q is 2 or more, when t is 2 or more, and when u is 2 or more, respectively, a plural $R^5O$ all do not need to be an identical group and, when a plural $R^5O$ are one another a different group, their arrangement may be regular or irregular. When a group being represented by the same symbol in a formula is contained in two or more, all the groups do not need to be an identical group.]

To solve said second subject, the present invention also provides a method for producing a cement additive, wherein water-soluble polymers having a molecular weight of 500 to 100,000 are one another combined by using a crosslinking agent which has as a structural unit at least one group selected from the divalent groups being represented by said formula (I) and/or is capable of forming such a group to obtain a crosslinked polymer.

Said water-soluble polymer has, for example, at least one kind selected from the funcLional groups of the above-mentioned ① to ⑤, or has at least one kind selected from the functional groups of the above-mentioned ① to ⑤ and at least one kind selected from the functional groups of the above-mentioned ⑥ to ⑫.

To solve said third subject, the present invention further provides a method for producing a cement additive, wherein obtains a crosslinked polymer by that a monomer (e), which has two or more of polymerizable double bonds and, between each of these polymerizable double bonds, has as a structural unit at least one kind of group selected from the divalent groups being represented by said formula (I) is polymerized with a monomer (f), which has one polymerizable double bond capable of copolymerizing with the monomer (e) and is possible to form a main chain structure capable of making a water-soluble polymer having a molecular weight of 500 to 100,000.

To solve said fourth subject, the present invention provides a cement composition, of which essential components are a cement additive composed of said specially defined crosslinked polymer, cement, and water. Also, it provides a cement composition in which a cement additive obtained by said specified method, cement a nd water are essential components.

The crosslinked polymer used in the present invention has a structure in which main chains of two or more are one another crosslinked. Said main chains are composed of carbon-carbon bonds only or has a structure in which the bonds are a main body. The main chains convert into a water-soluble polymer having an ability capable of dispersing cement, by that the crosslinking chains are cleaved. Moreover, here the crosslinking chain means a divalent group being represented by said formula (I) (this is a case that only one divalent group is contained) and, in a case of that two or more of the divalent group being represented by said formula (I)is contained, the crosslinking chain means a structure between each of the divalent groups locating at the separated, furthest positions.

Said crosslinking bond is a bond having at least one group selected from the divalent groups being represented by said formula (I). Although this bond has an ester bond, its position is important. That is, either the ester bond locates at a position apart from a main chain carbon atom at least by one carbon atom, or in a case of that the ester bond is directly bound to a main chain carbon atom, in a structure being represented by said formula (I) $R^2$ is following:

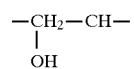

The bond of this kind is cited, for example, as following three kinds, but is not limited within the kinds.

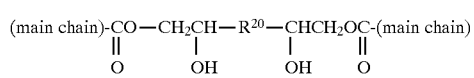

[wherein $R^{20}$ denotes, for example, a divalent group modified from alkylene oxide.]

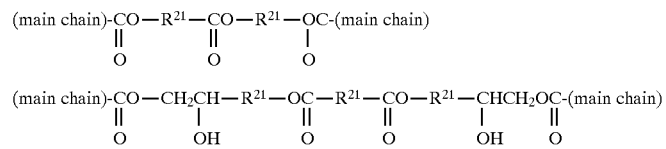

[wherein $R^{21}$ denotes, for example, alkylene group. Moreover, when a number of $R^{21}$ is 2 or more, all the $R^{21}$ do not need to be an identical group.]

A cement-dispersing ability and solubility in water of said water-soluble polymer are given by at least one functional group in the functional groups of said ① to ⑤ being involved in said main chain, or given by at least one functional group in the functional groups of said ① to ⑤ and at least one group in the functional groups of said ⑥ to ⑫. In the functional groups of said ① to ⑤, M is anyone of a hydrogen atom, mono-, di-, or trivalent metal, an ammonium group, or an organic amine group. The monovalent metal is, for example, sodium and potassium. The divalent metal is, for example, magnesium, calcium, and barium. The trivalent metal is, for example, aluminum. The organic amine group is, for example, trimethylamine, triethylamine, and triethanolamine.

Said water-soluble polymer has an average molecular weight of 500 to 100,000 and, preferably, an average molecular weight of a range from 3,000 to 50,000, more preferably, an average molecular weight of a range from 5,000 to 30,000. A water-soluble polymer of this kind is crosslinked one another by said specially defined bond to form a crosslinked polymer. A crosslinking agent used for forming a crosslinked polymer is preferred to have, for example, an average molecular weight of a range from 100 to 5,000, more preferably, it has an average molecular weight of 1,000 or less. Also, the monomer (e) is preferred to have, for example, an average molecular weight of a range from 200 to 5,000. Besides, the water-soluble polymer needs not to have a molecular weight larger than that of the crosslinking agent. If the molecular weight of a water-soluble polymer deviates from said range, the dispersing character may be inferior or the air amount may abnormally increase. Because of this, said crosslinked polymer is very hydrophilic and, in a preferable case, shows solubility in water.

Said water-soluble polymer is, for example, at least one kind of compound selected from a homopolymer and a copolymer which is led by using at least one kind of monomer selected from the monomers of the undermentioned (i) to (vi), and selected from the addition reaction products having at least either one of the structural units in said the undermentioned (vii) and (viii), which are led from an addition reaction of the group (—COOM) being involved in the above polymers with at least alkyleneimine in a group of an alkyleneimine and an alkylene oxide.

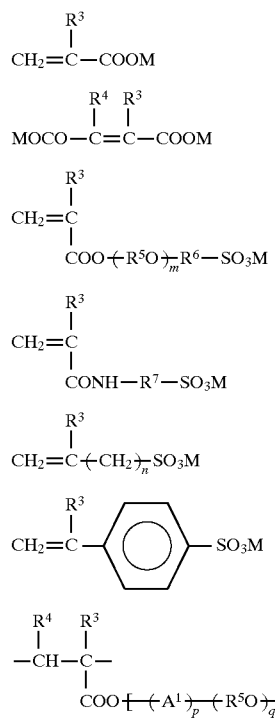

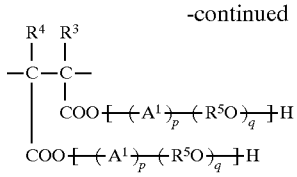

[Here, m is 0 or an integral number of 1 to 50; n is 0 or 1; p is an integral number of 1 to 10; q is 0 or an integral number of 1 to 100; M is any one of a hydrogen atom or a monovalent, divalent, or trivalent metal group, or an ammonium group or an organic amine group; $R^3$ and $R^4$ independently are H or $CH_3$; $R^5$ and $R^6$ independently represent an alkylene group of carbon number of 2 to 4; $R^7$ represents an alkylene group of carbon number of 1 to 5; and $A^1$ is a divalent or trivalent ring-opened group of carbon number of 2 to 4 ( it is a straight chain type in a case of the divalent and a branched type in a case of the trivalent ). Moreover, when m is 2 or more and when q is 2 or more, respectively, a plural $R^5O$ all do not need to be an identical group and, when a plural $R^5O$ are one another a different group, their arrangement may be regular or irregular. When p is 2 or more, a plural $A^1$ all do not need to be an identical group and, when a plural $A^1$ are one another a different group, their arrangement may be regular or irregular. When q is not 0, the arrangement of $A^1$ and $R^5O$ may be normal or reverse and may be regular or irregular. When a group or number being represented by an identical symbol in one formula is 2 or more, the group or number all do not need to be an identical group or number.]

Said water-soluble polymer is at least one kind of compound, for example, selected from a copolymer which is led by using at least one kind of monomer selected from the monomers of the forementioned (i) to (vi) and at least one kind of monomer selected from the monomers of the undermentioned (ix) to (x iv), and selected from the addition reaction products having at least either one of the structural units in said the forementioned (vii) and (viii), which are led from an addition reaction of the group (—COOM) being involved in the above copolymers with at least alkyleneimine in a group of an alkyleneimine and an alkylene oxide with.

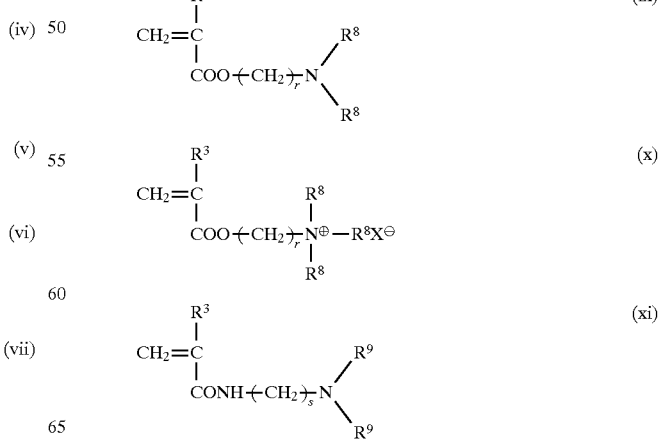

-continued

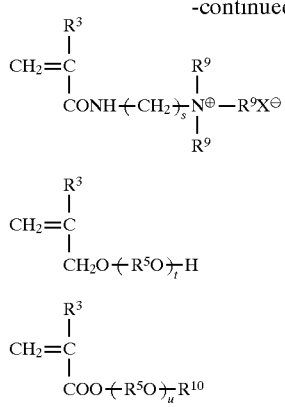

$$CH_2=C\overset{R^3}{|}$$
$$CONH{+}CH_2{\xrightarrow{}_s}N^{\oplus}{-}R^9X^{\ominus}$$
with $R^9$ groups (xii)

$$CH_2=\overset{R^3}{\underset{|}{C}}$$
$$CH_2O{+}R^5O{\xrightarrow{}_t}H$$ (xiii)

$$CH_2=\overset{R^3}{\underset{|}{C}}$$
$$COO{+}R^5O{\xrightarrow{}_u}R^{10}$$ (xiv)

[Here, r and s are, respectively, an integral number of 1 to 3; t and u are, respectively, an integral number of 1 to 100; $R^3$ and $R^4$ are, respectively, H or $CH_3$; $R^5$ is an alkylene group of carbon number of 2 to 4; $R^8$ is $CH_3$ or $C_2H_5$; $R^9$ is H, $CH_3$, or $C_2H_5$; $R^{10}$ is H or an alkyl group of carbon number of 1 to 5; and $X^{\ominus}$ is an anionic pair ion. Besides, when t is 2 or more and when u is 2 or more, respectively, a plural $R^5O$ all do not need to be an identical group and, when a plural $R^5O$ are one another a different group, their arrangement may be regular or irregular. When a group being represented by the same symbol in a formula is contained in two or more, all the groups do not need to be an identical group.]

In a case that a water-soluble polymer and crosslinked polymer have said groups (vii) and/or (viii), such a water-soluble polymer and crosslinked polymer are, for example, obtained by the following. To a group (—COOM) which a water-soluble polymer has, at least alkyleneimine in a group of alkyleneimine and alkyleneoxide is added by means of hitherto known method. The alkyleneimine may be only added, or alkyleneimine and alkyleneoxide may be added together. In a case of the joint addition, they can be simultaneously added to said water-soluble polymer having the group (—COOM) to carry out reaction, or the reaction can be carried out one by one; for example, a reaction of alkyleneimine may be carried out, and then, alkyleneoxide may be added for reaction. As examples of the alkyleneimine of carbon number of 2 to 4 used in the present invention, are cited various compounds, for example, ethyleneimine and propyleneimine etc. are cited as proper examples.

As examples of the monomer (i) used in the present invention are cited acrylic acid and methacrylic acid as well as their monovalent metal salts, divalent metal salts, trivalent metal salts, ammonium salts, and organic amine salts, and one kind or two or more kinds of these compounds can be used.

As examples of the monomer (ii) used in the present invention are cited maleic acid and citraconic acid and their anhydrides as well as their monovalent metal salts, divalent metal salts, trivalent metal salts, ammonium salts, and organic amine salts, and one kind or two or more kinds of these compounds can be used.

As examples of the monomer (iii) used in the present invention are cited, for example, sulfoalkyl (meth) acrylates such as 2-sulfoethy (meth)acrylate, 2-sulfopropyl (meth) acrylate, 3-sulfopropyl (meth)acrylate, 1-sulfopropan-2-yl (meth)acrylate, 2-sulfobutyl (meth) acrylate, 3-sulfobutyl (meth)acrylate, 4-sulfobutyl (meth)acrylate, 1-sulfobutan-2-yl (meth)acrylate, 1-sulfobutan-3-yl (meth)acrylate, 2-sulfobutan-3-yl (meth) acrylate, 2-methyl-2-sulfopropyl (meth)acrylate, 2-methyl-3-sulfopropyl (meth)acrylate, and 1,1-dimethyl-2-sulfoethyl (meth)acrylate etc., and their monovalent metal salts, divalent metal salts, trivalent metal salts, ammonium salts, and organic amine salts; sulfoalkoxypolyalkylene glycol mono(meth)acrylate such as sulfoethoxypolyethylene glycol mono(meth)acrylate, sulfopropoxypolyethylene glycol mono(meth)acrylate, sulfobutoxypolyethylene glycol mono(meth)acrylate, sulfethoxypolypropylene glycol mono(meth)acrylate, sulfoproxypolypropylene glycol mono(meth)acrylate, and sulfobutoxypolypropylene glycol mono(meth)acrylate etc., and their monovalent metal salts, divalent metal salts, trivalent metal salts, ammonium salts, and organic amine salts. These compounds can be also used as one kind or two or more kinds in combination.

As examples of the monomer (iv) used in the present invention are cited, for example, a crylamidomethanesulfonic acid, acrylamidoethanesulfonic acid, acrylamidopropanesulfonic acid, 2-acrylamido-2-methylpropanesulfonic acid, methacrylamidomethanesulfonic acid, and methacrylamidoethanesulfonic acid, and their monovalent metal salts, divalent metal salts, trivalent metal salts, ammonium salts, and organic amine salts. These compounds can be also used as one kind or two or more kinds in combination.

As examples of the monomer (v) used in the present invention are cited, for example, ethylenesulfonic acid, allyl sulfonic acid, methallyl sulfonic acid, and their monovalent metal salts , diva lent metal salts, trivalent metal salts, ammonium salt, organic amine salts. These compounds can be also used as one kind or two or more kinds in combination.

As examples of the monomer (vi) used in the present invention are cited, for example, sulfonic styrene such as p-styrenesulfonic acid etc. and its monovalent metal salts, divalent metal salts, trivalent metal salts, ammonium salt, organic amine salts. These compounds can be also used as one kind or two or more kinds in combination.

As examples of the monomer (ix) used in the present invention are cited, for example, dimethyl-aminoethyl acrylate, diethylaminoethyl acrylate, dimethyl-aminoethyl methacrylate, and diethylaminoethyl methacrylate, and their monovalent metal salts, divalent metal salts, trivalent metal salts, ammonium salt, organic amine salts. These compounds can be also used as one kind or two or more kinds in combination.

As examples of the monomer (x) used in the present invention are cited, for example, the compounds which are obtained from reaction of said monomer (ix) with the hitherto known quaternary reagent, for example, an alkyl halogenide, an aralkyl halogenide, and a dialkylsulfuric acid etc. These compounds can be also used as one kind or two or more kinds in combination.

As examples of the monomer (x i) used in the present invention are cited, for example, dimethylaminopropylacrylamide, diethylaminopropylacrylamide, dimethylaminopropylmethacrylamide, and diethylaminopropylmethacrylamide etc. These compounds can be also used as one kind or two or more kinds in combination.

As examples of the monomer (x ii) used in the present invention are cited, for example, the compounds which are obtained from reaction of said monomer (x i) with the hitherto known quaternary reagent, for example, an alkyl halogenide, an aralkyl halogenide, and a dialkylsulfuric acid etc. These compounds can be also used as one kind or two or more kinds in combination.

As examples of the monomer (x iii) are cited, for example, polyalkylene glycol mono(meth)allyl ether such as polyethylene glycol monoallyl ether, polypropylene glycol monoallyl ether, polyethylene glycol-polypropylene glycol monoallyl ether, polyethylene glycol monomethallyl ether, polypropylene glycol monomethallyl ether, polyethylene glycol-polypropylene glycol monomethallyl ether etc. These compounds can be also used as one kind or two or more kinds in combination.

As examples of the monomer (x iv) are cited, for example, hydroxyethyl (meth)acrylate, polyethylene glycol mono (meth)acrylate, polypropylene glycol mono(meth) acrylate, polybutylene glycol mono(meth)acrylate, methoxypolyethylene glycol mono(meth)acrylate, methoxypolypropylene glycol mono(meth)acrylate, methoxypolybutylene glycol mono(meth)acrylate, ethoxypolyethylene glycol mono (meth)acrylate, ethoxypolypropylene glycol mono(meth) acrylate, ethoxypolybutylene glycol mono(meth)acrylate, polyethylene glycol polypropylene glycol mono(meth) acrylate, and polyethylene polytetramethylene glycol mono (meth)acrylate etc. These compounds can be also used as one kind or two or more kinds in combination.

In the present invention, as the monomer (f), for example, at least one kind among said monomers from (i) to (vi) can be used, or with this, at least one kind among said monomers from (ix) to (x iv) can be used i n combination.

Although the monomer (e) used in the present invention can be produced by a method known in public or by a combination of the methods in public, the representative methods are exemplified as follows.

① A reaction of at least one of monoester diols and polyester polyols with a polymerizable monomer having a functional group capable of reacting with the hydroxyl groups in the above ols.

② A reaction of at least one of monoester dicarboxylic acids and polyester polycarboxyl ic acids with a polymerizable monomer having a functional group capable of reacting with the carboxyl groups in the above acids.

③ A reaction of at least one of polyols and polyepoxy compounds with a polymerizable monomer having a carboxyl group which is apart from a polymerizable double bond by at least one carbon atom.

④ A reaction of polycarboxylic acids with a polymerizable monomer having a hydroxyl or an epoxy group which is apart from a polymerizable double bond by at least one carbon atom.

⑤ A reaction of at least one of monoester polyepoxy compounds and polyester polyepoxy compounds with a polymerizable monomer having a functional group capable of reacting with the epoxy groups in the above compounds.

As the monoester diols and polyester polyols in the production method ①, are cited reaction products of diol compounds such as ethylene glycol, propylene glycol, diethylene glycol, dipropylene glycol, 1,5-pentanediol, 1,6-haxanediol, and neopentylglycol etc., with dibasic acids such as succinic acid, adipic acid, phthalic acid, hexahydrophthalic acid, and tetrahydrophthalic acid etc.; reaction products of said dibasic acids with cyclic ethers such as ethylene oxide and propylene oxide etc.; reaction products of said diol compounds with hydroxycarboxylic acids such as glycolic acid, α-hydroxyacrylic acid, salicylic acid, and mandelic acid etc.; reaction products of said hydroxycarboxylic acids with said cyclic ethers; and reaction products of said diols or polyalcohols such as pentaerythritol, trimethylolpropane, trimethylolethane, ditrimethylolpropane, and dipentaerythritol etc. with lactones such as β-propiolactone, γ-butyrolactone, δ-valerolactone, and ε-caprolactone etc.

As the polymerizable monomers having a functional group capable of reacting with a hydroxyl group in the production method ①, are cited acrylic acid, methacrylic acid, maleic acid, glycidyl (meth)acrylate, (meth) acryloylaziridine, (meth)acryloyloxyethylaziridine, 2-vinyl -2-oxazoline, 2- isopropenyl -2-oxazoline, isocyanateethyl (meth)acrylate, (meth)acryloyl chloride, and allyl chloride etc.

As the monoester dicarboxylic acids and/or polyester polycarboxyic acids in the production method ②, compounds similar to those exemplified in the production method ① can be used.

As the polymerizable monomers having a functional group capable of reacting with a carboxylic group in the production method ②, are cited al lyl alcohol, 2-hydroxyethyl (meth)acrylate, glycidyl (meth)acrylate, (meth)acryloylaziridine, (meth)acryloyl-oxyethylaziridine, 2-vinyl-2-oxazoline, 2-isopropenyl-2-oxazoline, and isocyanateethyl (meth)acrylate etc.

As the polyols in the production method ③, are cited polycarbonate polyols, polyether polyols, polybutadiene polyols, and hydrogenated polybutadiene polyols etc. in addition to the polyester polyols exemplified in the production method ①. As the polycarbonate polyols are cited addition compounds of 2 to 6 moles of ethylene oxide with compounds such as 1,6-hexanediol, neopentylglycol, 1,4-butanediol, 1,8-octanediol, 1,4-bis-( hydroxymethyl )-cyclohexane, 2-methylpropanediol, dipropylene glycol, dibutylene glycol, and bisphenol A; diols which are reaction products of said diol compounds with dicarboxylic acids such as oxalic acid, malonic acid, succinic acid, adipic acid, azelaic acid, and hexahydrophthalic acid etc.; polycarbonate polyols which have as a diol component a polyester diol etc. that is an addition reaction product of said diol compound with ε-caprolactone or δ-valerolactone; and polycarbonate polyols that are addition reaction products of polycarbonate polyols of the forementioned kinds with ethylene oxide, propylene oxide, ε-caprolactone, or δ-valerolactone. Polycarbonate polyols of the above kinds are easily obtainable as commercial products. For example, are cited Desmophen 2020E (made by Sumitomo-Bayer Polyurethane Co., Ltd., average molecular weight 2000), DN-980 (made by Nippon Polyurethane Co., Ltd., average molecular weight 2000 ), and DN-981 (made by Nippon Polyurethane Co., Ltd., average molecular weight 1000). As the polyether polyols are cited, for example, polyether polyols which are obtained by a polymerization reaction of a cyclic ether such as ethylene oxide, propylene oxide, butylene oxide, and tetrahydrofuran etc. using a diol compound such as ethylene glycol, propylene glycol, and 1,4-butadienediol etc. as an initiator. Polyether polyols of the above kinds are easily obtainable as commercial products. For example, are cited Sannix PP-1000 ( a polypropylene glycol of molecular weight 1000, made by Sanyo Chemical Industries, Ltd. ) and PTG-500P (a polytetramethylene glycol of molecular weight 2000, made by Hodogaya Chemical Kogyo Co., Ltd.). As the polybutadienepolyols are cited polymers of 1,4-butadiene or 1,2-butadiene having hydroxyl group at a terminal end of the molecule. Also, as the hydrogenated polybutadiene polyethers are cited compounds in which the unsaturated double bonds in the molecules of said polybutadienepolyols are hydrogenated. These compounds are easily obtainable as commercial products. For example, are cited NISSO-PB G-1000, G-2000, G-3000 (polybutadiene glycol of a liquid type, made by Nippon Soda Co., Ltd.), NISSO-PB GI-1000, GI-2000, GI-3000 ( hydrogenated polybutadiene glycol, made by Nippon Soda Co., Ltd. ), and Polybd R-45HT (polybutadiene glycol of a liquid type, made by Idemitsu Petro Chemical Co., Ltd.) etc.

As the polymerizable monomers having a carboxyl group, which is apart from a polymerizable double bond by at least one carbon or more, in the production method ③, are cited 2-carboxyethyl (meth)acrylate, 4-carboxyphenyl (meth)acrylate, β-(meth)acryloyloxyethyl hydrogen phthalate, β-(meth)acryloyloxyethyl hydrogen succinate, β-(meth)acryloyloxypropyl hydrogen phthalate, and (meth) acryloyloxyethyl trimellitic acid etc.

As the polycarboxylic acids in the production method ④ are cited succinic acid, adipic acid, phthalic acid, hexahydrophthalic acid, tetrahydrophthalic acid, tricarballylic acid, benzenetricarboxylic acid, and benzenetetracarboxylic acid etc. besides the monoester dicarboxylic acids and polyester polycarboxylic acids exemplified in the production method ②.

As the polymerizable monomers having a hydroxyl group, which is apart from a polymerizable double bond by at least one carbon atom or more, in the production method ④, are cited allyl alcohol, 2-hydroxyethyl (meth)acrylate, 2-hydroxycyclohexyl (meth)acrylate, 2-hydroxybutyl (meth) acrylate, 4-hydroxybutyl (meth)acrylate, 2-hydroxypropyl (meth)acrylate, and 2-hydroxy-3- [( 2 -methyl-1-oxo-2-propenyl )oxy] propyl acrylate etc.

As the polymerizable monomers having an epoxy group, which is apart from a polymerizable double bond by at least one carbon atom or more, in the production method ④, are cited oxiranylmethyl (meth)acrylate, 9-oxiranyinonyl (meth)acrylate, (3-methyloxiranyl)methyl (meth)acrylate, and 9,10-epoxyoleyl acrylate (Rikaresin ESA, made by Shin Nippon Rika Co., Ltd.).

As the monoester polyepoxy compounds and polyester polyepoxy compounds in the production method ⑤, are cited the reaction products of the monoester dicarboxylic acids and/or polyester polycarboxylic acids with epichlorohydrin exemplified in the production method ②; terephthalic acid diglycidyl ester; o-phthalic acid diglycidyl ester; and the compounds having the structures below-pictured etc.

As the polymerizable monomers having a functional group capable of reacting with an epoxy group in the production method ⑤, are cited (meth)acrylic acid, maleic acid, allyl alcohol, 2-hydroxyethyl (meth)acrylate, vinylethylamine, vinylbutylamine, and aminoethyl (meth) acrylate etc.

Also, the monomer (e) are obtained not only from said production methods, but also as commercially-available products. For example, there are cited KAYARAD MANDA, HX-220, HX-620, R-526, DPCA-20, DPCA-30, DPCA-60, and DPCA-120 (made by Nippon Kayaku Co., Ltd.).

To obtain a water-soluble polymer or a crosslinked polymer in the present invention, can be used the monomer (g) capable of co-polymerizing with the monomers from (i) to (vi), from (ix) to (x iv), and (e) in a range of that the solubility in water of the polymer or crosslinked polymer and the performance as a cement additive of the crosslinked polymer are not badly affected, in addition to the above monomers from (i) to (vi), from (ix) to (x iv), and (e). The amounts for use are 0 to 30% by weight against a total amount of the monomers from (i) to (vi), from (ix) to (x iv), and (e).

As examples of the monomer (g) are cited the esters of an aliphatic alcohol of carbon number 1 to 20 with (meth)acrylic acid; (meth)acrylamide; the monoesters or diesters of maleic acid, fumaric acid, or an acid of these kinds with an aliphatic alcohol of carbon number 1 to 20, a glycol of carbon number 2 to 4, or a polyalkylene glycol which is derived with an addition of 2 to 100 moles of said glycols; alkenyl acetates such as vinyl acetate and propenyl acetate etc.; aromatic vinyl compounds such as styrene and p-methylstyrene etc.; vinyl chloride etc. One kind of these compounds or two kinds or more can be used.

Besides, in the present invention, a polymer for dispersing cement hitherto known in public may be used as a water-soluble polymer in the post-crosslinking method. The poly-

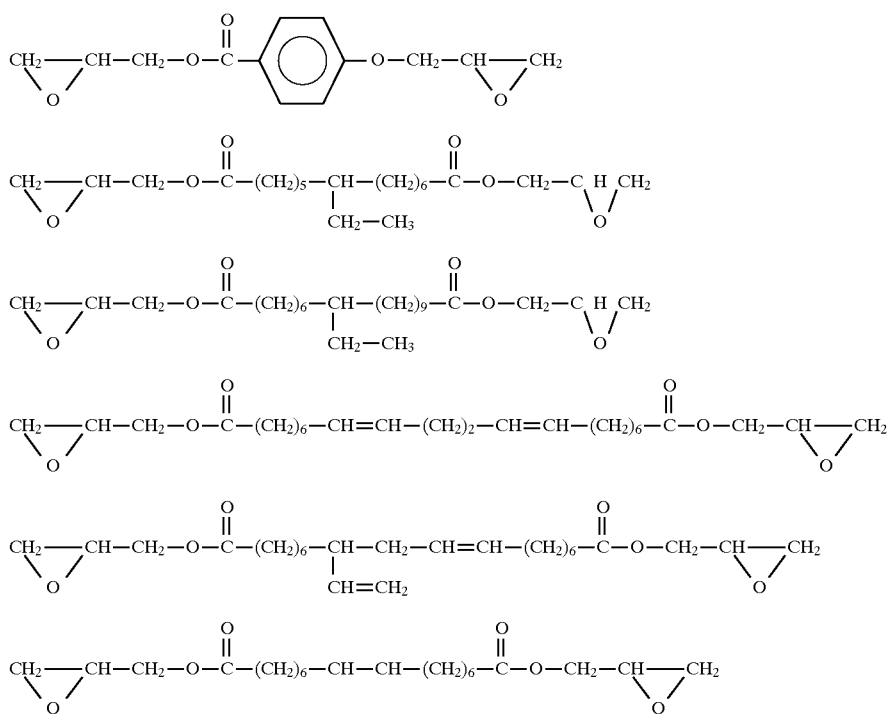

mer of such a kind is described in, for example, Japanese Official Patent Gazettes, showa 53-38095, 58-38380, and 59-15359, and heisei 2-11542, Japanese Official Patent Provisional Publications, showa 58-74552, 60-16848, 61-209945, 63-285141, 63-285142, and heisei 63-236742, and the polymer can be used as only one kind or in combination of two kinks or more.

In a case of that said monomers from (i) to (vi), from (ix) to (x iv), and (e) are used in combination, although the combination may be set properly, the setting is carried out, for example, as follows.

(I) the monomers (i) and (x iv)

(II) the monomers (i) and (iv).

(III) the monomers (i), (iv), and (x iv)

(IV) the monomers (i) and (iii).

(V) the monomers (i), (iii), and (x iv).

(VI) the monomers (e), (i), and (x iv)

(VII) the monomers (e), (i), and (iv).

(VIII) the monomers (e), (i), (iv), and (x iv).

(IX) the monomers (e), (i) and (iii).

(X) the monomers (e), (i), (iii), and (x iv)

To obtain a crosslinking polymer using these monomers, there are, for example, a method in which a water-soluble polymer of a straight chain type is beforehand prepared by polymerizing a monomer which has only one polymerizing double bond, and the water-soluble polymer and polymer are one another crosslinked by using a crosslinking agent so that said polymer makes a main chain ( hereinafter, a production method of this kind may be referred to as "a post-crosslinking method") and a method in which a monomer having two or more of a polymerizable double bond and a monomer having only one polymerizable double bond are used in combination and polymerization is carried out simultaneously with crosslinking ( hereinafter, a production method of this kind may be referred to as "an one-step crosslinking method").

In a case of the post-crosslinking method, for example, any combination from said (I) to (V) may be adopted. In a case of the one-step crosslinking method, for example, any combination from said (VI) to (X) may be adopted.

In a case of said combination (I), the monomers (x iv) and (i) prefer to be used in a ratio of 1 to 99.9% by weight of the monomer (x iv) and 99 to 0.1% by weight of the monomer (i) [here , the total of (x iv) and (i) is 100% by weight], and they more prefer to be used in such a ratio as 50 to 80% by weight of (x iv) and 20 to 50% by weight of (i ) [the total of (x iv) and (i) is 100% by weight]. If the amount of (x iv) is too small, an ability to prevent the slump loss may be inferior and, if too much, the air-entraining may become too much. Also, if the amount of (i) is too small, a dispersing ability may be inferior and, if too much, retardation of hardening may appear.

In a case of said combination (II), the monomers (iv) and (i ) prefer to be used in a ratio of 1 to 99% by weight of the monomer (iv) and 1 to 99% by weight of the monomer (i) [here, the total of (iv) and (i) is 100% by weight] and they more prefer to be used in such a ratio as 1 to 40% by weight of (iv) and 60 to 99% by weight of (i) [the total of (iv) and (i) is 100% by weight]. If the amounts of (iv) or (i) deviate from said % range, the dispersing character may be lacking, material segregation may take place, or the slump loss may increase.

In a case of said combination (III), the monomers (iv), (i), and (x iv) prefer to be used in a ratio of 1 to 98% by weight of the monomer (iv), 1 to 98% by weight of the monomer (i ), and 1 to 70% by weight of the monomer (x iv) [here, the total of (iv), (i), and (x iv) is 100% by weight], and they more prefer to be used in such a ratio as 1 to 50% by weight of (iv), 39 to 94% by weight of (i) , and 5 to 60% by weight of (x iv) [here, the total of (iv), (i), and ( x iv) is 100% by weight]. If any one of (iv), (i), and (x iv) deviates from said % range, lack of the dispersing character, material segregation, increase of the slump loss, or increase of the air amount may take place.

In a case of said combination (IV), the monomers (iii ) and (i) prefer to be used in a ratio of 1 to 99% by weight of the monomer (iii) and 1 to 99% by weight of the monomer (i) [here, the total of (iii) and (i) is 100% by weight], and they more refer to be used in such a ratio as 1 to 40% by weight of (iii) and 60 to 99% by weight of (i) [here, the total of (iii) and (i) is 100% by weight]. If the amounts of (iii) and (i) deviates from said % range, the dispersing character may be lacking, material segregation may take place, or the slump loss may increase.

In a case of said combination (V), the monomers (iii) , (i), and (x iv) prefer to be used in a ratio of 1 to 98% by weight of the monomer (iii), 1 to 98% by weight of the monomer (i), and 1 to 70% by weight of the monomer (x iv) [here, the total of (iii), (i), and (x iv) is 100% by weight], and they more prefer to be used in such a ratio as 1 to 50% by weight of (iii), 39 to 94% by weight of (i), and 5 to 60% by weight of (x iv) [here, the total of (iii), (i), and (x iv) is 100% by weight]. If anyone of (iii) , (i), and (x iv) deviates from said % range, lack of the dispersing character, material segregation, increase of the slump loss, or increase of the air amount may take place.

In a case of said combination (VI), the monomers (e), (x iv), and (i) prefer to be used in a ratio of 0.1 to 50% by weight of the monomer ( e ), from 1 to 98.9% by weight of the monomer (x iv), and 1 to 98.9 % by weight of the monomer (i) [here, the total of (e), (x iv), and (i) is 100% by weight].

In a case of said combination (VII), the monomers (e), (iv), and (i) prefer to be used in a ratio of 0.1 to 50% by weight of the monomer (e), 1 to 98.9% by weight of the monomer (iv), and 1 to 98.9% by weight of the monomer (i). [the total of (e), (iv), and (i) is 100% by weight.]

In a case of said combination (VIII), the monomers (e), (x iv) , (iv) , and (i) prefer to be used in a ratio of 0.1 to 50% by weight of the monomer (e), 1 to 70% weight of the monomer (xiv), 1 to 97.9% by weight of the monomer (iv), and 1 to 97.9% by weight of the monomer (i). [the total of (e), (xiv) (iv), and (i) is 100% by weight. ] and they more prefer to be used in such a ratio as 1 to 20% by weight of (e), 5 to 59% by weight of (xiv), 1 to 49% by weight of (iv) and 39 to 93% by weight of (i). [the total of (e), (xiv), (iv), and (i) is 100% by weight.]

In a case of said combination (IX), the monomers (e), (iii), and (i) prefer to be used in a ratio of 0. 1 to 50% by weight of the monomer (e), 1 to 98.9% by weight of the monomer (iii), and 1 to 98.9% by weight of the monomer (i). [the total of (e), (iii), and (i) is 100% by weight.]

In a case of said combination (X), the monomers (e), (xiv), (iii), and (i) prefer to be used in a ratio of 0.1 to 50% by weight of the monomer (e), 1 to 70% weight of the monomer (xiv), 1 to 97.9% by weight of the monomer (iv), and 1 to 97.9% by weight of the monomer (i) . [the total of (e), (xiv), (iii) , and (i) is 100% by weight.] and they more prefer to be used in such a ratio as 1 to 20% by weight of (e), 5 to 59% by weight of (xiv), 1 to 49% by weight of (iii), and 39 to 93% by weight of (i). [the total of (e), (xiv), (iii), and (i) is 100% by weight.]

Besides, an use of the monomer (xiv) is favored for preparation of a water-soluble polymer which is superior in an ability to prevent the slump loss. Also, an use of the monomer (iii) is favored for preparation of a water-soluble polymer which is very small in an air-entraining amount.

In a case of the post-crosslinking method, said monomer component may be polymeri zed by using a polymerization initiator in order to prepare said water-soluble polymer. The polymerization may be carried out according to a polymerization in a solvent or a bulk polymerization.

The polymerization in a solvent may be carried out by a batch system or a continuous system and as a solvent used in the polymerization are cited water; lower alcohols such as methyl alcohol, ethyl alcohol, and isopropyl alcohol etc.; aromatic or aliphatic hydrocarbons such as benzene, toluene, xylene, cyclohexane, and n-hexane; ethyl acetate; ketone compounds such as acetone and methyl ethyl ketone etc. From consideration of the solubilities of the monomers as the raw materials and the water-soluble polymers obtained as well as the convenience in use of the water-soluble prepolymers, it is preferred to use at least one kind of compound selected from water and lower alcohols of carbon number of 1 to 4. Among the lower alcohols of carbon number of 1 to 4, methyl alcohol, ethyl alcohol, and isopropyl alcohol are especially effective.

When the polymerization is carried out in a water medium, a water-soluble polymerization-initiator such as persulfate of ammonium or an alkali metal or hydrogen peroxide etc. is used. At this time, an accelerator such as sodium hydrogen sulfite etc. may be used in combination with the polymerization - initiator. Also, when the polymerization is carried out in a solvent such as lower alcohols, an aromatic hydrocarbon, an aliphatic hydrocarbon, ethyl acetate, or a ketone compound, a peroxide such as benzoyl peroxide and lauroyl peroxide etc., a hydroperoxide such as cumene hydroperoxide etc., and an aliphatic azo compound such as azo-bis-isobutyronitrile etc. is used as a polymerization-initiator. At this time an accelerator such as an amine compound may be used in combination with the polymerization-initiator. Furthermore, when a mixture solvent of water and lower alcohols is used, said various polymerization-initiator or a compound selected from a combination of the polymerization-initiator and an accelerator is used with proper selection. Although the polymerization temperature is set depending upon a solvent and polymerization-initiator used, it is usually in a range of 0° to 120° C.

In the bulk polymerization, a peroxide such as benzoyl peroxide and lauroyl peroxide etc.; a hydroperoxide such as cumene hydroperoxide etc.; and an aliphatic azo compound such as azo-bis-isobutyronitrile etc. is used as a polymerization-initialor and the polymerization is carried out in a temperature range of 50° to 150° C.

A crosslinking agent used in the present invention is a compound which has as a structural unit and/or is capable of forming at least one group selected from the divalent groups being denoted by said formula (I). The crosslinking agent is preferred to be a compound having a functional group which is capable of reacting with a functional group (for example, a carboxyl, hydroxyl, amino, and sulfonate group etc.) of a water-soluble polymer, and there is no special limitation as far as it is. There are cited, for example, polyalcohols such as ethylene glycol, triethylene glycol, tetraethylene glycol, polyethylene glycol, glycerol, polyglycerol, propylene glycol, diethanolamine, triethanolamine, polyoxypropylene, oxyethyleneoxypropylene block copolymer, pentaerythritol, sorbitol, sorbitane fatty acid esters etc.; polyvalent glycidyl compounds such as ethylene glycol diglycidyl ether, polyethylene glycol diglycidyl ether, glycerol polyglycidyl ether, diglycerol polyglycidyl ether, polyglycerol polyglycidyl ether, sorbitol polyglycidyl ether, pentaerythritol polyglycidyl ether, propylene glycol diglycidyl ether, polypropylene glycol diglycidyl ether, resorcinol diglycidyl ether, 1,6-hexanediol diglycidyl ether, adipic acid diglycidyl ester, and o-phthalic acid diglycidyl ester etc.

In a case of that polyalcohol is used as a crosslinking agent, a crosslinked polymer which has a expected structure can be obtained by that when polymerization of a water-soluble polymer, a monomer which has a carboxyl group at a position which is apart by at least one carbon atom from a polymerizable double bond, for example, 2-methacryloyloxyethyl succinate, 2-methacryloyloxyethyl phthalate etc., is co-polymerized, and then, esterification with polyalcohol being a crosslinking agent is carried out.

In a case of said combination (I), the obtained water-soluble polymer has a carboxyl group and/or a hydroxyl group. In a case of said combination (II), the obtained water-soluble polymer has a carboxyl group and/or a sulfonate group. In a case of said combination (III), the obtained water-soluble polymer has a carboxyl group and/or a sulfonate group and/or a hydroxyl group. In a case of said combination (IV), the obtained water-soluble polymer has a carboxyl group and/or a sulfonate group. In a case of said combination (V), the obtained water- soluble polymer has a carboxyl group and/or. a sulfonate group and/or a hydroxyl group.

The amount for use of a crosslinking agent is preferable to use so as to be from 0.001 to 1.0 in a functional group molar ratio against a functional group (a carboxyl group and/or a hydroxyl group and/or a sulfonate group etc.) which said water-soluble polymer has (a functional group of the crosslinking agent / that of the water-soluble polymer ), and more preferable 0.01 to 0.3. In a case of that the molar ratio is less than said range, effect of preventing the slump loss may not be sufficient, the performance of a cement additive in the present invention may not be obtained, and if the molar ratio is more than said range, elevation of the performance may not be recognized or handling of the crosslinked polymer may be troubled.

To obtain a crosslinked polymer by the post-crosslinking method, for example, there are a method which comprises a reaction of a water-soluble polymer with a crosslinking agent and the reversed phase suspension method in which a water-soluble polymer is suspended and dispersed in a hydrophobic organic solvent and subjected to a reaction with a crosslinking agent.

Temperature for the reaction of the water-soluble polymer with the crosslinking agent has no limitation as far as the reaction proceeds, but, for example, a range of 20° to 200° C., especially 50° to 100° C., is preferred.

Although there is no special limitation for the viscosity of a 20% aqueous solution or water dispersion of the crosslinked polymer which was obtained from a reaction of the water-soluble polymer with the crosslinking agent, the viscosity is preferred if it is 100,000 cps or less when measured by B-type rotational viscometer at 20° C. from a standpoint of producing and handling.

To obtain a crosslinked polymer with the one-step crosslinking method, there is suggested a method in which monomers is used in said combination from (VI) to (X) and a reaction is carried out under the manners or the conditions which have been mentioned in the production of the water-soluble polymers.

The crosslinked polymer may be used by itself as a principal component a cement additive and, in case of necessity, it may be neutralized by an alkaline substance and then, used as a main component of the cement additive. As an alkaline substance of this kind are cited, as preferable, a hydroxide, chloride, and carbonate of a monovalent or divalent metal; ammonia; and an organic amine.

Also, it is possible for the crosslinked polymer to use in combination with other known-in-public cement additives. As a known cement additive of this kind are cited, for example, a hitherto known cement dispersing agent, air-entraining agents, cement wetting and dispersing agents, water-resisting agents, strength-enhancing agents, and accelerators.

The cement additive in the present invention may be used for hydraulic cement such as portland cement, alumina cement, and various kinds of mixture cement, or a hydraulic material besides the cement such as gypsum etc.

As a method for use of the cement additive of the present invention are referred, for example, to a method in which the additive is dissolved in water for mixing and kneading and then, is added during preparation of a cement composition together with the water for mixing and kneading, and to a method in which the additive is added to a cement composition that has been already kneaded up.

The amount for use of the cement additive are recommended to be from 0.005 to 2.5% against the cement in the cement composition as a weight % of a solid portion. If the amount is less than 0.005%, a property to prevent a slump loss may not be gotten. Also, if it becomes such a large amount exceeding 2.5%, there may occure such a problem as an economical disadvantage or a coagulation delay and an excess of air-entraining amount.

Mechanism of slump loss-preventing by the present invention may be assumed as follows. In general, a cement additive having a specially defined functional group is strongly adsorbed on cement particles and thus, these particles are dispersed effectively into water. However, a hydration reaction of cement further proceeds, a precipitating mineral which newly forms on the cement particles (ettringite etc.) adsorbs and accomodates the disperrsing agent, concentration of the cement additive in the solution decreases, and flocculation of the cement particles progresses. For prevention of this, the additive needs to be supplied by any means so that the cement additive concentration does not decrease in the system.

Thus, the present inventors carried out extensive research and, as a result, an additive was developed which, immediately after mixing and kneading in cement paste, shows only a weak adsorption ability for cement due to the molecular size of the crosslinked polymer and, with time passage, is going to be cut by an outside action (for example, hydrolysis with an alkali) into molecules having an adsorption ability. Conside ring t hat the cement additive in the present invention is added into cement. paste, an aqueous solution of a crosslinked polymer, that is a cement additive, is adjusted at pH 12 and stood with stirring at room temperature. As a result, the gel permeation chromatography (GPC) which shows molecular weight distribution of the crosslinked polymer varies greatly as shown in comparison between FIG. 1 and FIG. 2 and among FIGS. 3, 4, and 5.

Since the crosslinked polymer has the above specified bond between the main chains, the crosslinking bond is gradually cut in an alkaline medium. This is the reason why an ester bond in the above specified bond gradually undergoes hydrolysis by alkali. According to this, dispersion of cement is maintained for a long time.

Besides, a crosslinking agent or monomer (e) is able to have said specified bond, and this is able to be formed by a reaction the crosslinking agent and the water-soluble polymer in the post-crosslinking method. For example, in a case that between a crosslinking agent and a water-soluble polymer the one has a carboxyl group and the other has an epoxy group, the bond having a structure shown by said formula (I) by a reaction of the crosslinking agent and water-soluble polymer.

In the other side, since an ester bond which is directly bound to the main chain position and do not have a structure as shown by said formula (I) does not undergo cleavage in the above temperature range even in an alkali medium, to maintain the cement dispersion for a long time is difficult and the ability to prevent the slump loss is inferior.

However, even though an ester bond is directly bound to the main chain positon, if a hydroxy group is bound to a carbon atom position which is apart by one carbon atom from the ester bond, a hydrophilic character and an effect favorable for a hydrolysis reaction is obtained due to the hydroxyl group and, as a result, the ability to prevent the slump loss is elevated. A structure of this kind is formed, for example, with a reaction of a carboxyl group with an epoxy group. The crosslinking agent and monomer (e) leading a structure of this kind are excemplified as follows.

As the crosslinking agent, are cited ethylene glycol diglycidyl ether, polyethylene glycol diglycidyl ether, glycerol polyglycidyl ether, diglycerol polyglycidyl ether, polyglycerol polyglycidyl ether, sorbitol polyglycidyl ether, pentaerythritol polyglycidyl ether, propylene glycol diglycidyl ether, polypropylene glycol diglycidyl ether, resorcinol diglycidyl ether etc.

As the monomer (e) are cited monomers having the following structure.

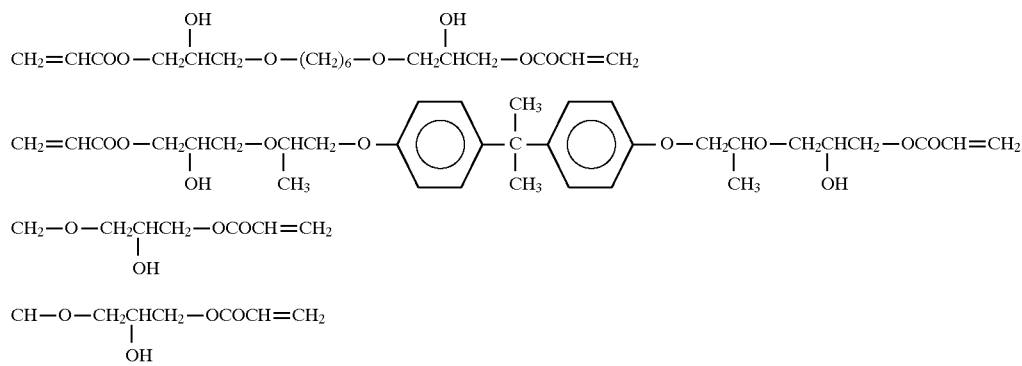

-continued

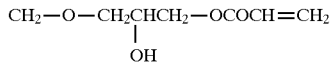

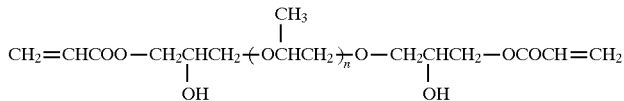

(Wherein n denotes 1, about 3, or about 11.)

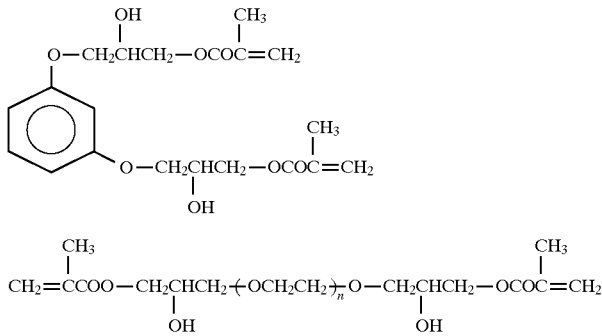

$$CH_2=\underset{CH_3}{C}COO-CH_2CHCH_2-(OCH_2CH_2)_n-O-CH_2CHCH_2-OCOC=CH_2$$
$$\quad\quad\quad\quad\quad\quad\quad\quad OH \quad\quad\quad\quad\quad OH$$

(Wherein n denotes 1, 2, or about 9.)

Besides, for the cement additive in the present invention the crosslinked polymer may be dissolved or dispersed. Here, the word of dispersion means that, for example, a microgel and so on which are by-produced during the production of the crosslinked polymer are dispersed in water. If the crosslinked polymer is, as above, dissolved or dispersed in water, it has an advantage of easy handling, the cement additive is used during preparation of the cement composition as a part or whole of the water for mixing and kneading. In addition, there does not take place such a problem as trouble in the dispersing stability (sedimentation etc.) which has often be seen in the hetherto-known cement additive.

In the case that said specific crosslinked polymer is dissolved or dispersed in water beforehand, the ratio of the crosslinked polymer to the water-soluble polymer may be optionally set and there is no special limitation.

The cement additive of the present invention is able to optionally control an extent of the ability to prevent the slump loss in a chemical sense by that the crossliking agent or the monomer (e) is changed or the kind of crosslinking agents or the monomer (e) is changed and combined. This fact is a very superior point in view of that other kinds of additives which have aimed the preventing effect on the slump loss show difficulty or impossibility in controlling the ability to prevent the slump loss. For example, in a method of that a copolymer of olefin with an ethylenic unsaturated dicarboxylic acid anhydride gradually undergoes a hydrolysis reaction in a cement composition (Japanese Official Patent Provisional Publication, showa 60-16851), it is necessary to enlarge the particle diameter of the copolymer in order to maintain the ability to prevent the slump loss for a long period and therby, there takes place sedimentation of particles in the additive. The crosslinked polymer in which a small amount of a crosslinking agent or the monomer (e) is contained is a liquid of relatively low viscosity and, therefore, it has a fundamentally good stability, while other kinds of additives which intend a preventive effect on the slump loss need to use a substance in a different phase with mixing and dispersing, so that these are of bad stability.

However, the cement additive of the present invention does not suffer any limitation by the above reason.

The cement additive of the present invention, as used in various cement compositions such as cement mortar and concrete etc., enables the composition to manifest high flowability without largely retarding their setting and prevent themselves from undergoing slump loss. Thus, it brings significant improvement in the workability when mortar work or concrete work being carried out.

Therefore, the cement additive in the present invention, of course, can be used effectively as an agent for imparting flowability to concrete, for example, ready-mixed concrete, and also its most characteristic point is that as an air-entraining high range water-reducing additive of simultaneous addition to plant, production of ready-mixed concrete having a composition of high ratio of water-reduction can be facilitated and flowability of the concrete can be maintained as constant. Furthermore, it can be used effectively as a high range water-reducing additive for producing a secondary concrete product.

Furthermore, as other examples, the additive is able to be effectively used, for example, for an assistant for grout of cement milk or mortar, and maintaining of flowing and prevention of material segregation etc. of a cement composition placed by a tremie pipe, an under water concrete, a concrete for a continuous under ground wall etc.

The method for producing a cement additive of the present invention is easy in making a design for a structure of a crosslinked polymer or a water-soluble polymer in a case of that the post-crosslinking method is used, and is able to produce a crosslinked polymer in a relatively fewer processes when the one-step crosslinking method is used, compared to those in the post-crosslinking method.

Since the cement composition relating to the present invention contains said specially defined cement additive, it does not bring a slump loss without causing a strength decrease in a hardening product and, therefore, it is so stable irrespective of time passage.

[BEST MODE FOR CARRYING OUT THE INVENTION]

Figure 1:
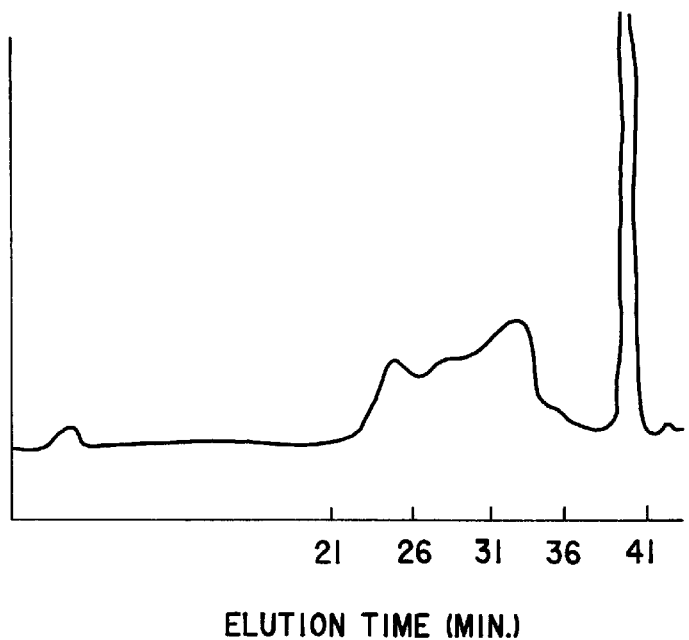
FIG. 1 is a GPC eluding curve for a crosslinked polymer which was obtained from the example 1.
Figure 2:
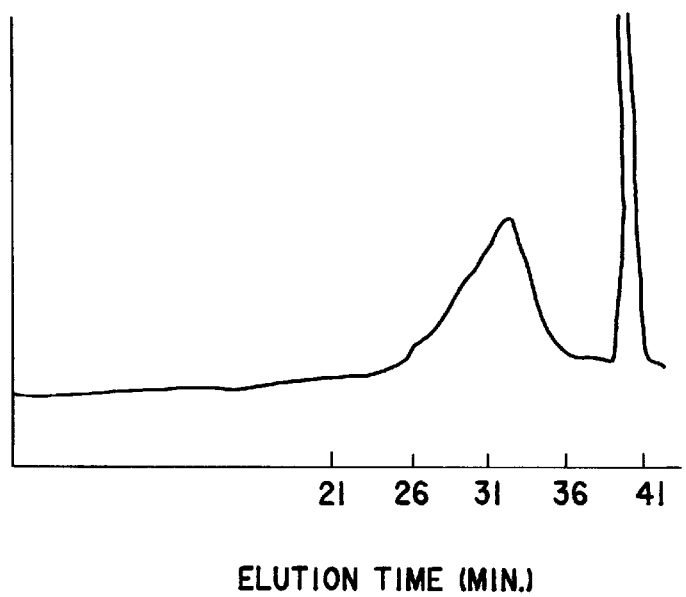
FIG. 2 is a GPC eluding curve for an aqueous solution of the same crosslinked polymer which was adjusted at pH 12 by adding an aqueous sodium hydroxide solution and stirred at room temperature for 10 minutes.

Next, the cement additive, the method for producing the same, and the cement composition of the present invention are explained in more detail with the following examples, but the present invention is not limited within these examples. Besides, unless otherwise specially stated, the % indicates a weight % and the part indicates a weight part. Hereinafter, a crosslinked polymer is referred to as a hydrophilic resin or a copolymer.

EXAMPLE 1

Into a glass-made reaction vessel equipped with a thermometer, a stirrer, dropping funnels, and a gas-inlet tube, and a reflux condenser were placed 164.2 parts of water, the inside atmosphere of the flask was replaced with stirring by nitrogen gas, and the flask was warmed to the boiling point under a nitrogen atmosphere. Then, to this were added a mixture solution composed of 62.9 parts of methoxypolyethylene glycol monomethacrylate ("NK-ester M-9G ", made by SHIN-NAKAMURA CHEMICAL Co., Ltd.; an average mole number of added ethylene oxide is 9), 16.7 parts of methacrylic acid, and 125.5 parts of water and, in addition, 24.6 parts of a 2.5 % aqueous ammonium persulfate solution during 4 hours. After the addition finished, furthermore, 6.1 parts of 2.5% aqueous ammonium persufate solution were added during 1 hour. Afer the addition completed, the mixture was maintained at the boiling point for 1 hour to complete a polymerization reaction, whereby a water-soluble polymer (1) was obtained. Then, to this polymer were added 3.2 parts of o-phthalic acid diglycidyl ester ("DENACOL EX-721", made by NAGASE CHEMICALS Co., Ltd.) and the mixture was maintained at the boiling point for 3 hours to complete a reaction. Then, the reaction mixture was completely neutralized with an aqueous sodium hydroxide, whereby a hydrophilic resin (1) was obtained.

EXAMPLE 2

The procedure of example 1 was repeated except that parts of o-phthalic acid diglycidyl ester, which is a polyfunctional compound, was 1.6 parts, whereby a hydrophilic resin (2) was obtained.

EXAMPLE 3

The procedure of example 1 was repeated except that 11.4 parts of polyethylene glycol diglycidyl ether ("DENACOL EX-861", made by NAGASE CHEMICALS Co., Ltd.; an average mole number of added ethylene oxide is about 22 ) were added instead of the o-phthalic acid diglycidyl ester, whereby a hydrophilic resin (3) was obtained.

EXAMPLE 4

The procedure of the example 1 was repeated except that 3.2 parts of adipic acid diglycidyl ester ("DENACOL EX-701", made by NAGASE CIIEMICALS Co., Ltd. ) were added instead of the o-phthalic acid diglycidyl ester, whereby a hydrophilic resin (4) was obtained.

EXAMPLE 5

Into a glass-made reaction vessel equipped with a thermometer, a stirrer, a dropping funnel, a gas-inlet tube, and a reflux condenser were placed 17.6 parts of 2-hydroxyethyl methacrylate ( hereinafter referred to as HEMA), 14.4 parts of methacrylic acid, 1.0 part of benzoyl peroxide ( hereinafter referred to as BPO ), and 127 parts of isopropyl alcohol ( hereinafter referred to as IPA ) and the inside atmosphere of the flask was replaced with stirring by nitrogen gas and the flask was warmed up to the boiling point. Next, to this flask was added during 2 hours a mixture solution composed of 20.9 parts of HEMA, 17.1 parts of methacrylic acid, 1.1 parts of BPO, and 150.9 parts of IPA and, after those addition finished, were further added during 1 hour 10.7 parts of a 7% IPA solution of BPO. After this addition finished, the mixture was further maintained at the boiling point for 1 hour to complete a polymerization reaction, whereby a water-soluble polymer (2) was obtained. Next, to this were added 6.0 parts of o-phthalic acid diglycidyl ester ("DENACOL EX-721", made by NAGASE CHEMICALS Co., Ltd.) and the mixture was maintained at the boiling point for 3 hours to complete a reaction and then, completely neutralized with an aqueous sodium hydroxide solution and treated with distillation to remove IPA, whereby a hydrophilic resin (5) was obtained.

EXAMPLE 6

The procedure of example 5 was repeated except that 21.5 parts of polyethylene glycol diglycidyl ether ("DENACOL EX-861", made by NAGASE CHEMICALS Co., Ltd.; an average mole number of added ethylene oxide is about 22) was added instead of o-phthalic acid diglycidyl ester, whereby a hydrophilic resin (6) was obtained.

EXAMPLE 7

Into a glass-made reaction vessel equipped with a thermometer, a stirrer, a dropping funnel, a gas-inlet tube, and a reflux condenser were placed 164.2 parts of water and the inside atmosphere of the flask was replaced with stirring with nitrogen gas and the flask was warmed up to the boiling point under a nitrogen atmosphere. Next, to this were added a mixture solution composed of 62.9 parts of polyethylene glycol polypropylene glycol methacrylate ("Blenmer 70PEP-350B", made by NIPPON OIL & FATS Co., Ltd.; an average mole number of added ethylene oxide is 7 and an average mole number of added propylene oxide is 3 ), 16.7 parts of methacrylic acid, and 125.5 parts of water, with 24.6 parts of a 2.5% aqueous ammonium persulfate solution during 4 hours and, after the addition finished, 6.1 parts of a 2.5 % aqueous ammonium persulfate solution were further added during 1 hour, After the addition finished, the mixture was further maintained at the boiling point for 1 hour to complete a polymerization reaction, whereby a water-soluble polymer (3) was obtained. Next, to this were added 12.8 parts of o-phthalic acid diglycidyl ester ("DENACOL EX-721", made by NAGASE CHEMICALS Co., Ltd. ) the mixture was maintained at the boiling point for 3 hours to complete a crosslinking reaction, whereby a hydrophilic resin (7) was obtained.

EXAMPLE 8

The procedure of example 7 was repeated except that 0.64 parts of o-phthalic acid diglycidyl ester of a polyfunctional type compound was used, whereby a hydrophilic resin (8) was obtained.

EXAMPLE 9

The procedure of example 7 was repeated except that 11.4 parts of polyethylene glycol diglycidyl ether ("DENACOL EX-861", made by NAGASE CHEMICALS Co., Ltd.; an average mole number of added ethylene oxide is about 22 ) was added instead of the o-phthalic acid diglycidyl ester used in the example 7, whereby a hydrophilic resin (9) was obtained.

EXAMPLE 10

Into a glass-made reaction vessel equipped with a thermometer, a stirrer, a dropping funnel, a gas-inlet tube, and a reflux condenser were placed 460.7 parts of water and the inside atmosphere of the flask was replaced with stirring with nitrogen gas and the flask was warmed up to 50° C. under the nitrogen atmosphere. In this flask was added a mixture solution composed of 191.2 parts of methoxypolyethylene glycol monomethacrylate ("NK-ester M-23G ", made by SHIN-NAKAMURA CHEMICAL Co., Ltd.; an average mole number of added ethylene oxide is 23 ), 8.0 parts of methacylic acid, 8.7 parts of a 16.5% aqueous sodium hydroxide solution, and 304.9 parts of water and furthermore, were added 11.8 parts of a 15% aqueous ammonium persulfate solution and 5.9 parts of a 15% aqueous sodium hydrogen sulfite solution during 2 hours and, after the addition finished, were further added 5.9 parts of a 15% aqueous ammonium persulfate solution and 2.9 parts of a 15% aqueous sodium hydrogen sulfite solution during 1 hour. After the addition finished, the reaction mixture was kept at 50° C. for 1 hour to complete a polymerization reaction, whereby a water-soluble polymer (4) was obtained. To this were added 13.8 parts of o-phthalic acid diglycidyl ester ("DENACOL EX-721", made by NAGASE CHEMICALS Co., Ltd.) and the mixture was maintained at the boiling point for 3 hours to complete a reaction, whereby a hydrophilic resin (10) was obtained.

EXAMPLE 11

The procedure of example 10 was repeated except that 27.3 parts of polyethylene glycol diglycidyl ether ("DENACOL EX-861", made by NAGASE CHEMICALS Co., Ltd.; an average mole number of added ethylene oxide is about 22 ) was added instead of the o-phthalic acid diglycidyl ester used in the example 10, whereby a hydrophilic resin (11) was obtained.

EXAMPLE 12

Into a glass-made reaction vessel equipped with a thermometer, a stirrer, a dropping funnel, a gas-inlet tube, and a reflux condenser were placed 216.2 parts of water and the inside atmosphere of the flask was replaced with stirring by nitrogen gas and the flask was warmed up to 90° C. under the nitrogen atmosphere. To this was added a mixture solution composed of 20.0 parts of methoxy-polyethylene glycol monomethacrylate ("NK-ester M-9G ", made by SHIN-NAKAMURA CHEMICAL Co., Ltd.; an average mole number of added ethylene oxide is 9 ), 86.2 parts of methacrylic acid, 72.1 parts of sodium methacrylate, and 278.9 parts of water, and furthermore, were added 137.0 parts of a 15% aqueous ammonium persulfate solution and 58.0 parts of a 15% aqueous sodium hydrogen sulfite solution during 4 hours and, after the addition finished, were added 34.3 parts of a 15% aqueous ammonium persulfate solution and 27.3 parts of a 15% aqueous sodium hydrogen sulfite solution during 1 hour. After the addition finished, the mixture was further maintained at 90° C. for 1 hour to complete a polymerization reaction, whereby a water-soluble polymer (5) was obtained. Next, to this were added 14.1 parts of o-phthalic acid diglycidyl ester ("DENACOL EX-721", made by NAGASE CHEMICALS Co., Ltd. ) and the reaction mixture was maintained at the boiling point for 3 hours to complete a reaction and then, completely neutralized with an aqueous sodium hydroxide solution, whereby a hydrophilic resin (12) was obtained.

EXAMPLE 13

Into a glass-made reaction vessel equipped with a thermometer, a stirrer, a dropping funnel, a gas-inlet tube, and a reflux condenser were placed 568.7 parts of water and the inside atmosphere of the flask was replaced with stirring by nitrogen gas and the flask was warmed up to the boiling point under the nitrogen atmosphere. To this was added a mixture solution composed of 40.0 parts of methoxypolyethylene glycol monomethacrylate ("NK-ester M-9G ", made by SHIN-NAKAMURA CHEMICAL Co., Ltd.; an average mole number of added ethylene oxide is 9 ), 127.4 parts of methacrylic acid, and 261.8 parts of water, and furthermore, were added 156.6 parts of a 2.5% aqueous sodium persulfate solution during 4 hours and, after the addition finished, the mixture was further maintained at the boiling point for 1 hour to complete a polymerization reaction, whereby a water-soluble polymer (6) was obtained. Next, to this were added 7.33 parts of o-phthalic acid diglycidyl ester ("DENACOL EX-721", made by NAGASE CHEMICALS Co., Ltd.) and the reaction mixture was maintained at the boiling point for 3 hours to complete a reaction and then, completely neutralized with an aqueous sodium hydroxide solution, whereby a hydrophilic resin (13) was obtained.

EXAMPLE 14

Into a glass-made reaction vessel equipped with a thermometer, a stirrer, a dropping funnel, a gas-inlet tube, and a reflux condenser were placed 176.4 parts of water and the inside atmosphere of the flask was replaced with stirring by nitrogen gas and the flask was warmed up to the boiling point under the nitrogen atmosphere. To this was added a mixture solution composed of 62.9 parts of methoxypolyethylene glycol monomethacrylate ("NK-ester M-9G ", made by SHIN-NAKAMURA CHEMICAL Co., Ltd.; an average mole number of added ethylene oxide is 9 ), 16.7 parts of methacrylic acid, and 125.5 parts of water, and 14.8 parts of a 2.5% aqueous ammonium persulfate solution during 4 hours and, after the addition finished, were added 3.7 parts of a 2.5% aqueous ammonium persulfate solution during 1 hour. After the addition finished, the mixture was further maintained at the boiling point for 1 hour to complete a polymerization reaction, whereby a water-soluble polymer (7) was obtained. Next, to this were added 0.64 parts of o-phthalic acid diglycidyl ester ("DENACOL EX-721", made by NAGASE CHEMICALS Co., Ltd.) and the reaction mixture was maintained at the boiling point for 3 hours to complete a reaction and then, completely neutralized with an aqueous sodium hydroxide solution, whereby a hydrophilic resin (14) was obtained.

EXAMPLE 15

Into a glass-made reaction vessel equipped with a thermometer, a stirrer, a dropping funnel, a gas-inlet tube, and a reflux condenser were placed 164.2 parts of water and the inside atmosphere of the flask was replaced with stirring by nitrogen gas and the flask was warmed up to the boiling point under the nitrogen atmosphere. To this was added a mixture solution composed of 62.9 parts of methoxypolyethylene glycol monomethacrylate (an average mole number of added ethylene oxide is 10), 16.7 parts of acrylic acid, and 125.5 parts of water, and 24.6 parts of a 2.5% aqueous ammonium persulfate solution during 4 hours and, after the addition finished, were added 6.1 parts of a 2.5% aqueous ammonium persulfate solution during 1 hour. After the addition finished, the mixture was further maintained at the boiling point for 1 hour to complete a polymerization reaction, whereby a water-soluble polymer (8) was obtained. Next, to this were added 3.2 parts of o-phthalic acid diglycidyl ester ("DENACOL EX-721", made by NAGASE CHEMICALS Co., Ltd.) and the reaction mixture was maintained at the boiling point for 3 hours to complete a reaction and then, completely neutralized with an aqueous sodium hydroxide solution, whereby a hydrophilic resin (15) was obtained.

EXAMPLE 16

The procedure of example 1 was repeated except that 3.2 parts of a compound having the following structure ("DENACOL EX-202", made by NAGASE CHEMICALS Co., Ltd.) were added instead of the o-phthalic acid diglycidyl ester used in the example 1, whereby a hydrophilic resin (16) was obtained.

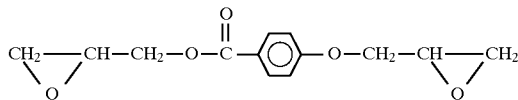

EXAMPLE 17

The procedure of example 1 was repeated except that 3.2 parts of polyethylene glycol diglycidyl ether ("DENACOL EX-841", made by NAGASE CHEMICALS Co., Ltd.; an average mole number of added ethylene oxide is about 13) were added instead of the o-phthalic acid diglycidyl ester used in the example 1, whereby a hydrophilic resin (17) was obtained.

EXAMPLE 18

The procedure of example 1 was repeated except that 3.2 parts of sorbitol polyglycidyl ether ("DENACOL EX-611", made by NAGASE CHEMICALS Co., Ltd.) were added instead of the o-phthalic acid diglycidyl ester used in the example 1, whereby a hydrophilic resin (18) was obtained.

The average molecular weights (weight average) of the water-soluble polymers above-obtained were determined by GPC and shown in Table 1. The conditions of GPC are as follows;

| | |
|---|---|
| Column: | TOSOH TSK gel G4000SW + G3000SW + G2000SW; |
| Eluent: | [0.05M-CH$_3$COONa aqueous solution (adjusted to pH 6.0 by CH$_3$COOH)]/ acetonitrile = 59/41 (vol. %); |
| Temperature: | 40° C.; |
| Flow rate: | 0.5 ml/min.; |
| Standard compound: | polyethylene glycol. |

Also, viscosity of the hydrophilic resins above-obtained was measured with a B-type rotational visocometer (VG-A1 type, made by SEIKI KOGYO RESEARCH Co., Ltd.), and results obtained are shown in the Table 1. The voscosity measurement was carried out about prepared 20% aqueous solutions or dispersions of the hydrophilic resins at a temperature of 20° C. with a rotation number of 60 r.p.m. in case that the viscosity of the resin solutions or dispersions was 10,000 cps or less, or with a rotation number of 6 r.p.m. in case that the viscosity was 10,000 to 100,000 cps.

EXAMPLE 19

Ordinary portland cement (made by Sumitomo Cement Co., Ltd.) was used as cement, river sand taken from Yodogawa as a a fine aggregate (specific gravity of 2.51 and a fineness modulas [F. M.] of 2.78 ), crashed stones from Takatsuki as a coarse aggregate ( specific gravity of 2.68 and a fineness modulas [F. M.] of 6.73 ) and the hydrophilic resin (1) obtained in the example 1 as a cement additive, and these materials were respectively weighted to make 30 l in amount of a kneaded mixture with a composition of a unit ratio of 320 kg/m$^3$ for cement, a unit ratio of 173 kg/m$^3$ for water (a ratio of water to cement, 54.2%), a unit ratio of 934 kg/m$^3$ for fine aggregate, a unit ratio of 876 kg/m$^3$ for coarse aggregate (a fine aggregate percentage of 52%), and an addition amount 0.12% of the hydrophilic resin (1) obtained from the example 1 (a ratio of the solid portion against cement), and then all the materials were placed into a tilting mixer. Immediately, the mixing and kneading were carried out for 3 minutes with 35 r.p.m. of a rotation number, whereby a fluid concrete having an object slump 18 cm and an object air amount 4.5% was prepared (in a case of that the object air amount is not attained, a slight amount of an air-entraining agent [Vinsol], made by Yamaso Chemical Co., Ltd. was used ). A fluid concrete immediately after the mixing and kneading was sampled and the slump and air amount were measured.

After the mixing and kneading, the rotation number of the tilting mixture was reduced to 3 r.p.m. and the mixing and kneading was further continued and then, after 60 minutes, 90 minutes, and 120 minutes, the slump and air amount were measured to investigate their changes with time-passage.

Also, the condensation strength and setting time of the flowing concrete obtained were measured. These measurement results are presented in Table 1.

Besides, the measurement methods for the slump, air amount, compressive strength, and setting time, and the method to take a sample for testing the compressive strength are based on the Japanese Industrial Standards (JIS A6204)

EXAMPLES 20 to 36

The procedure of example 19 were repeated except that the hydrophilic resins (2) to (18) obtained from the examples 2 to 18 are used as cement additives in the amounts shown in Table 1, and flowing concretes thus-prepared were measured in the slump, air amount, compressive strength, and setting time. Results obtained are shown in Table 1.

Example for comparison 1

The procedure of example 19 was repeated except that a commercially-available sodium naphthalenesulfonate-formalin condensation product was used in an addition amount of 0.35% ( against cement ) as a cement additive instead of the hydrophilic resin (1), and a flowing concrete for comparison thus-prepared was measured in the slump, air amount, compressive strength, and setting time. Results obtained are shown in Table 1.

Example for comparison 2

The procedure of example 19 was repeated except that commercially-available sodium ligninsulfonate was used in an addition amount of 0.35% (against cement) as a cement additive instead of the hydrophilic resin (1), and a flowing concrete for comparison thus-prepared was measured in the slump, air amount, compressive strength, and setting time. Results obtained are shown in Table 1.

Example for comparison 3

The procedure of example 19 was repeated except that the water-soluble polymer (1) obtained from the example 1 was used in an addition amount of 0.12% (against cement) as a cement additive instead of the hydrophilic resin (1) and a flowing concrete for comparison thus-prepared was measured in the slump, air amount, compressive strength, and setting time. Results obtained are shown in Table 1.

Example for comparison 4

The procedure of example 19 was repeated except that a commercially-available sodium naphthalenesulfonate-formalin condensation product and a water-highly absorbent resin (a crosslinked product of partially neutralized polyacrylic acid) was used in addition amounts of 0.35% and 0.1% (against cement), respectively, as cement additives instead of the hydrophilic resin (1), and a flowing concrete for comparison thus-prepared was measured in the slump, air amount, compressive strength, and setting time. Results obtained are shown in Table 1.

TABLE 1

| | Water-soluble polymer | | Cement admixture used | | | The upper side: Slump (cm) The middle side: Air amount (%) The under side: Residual % of slump (*3) | | | | Condensation strength at | Setting time |
|---|---|---|---|---|---|---|---|---|---|---|---|
| | No. | Molecular weight (*1) | | Viscosity (cps) (*2) | Addition amount (solid portion, %) (against cement) | Immediately after kneading | after 60 minutes | after 90 minutes | after 120 minutes | age of 28 days (kg/cm²) | (hour:minute) (beginning/ finishing) |
| Example 19 | (1) | 20,000 | Hydrophilic resin (1) | 3,500 | 0.12 | 17.7 4.9 — | 19.3 5.2 109 | 18.5 5.1 105 | 17.8 4.8 101 | 352 | 5:25/7:18 |
| Example 20 | (1) | 20,000 | Hydrophilic resin (2) | 30 | 0.12 | 18.7 4.3 — | 18.5 4.6 99 | 18.3 4.3 98 | 17.6 4.0 94 | 340 | 5:17/7:08 |
| Example 21 | (1) | 20,000 | Hydrophilic resin (3) | 1,010 | 0.12 | 18.0 4.8 — | 17.0 4.9 94 | 15.8 5.0 88 | 12.3 4.8 68 | 360 | 5:10/7:11 |
| Example 22 | (1) | 20,000 | Hydrophilic resin (4) | 3,000 | 0.12 | 18.4 4.6 — | 18.9 4.9 103 | 18.0 5.0 98 | 17.2 4.7 93 | 325 | 5:23/7:10 |
| Example 23 | (2) | 23,000 | Hydrophilic resin (5) | 2,800 | 0.18 | 18.3 4.1 — | 17.7 4.3 97 | 17.5 4.3 96 | 17.1 4.0 93 | 320 | 5:05/7:03 |
| Example 24 | (2) | 23,000 | Hydrophilic resin (6) | 120 | 0.18 | 17.8 4.6 — | 16.6 4.9 93 | 15.0 4.9 84 | 11.8 4.6 66 | 328 | 5:17/7:20 |
| Example 25 | (3) | 18,000 | Hydrophilic resin (7) | 82 | 0.14 | 17.3 4.8 — | 20.2 4.9 117 | 19.8 5.0 114 | 18.8 4.7 109 | 365 | 5:36/7:29 |
| Example 26 | (3) | 18,000 | Hydrophilic resin (8) | 30 | 0.10 | 18.8 4.8 — | 17.0 5.2 90 | 16.8 5.2 89 | 16.6 5.0 88 | 332 | 5:18/7:21 |
| Example 27 | (3) | 18,000 | Hydrophilic resin (9) | 39 | 0.12 | 18.5 4.9 — | 17.3 5.3 94 | 15.4 5.1 83 | 11.2 4.8 61 | 315 | 5:27/7:13 |
| Example 28 | (4) | 26,000 | Hydrophilic resin (10) | 76 | 0.20 | 17.5 4.0 — | 18.3 4.3 105 | 18.0 4.5 103 | 17.3 4.2 99 | 310 | 5:10/7:07 |
| Example 29 | (4) | 26,000 | Hydrophilic resin (11) | 46 | 0.20 | 18.3 4.5 — | 17.1 4.9 93 | 14.9 4.7 81 | 10.8 4.4 59 | 327 | 5:40/7:28 |
| Example 30 | (5) | 15,000 | Hydrophilic resin (12) | 33 | 0.30 | 17.4 3.8 — | 18.0 3.5 103 | 17.8 3.6 102 | 17.2 3.4 99 | 310 | 6:10/8:05 |
| Example 31 | (6) | 18,000 | Hydrophilic resin (13) | 180 | 0.15 | 19.0 5.3 — | 17.0 4.8 89 | 17.2 4.9 91 | 17.0 4.3 89 | 323 | 5:13/7:13 |
| Example 32 | (7) | 87,000 | Hydrophilic resin (14) | 2,600 | 0.16 | 18.2 4.1 — | 18.4 4.7 101 | 18.0 4.8 99 | 17.2 4.6 95 | 330 | 5:08/7:18 |
| Example 33 | (8) | 18,000 | Hydrophilic resin (15) | 3,500 | 0.12 | 18.3 4.8 — | 17.9 5.2 98 | 17.5 4.9 96 | 17.1 4.6 93 | 340 | 5:15/7:23 |
| Example 34 | (1) | 20,000 | Hydrophilic resin (16) | 6,000 | 0.25 | 5.0 3.2 — | 18.0 5.9 360 | 19.5 5.9 390 | 18.3 5.8 366 | 343 | 5:52/7:49 |
| Example 35 | (1) | 20,000 | Hydrophilic resin (17) | 4,000 | 0.40 | 18.0 4.1 — | 17.5 4.3 97 | 16.1 4.5 89 | 12.7 4.0 71 | 329 | 5:30/7:28 |

TABLE 1-continued

| | Water-soluble polymer | | Cement admixture used | | | The upper side: Slump (cm) The middle side: Air amount (%) The under side: Residual % of slump (*3) | | | | Condensation strength at | Setting time |
|---|---|---|---|---|---|---|---|---|---|---|---|
| | No. | Molecular weight (*1) | | Viscosity (cps) (*2) | Addition amount (solid portion, %) (against cement) | Immediately after kneading | after 60 minutes | after 90 minutes | after 120 minutes | age of 28 days (kg/cm$^2$) | (hour:minute) (beginning/ finishing) |
| Example 36 | (1) | 20,000 | Hydrophilic resin (18) | 4,800 | 0.12 | 18.2 4.8 — | 16.8 4.9 92 | 14.2 4.6 78 | 10.4 4.2 57 | 338 | 5:24/7:19 |
| Example for comparison 1 | — | — | NSF (*4) | — | 0.35 | 18.6 4.3 — | 8.3 4.0 45 | — — — | — — — | 321 | 5:13/7:01 |
| Example for comparison 2 | — | — | LS (*5) | — | 0.35 | 18.8 5.2 — | 9.8 5.6 52 | — — — | — — — | 334 | 5:24/7:18 |
| Example for comparison 3 | — | — | Water-soluble polymer (1) | — | 0.12 | 18.3 4.4 — | 13.3 4.8 73 | — — — | — — — | 320 | 5:21/7:31 |
| Example for comparison 4 | — | — | NSF+ High water-absorbent resin (*6) | — | 0.35 0.10 | 17.4 5.3 — | 10.4 6.0 60 | — — — | — — — | 313 | 7:10/9:45 |

(*1) Measured by G.P.C.
(*2) Measured b a B type rotational viscometer at 20° C. and 20%
(*3) Residual percentage of slump (%) = $\frac{\text{slump after 60 min. (90 min. or 120 min.)}}{\text{slump immediately after kneading}} \times 100$
(*4) NSF: Sodium naphthalenesulfonate-formalin condensation product
(*5) LS: Sodium ligninsulfonate
(*6) a partially neutralized crosslinked product of polyacrylic acid

EXAMPLE 37

Into a glass-made reaction vessel equipped with a thermometer, a stirrer, a dropping funnel, a gas-inlet tube, and a reflux condenser were placed 147.4 parts of water and the inside atmosphere of the flask was replaced with stirring by nitrogen gas and the flask was warmed up to 90° C. under the nitrogen atmosphere. To this were added a mixture solution composed of 48.0 parts of methacrylic acid and 75.1 parts of water, a mixture solution composed of 32.0 parts of 2-acrylamido-2-methylpropanesulfonic acid and 50.1 parts of water, and 31.6 parts of a 15% aqueous ammonium persulfate solution during 2 hours and, after the addition finished, were added 15.8 parts of a 15% aqueous ammonium persulfate solution during 1 hour. After the addition finished, the mixture was further maintained at 90° C. for 1 hour to complete a polymerization reaction, whereby a water-soluble polymer (37) was obtained. Next, to this were added 46.2 parts of water and 5.63 parts of o-phthalic acid diglycidyl ester ("DENACOL EX-721", made by NAGASE CHEMICALS Co., Ltd. ) and the reaction mixture was maintained at the boiling point for 3 hours to complete a reaction and then, completely neutralized with an aqueous sodium hydroxide solution, whereby a hydrophilic resin (37) was obtained.

EXAMPLE 38

The procedure of example 37 was repeated except that 20.8 parts of o-phthalic acid diglycidyl ester for the crosslinking agent were used, whereby a hydrophilic resin (38) was obtained.

EXAMPLE 39

The procedure of example 37 was repeated except that 6.00 parts of adipic acid diglycidyl ester ("DENACOL EX-701", made by NAGASE CHEMICALS Co., Ltd.) were added instead of the o-phthalic acid diglycidyl ester used in the example 37, whereby a hydrophilic resin (39) was obtained.

EXAMPLE 40

Into a glass-made reaction vessel equipped with a thermometer, a stirrer, a dropping funnel, a gas-inlet tube, and a reflux condenser were placed 147.4 parts of water and the inside atmosphere of the flask was replaced with stirring by nitrogen gas and the flask was warmed up to 90° C. under the nitrogen atmosphere. To this were added a mixture solution composed of 48.0 parts of methacrylic acid and 75.1 parts of water, a mixture solution composed of 32.0 parts of 2-acrylamido-2-methylpropanesulfonic acid and 50.1 parts of water, and 31.7 parts of a 30.0% aqueous ammonium persulfate solution during 2 hours and, after the addition finished, 15.8 parts of a 30.0% aqueous ammonium persulfate solution during 1 hour. After the addition finished, the mixture was further maintained at 90° C. for 1 hour to complete a polymerization reaction, whereby a water-soluble polymer (38) was obtained. Next, to this were added 2.24 parts of o-phthalic acid diglycidyl ester ("DENACOL EX-721", made by NAGASE CHEMICALS Co., Ltd.) and the reaction mixture was maintained at the boiling point for 3 hours to complete a reaction and then, completely neutralized with an aqueous sodium hydroxide solution, whereby a hydrophilic resin (40) was obtained.

EXAMPLE 41

Into a glass-made reaction vessel equipped with a thermometer, a stirrer, a dropping funnel, a gas-inlet tube, and a reflux condenser were placed 147.4 parts of water and the inside atmosphere of the flask was replaced with stirring by nitrogen gas and the flask was warmed up to 90° C. under the nitrogen atmosphere. To this were added a mixture solution composed of 48.0 parts of methacrylic acid and 75.1 parts of water, a mixture solution composed of 32.0 parts of 2-acrylamido-2-methylpropanesulfonic acid and 50.1 parts of water, and 31.6 parts of a 7.5% aqueous ammonium persulfate solution during 2 hours and, after the addition finished, 15.8 parts of a 7.5% aqueous ammonium persulfate solution during 1 hour. After the addition finished, the mixture was further maintained at 90° C. for 1 hour to complete a polymerization reaction, whereby a water-soluble polymer (39) was obtained. Next, to this were added 1.88 parts of o-phthalic acid diglycidyl ester ("DENACOL EX-721", made by NAGASE CIIEMICALS Co., Ltd.) and the reaction mixture was maintained at the boiling point for 3 hours to complete a reaction and then, completely neutralized with an aqueous sodium hydroxide solution, whereby a hydrophilic resin (41) was obtained.

EXAMPLE 42

Into a glass-made reaction vessel equipped with a thermometer, a stirrer, a dropping funnel, a gas-inlet tube, and a reflux condenser were placed 614.4 parts of water and the inside atmosphere of the flask was replaced with stirring by nitrogen gas and the flask was warmed up to 90° C. under the nitrogen atmosphere. To this were added a mixture solution composed of 324.0 parts of methacrylic acid and 506.8 parts of water, a mixture solution composed of 36.0 parts of 2-acrylamido-2-methylpropanesulfonic acid and 56.3 parts of water, and 175.0 parts of a 15% aqueous ammonium persulfate solution during 2 hours and, after the addition finished, were further added 87.5 parts of a 15% aqueous ammonium persulfate solution during 1 hour. After the addition finished, the mixture was further maintained at 90° C. for 1 hour to complete a polymerization reaction, whereby a water-soluble polymer (40) was obtained. Next, to this were added 62.5 parts of o-phthalic acid diglycidyl ester ("DENACOL EX-721", made by NAGASE CHEMICALS Co., Ltd.) and the reaction mixture was maintained at the boiling point for 3 hours to complete a reaction and then, completely neutralized with an aqueous sodium hydroxide solution, whereby a hydrophilic resin (42) was obtained.

EXAMPLE 43

Into a glass-made reaction vessel equipped with a thermometer, a stirrer, a dropping funnel, a gas-inlet tube, and a reflux condenser were placed a mixture composed of 14.4 parts of 2-hydroxyethyl methacrylate, 3.2 parts of 2-acrylamido-2-methylpropanesulfonic acid, 14.4 parts of methacrylic acid, 0.96 parts of BPO, and 127.0 parts of IPA and the inside atmosphere of the flask was replaced with stirring by nitrogen gas and the mixture was warmed up to the boiling point. Next, to this flask was added during 2 hours a mixture composed of 17.1 parts of 2-hydroxyethyl methacrylate, 3.8 parts of 2-acrylamido-2-methylpropane-sulfonic acid, 17.1 parts of methacrylic acid, 1.14 parts of BPO, and 150.9 parts of IPA and, after those addition finished, were added during 1 hour a mixture composed of 0.70 parts of BPO and 10.0 parts of IPA. After this addition finished, the mixture was furthermore maintained at the boiling point for 1 hour to complete a polymerization reaction, and then partially neutralized with an aqueous sodium hydroxide solution and treated with distillation to remove IPA, whereby whereby a water-soluble polymer (41) was obtained. Next, 380.0 parts of an aqueous solution of the water-soluble polymer (41) whose concentration was adjusted at 20% and 3.10 parts of o-phthalic acid diglycidyl ester ("DENACOL EX-721", made by NAGASE CHEMICALS Co., Ltd.) were added and maintained at the boiling point for 3 hours to complete a reaction and then, completely neutralized with an aqueous sodium hydroxide solution, whereby a hydrophilic resin (43) was obtained.

EXAMPLE 44

The procedure of example 43 was repeated except that 2.50 parts of ethylene glycol diglycidyl ether ("DENACOL EX-810", made by NAGASE CHEMICALS Co., Ltd.) were added instead of o-phthalic acid diglycidyl ester in the example 43, whereby a hydrophilic resin (44) was obtained.

EXAMPLE 45

Into a glass-made reaction vessel equipped with a thermometer, a stirrer, a dropping funnel, a gas-inlet tube, and a reflux condenser were placed a mixture composed of 14.4 parts of 2-hydroxyethyl methacrylate, 3.2 parts of 2-acrylamido-2-methylpropanesulfonic acid, 14.4 parts of methacrylic acid, 1.14 parts of BPO, and 127.0 parts of IPA and the inside atmosphere of the flask was replaced with stirring by nitrogen gas and the mixture was warmed up to the boiling point. Next, to this flask was added during 2 hours a mixture composed of 17.1 parts of 2-hydroxyethyl methacrylate, 3.8 parts of 2-acrylamido-2-methylpropane-sulfonic acid, 17.1 parts of methacrylic acid, 1.36 parts of BPO, and 150.9 parts of IPA and, after those addition finished, were added during 1 hour a mixture composed of 0.83 parts of BPO and 10.0 parts of IPA. After this addition finished, the mixture was furthermore maintained at the boiling point for 1 hour to complete a polymerization reaction, and then partially neutralized with an aqueous sodium hydroxide solution and treated with distillation to remove IPA, whereby a water-soluble polymer (42) was obtained. Next, 380.0 parts of an aqueous solution of the water-soluble polymer whose concentration was adjusted at 20% and 3.10 parts of o-phthalic acid diglycidyl ester ("DENACOL EX-721", made by NAGASE CHEMICALS Co., Ltd.) were added and maintained at the boiling point for 3 hours to complete a reaction and then, completely neutralized with an aqueous sodium hydroxide solution, whereby a hydrophilic resin (45) was obtained.

EXAMPLE 46

Into a glass-made reaction vessel equipped with a thermometer, a stirrer, a dropping funnel, a gas-inlet tube, and a reflux condenser were placed 147.4 parts of water and the inside atmosphere of the flask was replaced with stirring by nitrogen gas and the flask was warmed up to 90 ° C. under the nitrogen atmosphere. To this were added a mixture solution composed of 32.0 parts of 2-acrylamido-2-methylpropanesulfonic acid and 50.1 parts of water, a mixture solution composed of 48.0 parts of acrylic acid and 75.1 parts of water, and 31.6 parts of a 15% aqueous ammonium persulfate solution during 2 hours and, after the addition finished, were further added 15.8 parts of a 15% aqueous ammonium persulfate solution during 1 hour. After completion of the addition, the mixture was further maintained at 90° C. for 1 hour to complete a polymerization reaction, whereby a water-soluble polymer (43) was obtained. Next, to this were added 46.2 parts of water and 5.63 parts of o-phthalic acid diglycidyl ester ("DENACOL EX-721", made by NAGASE CHEMICALS Co., Ltd.) and the reaction mixture was maintained at the boiling point for 3 hours to complete a reaction and then, completely neutralized with an aqueous sodium hydroxide solution, whereby a hydrophilic resin (46) was obtained.

EXAMPLE 47

The procedure of example 46 was repeated except that 5.02 parts of adipic acid diglycidyl ester ("DENACOL EX-701", made by NAGASE CHEMICALS Co., Ltd.) were added instead of o-phthalic acid diglycidyl ester used in the example 46, whereby a hydrophilic resin (47) was obtained.

EXAMPLE 48

The procedure of example 37 was repeated except that 5.6 parts of polyethylene glycol diglycidyl ether ("DENACOL EX-841", made by NAGASE ChEMICALS Co., Ltd.; an average mole number of added ethylene oxide is about 13) were added instead of o-phthalic acid diglycidyl ester used in the example 37, whereby a hydrophilic resin (48) was obtained.

EXAMPLE 49

Into a glass-made reaction vessel equipped with a thermometer, a stirrer, a dropping funnel, a gas-inlet tube, and a reflux condenser were placed 164.2 parts of water and the inside atmosphere of the flask was replaced with stirring with nitrogen gas and the flask was warmed up to the boiling point under the nitrogen atmosphere. In this flask were added a mixture solution composed of 52.9 parts of methoxypolyethylene glycol monomethacrylate ("NK-ester M-9G", made by SIIIN-NAKAMURA CHEMICAL Co., Ltd.; an average mole number of added ethylene oxide is 9), 10.0 parts of 2-acrylamido-2-methylpropanesulfonic acid, 16.7 parts of methacylic acid, and 125.5 parts of water, and 24.6 parts of a 2.5% aqueous ammonium persulfate solution during 4 hours and, after the addition finished, were further added 6.1 parts of a 2.5% aqueous ammonium persulfate solution during 1 hour. After completion of the addition, the reaction mixture was further maintained at the boiling point for 1 hour to complete a polymerization reaction, whereby a water-soluble polymer (44) was obtained. To this were added 3.2 parts of o-phthalic acid diglycidyl ester ("DENACOL EX-721", made by NAGASE CIIEMICALS Co., Ltd.) and the mixture was maintained at the boiling point for 3 hours to complete a reaction and then, completely neutralized with an aqueous sodium hydroxide solution, whereby a hydrophilic resin (49) was obtained.

The average molucular weights (weight average) of the above-obtained water-soluble polymers were measured by GPC under said condition and results obtained are shown in the Table 2.

Also, viscosity of the above-obtained hydrophilic resins were measured in said way and results obtained are shown in the Table 2.

EXAMPLE 50

Ordinary portland cement (made by Sumitomo Cement Co., Ltd.) was used as cement, river sand taken from Yodogawa as a a fine aggregate (specific gravity of 2.51 and a fineness modulas [F. M.] of 2.78), crashed stone from Takatsuki as a coarse aggregate (specific gravity of 2.68 and a fineness modulas [F. M.] of 6.73), and the hydrophilic resin (37) obtained in the example 37 as a cement additive, and these materials were respectively weighted to make 30 l in amount of a kneaded mixture with a composition of a unit ratio of 320 kg/m$^3$ for cement, a unit ratio of 173 kg/m$^3$ for water (a ratio of water to cement, 54.2% ), a unit ratio of 934 kg/m$^3$ for fine aggregate, a unit ratio of 876 kg/m$^3$ for coarse aggregate (a fine aggregate percentage of 52% ), and an addition amount 0.23% of the hydrophilic resin (37) (a solid portion ratio against the cement), and then all the materials were placed into a tilting mixer. Immediately, the mixing and kneading were carried out for 3 minutes with 35 r.p.m. of a rotation number, whereby a flowing concrete having an object slump 18 cm and an object air amount 4.5% was prepared (in a case of that the object air amount is not attained, a slight amount of an air-entraining agent [Vinsol], made by Yamaso Chemical Co., Ltd. was used). A flowing concrete immediately after the mixing and kneading was sampled and the slump and air amount were measured.

After the mixing and kneading, the rotation number of the tilting mixture was reduced to 3 r.p.m. and the mixing and kneading was further continued and then, after 60 minutes, 90 minutes, and 120 minutes, the slump and air amount were measured to investigate their changes with time-passage.

Also, the compressive strength and setting time of the flowing concrete obtained were measured. These measurement results are presented in Table 2.

Besides, the measurement methods for the slump, air amount, compressive strength, and setting time, and the method to take samples for testing the compressive strength are based on the JIS A6204 (Japanese Industrial Standard).

EXAMPLES 51 to 62

The procedure of example 50 was repeated except that the hydrophilic resins (38) to (49) obtained from the examples 38 to 49 are used as cement additives in the amounts shown in Table 2, and the flowing concretes thus-prepared were measured in the slump, air amount, compressive strength, and setting time. Results obtained are shown in Table 2.

Example for comparison 5

The procedure of example 50 was repeated except that the water-soluble polymer (37) obtained from the example 37 was used in an addition amount of 0.32% (against cement) as a cement additive instead of the hydrophilic resin (37), and a flowing concrete for comparison thus-prepared was measured in the slump, air amount, compressive strength, and setting time. Results obtained are shown in Table 2.

TABLE 2

| | Water-soluble polymer | | Cement admixture used | | | The upper side: Slump (cm) The middle side: Air amount (%) The under side: Residual % of slump (*3) | | | | Condensation strength at | Setting time |
|---|---|---|---|---|---|---|---|---|---|---|---|
| | No. | Molecular weight (*1) | | Viscosity (cps) (*2) | Addition amount (solid portion, %) (against cement) | Immediately after kneading | after 60 minutes | after 90 minutes | after 120 minutes | age of 28 days (kg/cm$^2$) | (hour:minute) (beginning/ finishing) |
| Example 50 | (37) | 15,000 | Hydrophilic resin (37) | 30.5 | 0.23 | 18.2 4.3 — | 16.9 4.5 93 | 16.5 4.6 91 | 16.2 4.4 89 | 358 | 5:41/7:38 |
| Example 51 | (37) | 15,000 | Hydrophilic resin (38) | 2,790 | 0.24 | 17.8 5.0 — | 18.0 4.6 101 | 18.2 4.8 102 | 17.6 4.6 99 | 363 | 5:08/7:12 |
| Example 52 | (37) | 15,000 | Hydrophilic resin (39) | 35.0 | 0.23 | 18.6 4.8 — | 19.0 5.0 102 | 18.8 5.1 101 | 17.8 4.6 96 | 340 | 5:19/7:20 |

TABLE 2-continued

| | Water-soluble polymer | | Cement admixture used | | | The upper side: Slump (cm) The middle side: Air amount (%) The under side: Residual % of slump (*3) | | | | Condensation strength at age of 28 days (kg/cm$^2$) | Setting time (hour:minute) (beginning/finishing) |
|---|---|---|---|---|---|---|---|---|---|---|---|
| | No. | Molecular weight (*1) | | Viscosity (cps) (*2) | Addition amount (solid portion, %) (against cement) | Immediately after kneading | after 60 minutes | after 90 minutes | after 120 minutes | | |
| Example 53 | (38) | 6,600 | Hydrophilic resin (40) | 14.3 | 0.18 | 18.4<br>4.8<br>— | 18.3<br>5.0<br>99 | 17.8<br>5.0<br>97 | 17.2<br>4.5<br>93 | 330 | 5:19/7:21 |
| Example 54 | (39) | 52,000 | Hydrophilic resin (41) | 1,200 | 0.25 | 17.3<br>3.8<br>— | 18.2<br>4.2<br>105 | 18.0<br>4.5<br>104 | 17.3<br>4.2<br>100 | 324 | 5:41/7:33 |
| Example 55 | (40) | 8,000 | Hydrophilic resin (42) | 7,800 | 0.33 | 19.4<br>5.2<br>— | 18.0<br>4.3<br>93 | 17.5<br>4.3<br>90 | 17.0<br>4.1<br>88 | 318 | 6:05/7:53 |
| Example 56 | (41) | 12,000 | Hydrophilic resin (43) | 18.7 | 0.20 | 18.3<br>5.4<br>— | 18.9<br>5.0<br>103 | 18.5<br>5.2<br>101 | 17.8<br>4.6<br>97 | 334 | 5:27/7:27 |
| Example 57 | (41) | 12,000 | Hydrophilic resin (44) | 17.2 | 0.20 | 18.6<br>4.7<br>— | 17.9<br>4.5<br>96 | 15.1<br>4.3<br>81 | 11.5<br>4.1<br>62 | 325 | 5:30/7:23 |
| Example 58 | (42) | 6,000 | Hydrophilic resin (45) | 13.1 | 0.18 | 18.0<br>4.5<br>— | 17.5<br>4.9<br>97 | 17.3<br>5.0<br>96 | 17.1<br>4.6<br>95 | 320 | 5:20/7:15 |
| Example 59 | (43) | 17,000 | Hydrophilic resin (46) | 34.2 | 0.21 | 19.0<br>4.2<br>— | 17.2<br>4.5<br>91 | 17.5<br>4.7<br>92 | 17.0<br>4.3<br>89 | 329 | 5:30/7:13 |
| Example 60 | (43) | 17,000 | Hydrophilic resin (47) | 33.8 | 0.21 | 18.5<br>4.3<br>— | 17.9<br>4.4<br>97 | 17.6<br>4.7<br>95 | 17.2<br>4.1<br>93 | 335 | 5:15/7:11 |
| Example 61 | (37) | 15,000 | Hydrophilic resin (48) | 35.4 | 0.35 | 17.8<br>4.1<br>— | 17.2<br>4.1<br>97 | 14.8<br>3.8<br>83 | 12.1<br>3.7<br>68 | 321 | 5:30/7:19 |
| Example 62 | (44) | 18,000 | Hydrophilic resin (49) | 3,400 | 0.12 | 17.2<br>4.0<br>— | 16.8<br>4.2<br>98 | 16.6<br>4.5<br>97 | 16.0<br>4.3<br>93 | 334 | 5:28/7:34 |
| Example for comparison 5 | — | — | Water-soluble polymer (37) | — | 0.32 | 18.9<br>3.8<br>— | 7.0<br>3.9<br>37 | —<br>—<br>— | —<br>—<br>— | 303 | 6:53/9:05 |

(*1) Measured by G.P.C.
(*2) Measured by a B type rotational viscometer at 20° C. and 20%
(*3) Residual percentage of slump (%) = $\frac{\text{slump after 60 min. (90 min. or 120 min.)}}{\text{slump immediately after kneading}} \times 100$

EXAMPLE 63

Into a glass-made reaction vessel equipped with a thermometer, a stirrer, a dropping funnel, a gas-inlet tube, and a reflux condenser were placed 37.2 parts of water and the inside atmosphere of the flask was replaced with stirring by nitrogen gas and the flask was warmed up to 95° C. under the nitrogen atmosphere. To this were added a mixture solution composed of 5 parts of sodium 2-sulfoethyl methacrylate, 15 parts of acrylic acid, and 30 parts of water, and 8.5 parts of a 5% aqueous ammonium persulfate solution during 2 hours and, after the addition finished, were further added 4.3 parts of a 5% aqueous ammonium persulfate solution during 1 hour. After completion of the addition, the mixture was further maintained at 95° C. for 1 hour to complete a polymerization reaction, whereby a water-soluble polymer (63) having an average molecular weight of 5200 was obtained.

Next, to this were added 1.0 part of o-phthalic acid diglycidyl ester ("DENACOL EX-721", made by NAGASE CHEMICALS Co., Ltd.) and the reaction mixture was maintained at the boiling point for 3 hours to complete a reaction and then, completely neutralized with an aqueous sodium hydroxide solution, whereby a hydrophilic resin (63) was obtained.

EXAMPLE 64

The procedure of example 63 was repeated except that 1.0 part of adipic acid diglycidyl ester ("DENACOL EX-701", made by NAGASE CHEMICALS Co., Ltd.) was added instead of o-phthalic acid diglycidyl ester used in the example 63, whereby a hydrophilic resin (64) was obtained.

EXAMPLE 65

Into a glass-made reaction vessel equipped with a thermometer, a stirrer, a dropping funnel, a gas-inlet tube, and a reflux condenser were placed 39.3 parts of water and the inside atmosphere of the flask was replaced with stirring by nitrogen gas and the flask was warmed up to 95° C. under the nitrogen atmosphere. To this were added a mixture solution composed of 10 parts of sodium 2-sulfoethyl methacrylate, 10 parts of acrylic acid, and 30 parts of water, and 7.1 parts of a 5% aqueous ammonium persulfate solution during 2 hours and, after the addition finished, were further added 3.6 parts of a 5% aqueous ammonium persulfate solution during 1 hour. After completion of the addition, the mixture was further maintained at 95° C. for 1 hour to complete a polymerization reaction, whereby a water-soluble polymer (64) having an average molecular weight of 4800 was obtained.

Next, to this were added 2.0 parts of o-phthalic acid diglycidyl ester ("DENACOL EX-721", made by NAGASE CHEMICALS Co., Ltd.) and the reaction mixture was maintained at the boiling point for 3 hours to complete a reaction and then, completely neutralized with an aqueous sodium hydroxide solution, whereby a hydrophilic resin (65) was obtained.

EXAMPLE 66

The procedure of example 65 was repeated except that 2.0 parts of polyethylene glycol diglycidyl ether (an average mole number of added ethylene oxide is 9)("DENACOL EX-832", made by NAGASE CHEMICALS Co., Ltd.) was added instead of o-phthalic acid diglycidyl ester used in the example 65, whereby a hydrophilic resin (66) was obtained.

EXAMPLE 67

Into a glass-made reaction vessel equipped with a thermometer, a stirrer, a dropping funnel, a gas-inlet tube, and a reflux condenser were placed 37.2 parts of water and the inside atmosphere of the flask was replaced with stirring by nitrogen gas and the flask was warmed up to 95° C. under the nitrogen atmosphere. To this were added a mixture solution composed of 5 parts of sodium 2-sulfoethyl methacrylate, 15 parts of acrylic acid, and 30 parts of water, and 8.5 parts of a 2.3% aqueous ammonium persulfate solution during 2 hours and, after the addition finished, were further added 4.3 parts of a 2.3% aqueous ammonium persulfate solution during 1 hour. After completion of the addition, the mixture was further maintained at 95° C. for 1 hour to complete a polymerization reaction, whereby a water-soluble polymer (65) having an average molecular weight of 20000 was obtained.

Next, to this were added 1.0 part of o-phthalic acid diglycidyl ester ("DENACOL EX-721", made by NAGASE CHEMICALS Co., Ltd.) and there action mixture was maintained at the boiling point for 3 hours to complete a reaction and then, completely neutralized with an aqueous sodium hydroxide solution, whereby a hydrophilic resin (67) was obtained.

EXAMPLE 68

The procedure of example 63 was repeated except that 1.2 parts of adipic acid diglycidyl ester ("DENACOL EX-701", made by NAGASE CHEMICALS Co., Ltd.) was added instead of o-phthalic acid diglycidyl ester used in the example 63, whereby a hydrophilic resin (68) was obtained.

EXAMPLE 69

Into a glass-made reaction vessel equipped with a thermometer, a stirrer, a dropping funnel, a gas-inlet tube, and a reflux condenser were placed 42.8 parts of water and the inside atmosphere of the flask was replaced with stirring by nitrogen gas and the flask was warmed up to 95° C. under the nitrogen atmosphere. To this were added a mixture solution composed of 12 parts of sodium 3-sulfopropoxyethylene glycol monoacrylate, 8 parts of acrylic acid, and 30 parts of water, and 4.8 parts of a 5% aqueous ammonium persulfate solution during 2 hours and, after the addition finished, were further added 2.4 parts of a 5% aqueous ammonium persulfate solution during 1 hour. After completion of the addition, the mixture was further maintained at 95° C. for 1 hour to complete a polymerization reaction, whereby a water-soluble polymer (66) having an average molecular weight of 6500 was obtained.

Next, to this were added 1.0 part of o-phthalic acid diglycidyl ester ("DENACOL EX-721", made by NAGASE CHEMICALS Co., Ltd.) and the reaction mixture was maintained at the boiling point for 3 hours to complete a reaction and then, completely neutralized with an aqueous sodium hydroxide solution, whereby a hydrophilic resin (69) was obtained.

EXAMPLE 70

Into a glass-made reaction vessel equipped with a thermometer, a stirrer, a dropping funnel, a gas-inlet tube, and a reflux condenser was placed a mixture composed of 14.4 parts of 2-hydroxyethyl methacrylate, 3.2 parts of 2-sulfoethyl methacrylate, 14.4 parts of methacrylic acid, 0.96 parts of BPO, and 127.0 parts of IPA and the inside atmosphere of the flask was replaced with stirring by nitrogen gas and the flask was warmed up to the boiling point under the nitrogen atmosphere. Next, to this was added a mixture composed of 17.1 parts of 2-hydroxyethyl methacrylate, 3.8 parts of 2-sulfoethyl methacrylate, 17.1 parts of methacrylic acid, 1.14 parts of BPO, and 150.9 parts of IPA during 2 hours and, after the addition finished, was further added a mixture composed of 0.70 parts of BPO and 10.0 parts of IPA during 1 hour. After the addition finished, the reaction mixture was maintained at the boiling point for 1 hour to complete a polymerization reaction, partially neutralized with an aqueous sodium hydroxide solution, and treated with distillation to remove IPA, whereby a water-soluble polymer (67) was obtained. Next, 380.0 parts of an aqueous solution of the water-soluble polymer (67) whose concentration was adjusted at 20% and 3.10 parts of o-phthalic acid diglycidyl ester ("DENACOL EX-721", made by NAGASE CHEMICALS Co., Ltd.) were added and maintained at the boiling point for 3 hours to complete a reaction and then, completely neutralized with an aqueous sodium hydroxide solution, whereby a hydrophilic resin (70) was obtained.

EXAMPLE 71

The procedure of example 70 was repeated except that 2.50 parts of ethylene glycol diglycidyl ether ("DENACOL EX-810", made by NAGASE CHEMICALS Co., Ltd.) was added instead of o-phthalic acid diglycidyl ester used in the example 70, whereby a hydrophilic resin (71) was obtained.

EXAMPLE 72

Into a glass-made reaction vessel equipped with a thermometer, a stirrer, a dropping funnel, a gas-inlet tube, and a reflux condenser was placed a mixture composed of 14.4 parts of 2-hydroxyethyl methacrylate, 3.2 parts of 2-sulfoethyl methacrylate, 14.4 parts of methacrylic acid, 1.14 parts of BPO, and 127.0 parts of IPA and the inside atmosphere of the flask was replaced with stirring by nitrogen gas and the flask was warmed up to the boiling point under the nitrogen atmosphere. Next, to this was added a mixture composed of 17.1 parts of 2-hydroxyethyl methacrylate, 3.8 parts of sulfoethyl methacrylate, 17.1 parts of methacrylic acid, 1.36 parts of BPO, and 150.9 parts of IPA during 2 hours and, after the addition finished, was further added a mixture composed of 0.83 parts of BPO and 10.0 parts of IPA during 1 hour. After the addition finished, the reaction mixture was maintained at the boiling point for 1 hour to complete a polymerization reaction, then partially neutralized with an aqueous sodium hydroxide solution, and treated with distillation to remove IPA, whereby a water-soluble polymer (68) was obtained. Next, 380.0 parts of an aqueous solution of the water- soluble polymer (68) whose concentration was adjusted at 20% and 3.10 parts of o-phthalic acid diglycidyl ester ("DENACOL EX-721", made by NAGASE CHEMICALS Co., Ltd.) were added and maintained at the boiling point for 3 hours to complete a reaction and then, completely neutralized with an aqueous sodium hydroxide solution, whereby a hydrophilic resin (72) was obtained.

EXAMPLE 73

The procedure of example 63 was repeated except that 1.0 parts of polyethylene glycol diglycidyl ether ("DENACOL EX-841", made by NAGASE CHEMICALS Co., Ltd.; an average mole number of added ethylene oxide is about 13) were added instead of o-phthalic acid diglycidyl ester used in the example 63, whereby a hydrophilic resin (73) was obtained.

The average molecular weights (weight average) of the above-obtained water-soluble polymers were measured by GPC under said condition and results obtained are shown in Table 3.

Also, viscosity of the above-obtained hydrophilic resins was measured in said way and results obtained are shown in Table 3.

EXAMPLE 74

Ordinary portland cement was used as cement (made by Sumitomo Cement Co., Ltd.), river sand taken from Yodogawa as a fine aggregate (specific gravity of 2.51 and a fineness modulas [F.M.] of 2.78), crashed stones from Takatsuki (specific gravity of 2.68 and a fineness modulas [F.M.] of 6.73 ) as a coarse aggregate, and the hydrophilic resin (63) obtained from the example 63 as a cement additive, and these materials were respectively weighted to make 30 l in amount of a kneaded mixture with a composition of a unit ratio of 320 kg/m$^3$ for cement, a unit ratio of 173 kg/m$^3$ for water (a ratio of water to cement was 54.2% ), a unit ratio of 934 kg/m$^3$ for fine aggregate, a unit ratio of 876 kg/m$^3$ for coarse aggregate (a ratio of fine aggregate was 52% ), and an addition amount 0.23% (a ratio of the solid portion against cement) of the hydrophilic resin (63), and all the materials were placed into a tilting mixer. Immediately, the mixing and kneading were carried out for 3 minutes with a rotation number of 35 r.p.m., a flowing concrete having an object slump of 18 cm and an object air amount of 4.5% was prepared (in a case of that the object air amount is not attained, a slight amount of an air-entraining agent, [Vinsol] made by Yamaso Chemical Co., Ltd., was used). An obtained flowing concrete immediately after the kneading was sampled and its slump and air amount were measured.

After the kneading finished, the rotational number of the tilting mixer was reduced to 2 r.p.m., the kneading was further continued, and the slump and air amount after 60 minutes, 90 minutes, and 120 minutes were measured to investigate their changes with time-passage.

Also, the compressive strength and setting time of the flowing concrete obtained were measured. Results obtained are shown in Table 3.

Besides, the measurement methods of the slump, air amount, compressive strength, and setting time and the method to take a sample for testing the compressive strength are based on the Japanese Industrial standards ( JIS A6204).

EXAMPLES 75 to 84

The procedure of example 74 was repeated except that the hydrophilic resins (64) to (73) obtained from the examples 64 to 73 as shown in Table 3 were used as cement additives in the amounts for adding shown in Table 3, and flowing concretes thus-prepared were measured in the slump, air amount, compressive strength, and setting time. Results obtained are shown in Table 3.

Example for comparison 6

The procedure of example 74 was repeated except that the water-soluble polymer (63) obtained from the example 63 was used as a cement additive in amount of 0.32% (against cement) instead of the hydrophilic resin (63), and a flowing concrete for comparison thus-prepared was measured in the slump, air amount, compressive strength, and setting time. Results obtained are shown in Table 3.

TABLE 3

| | Water-soluble polymer | | Cement admixture used | | | The upper side: Slump (cm) The middle side: Air amount (%) The under side: Residual % of slump (*3) | | | | Condensation strength at | Setting time |
|---|---|---|---|---|---|---|---|---|---|---|---|
| | No. | Molecular weight (*1) | | Viscosity (cps) (*2) | Addition amount (solid portion, %) (against cement) | Immediately after kneading | after 60 minutes | after 90 minutes | after 120 minutes | age of 28 days (kg/cm$^2$) | (hour:minute) (beginning/ finishing) |
| Example 74 | (63) | 5,200 | Hydrophilic resin (63) | 11.3 | 0.23 | 18.4 4.8 — | 18.2 4.3 99 | 18.0 4.4 98 | 17.3 4.0 94 | 325 | 5:35/7:18 |
| Example 75 | (63) | 5,200 | Hydrophilic resin (64) | 12.5 | 0.23 | 18.8 4.7 — | 18.5 4.5 98 | 18.2 4.7 97 | 17.5 4.4 93 | 318 | 5:20/7:18 |
| Example 76 | (64) | 4,800 | Hydrophilic resin (65) | 30.6 | 0.22 | 18.2 4.9 — | 18.8 4.8 103 | 19.0 5.1 104 | 18.0 4.8 99 | 338 | 5:10/7:13 |
| Example 77 | (64) | 4,800 | Hydrophilic resin (66) | 35.0 | 0.25 | 18.9 4.7 — | 17.8 4.4 94 | 15.8 4.5 84 | 12.1 4.1 64 | 345 | 5:18/7:15 |
| Example 78 | (65) | 20,000 | Hydrophilic resin (67) | 123 | 0.27 | 18.4 4.2 — | 18.2 4.6 99 | 17.8 4.8 97 | 17.2 4.5 93 | 350 | 5:25/7:30 |
| Example 79 | (65) | 20,000 | Hydrophilic resin (68) | 20.1 | 0.23 | 18.2 4.6 — | 18.5 4.9 102 | 18.0 4.9 99 | 17.0 4.3 93 | 320 | 5:25/7:10 |

TABLE 3-continued

| | Water-soluble polymer | | Cement admixture used | | | The upper side: Slump (cm) The middle side: Air amount (%) The under side: Residual % of slump (*3) | | | | Condensation strength at age of 28 days (kg/cm²) | Setting time (hour:minute) (beginning/ finishing) |
|---|---|---|---|---|---|---|---|---|---|---|---|
| | No. | Molecular weight (*1) | | Viscosity (cps) (*2) | Addition amount (solid portion, %) (against cement) | Immediately after kneading | after 60 minutes | after 90 minutes | after 120 minutes | | |
| Example 80 | (66) | 6,500 | Hydrophilic resin (69) | 15.3 | 0.23 | 18.4 4.5 — | 17.4 4.6 95 | 17.2 4.9 93 | 16.8 4.6 91 | 350 | 5:19/7:16 |
| Example 81 | (67) | 12,500 | Hydrophilic resin (70) | 18.7 | 0.20 | 18.9 4.9 — | 18.6 4.4 98 | 18.5 4.6 98 | 17.8 4.2 94 | 344 | 5:11/7:07 |
| Example 82 | (67) | 12,500 | Hydrophilic resin (71) | 16.4 | 0.20 | 18.6 4.4 — | 18.0 4.2 97 | 15.6 4.4 84 | 10.8 4.0 58 | 333 | 5:25/7:31 |
| Example 83 | (68) | 6,300 | Hydrophilic resin (72) | 13.1 | 0.18 | 18.0 4.3 — | 17.6 4.8 98 | 17.1 4.9 95 | 16.8 4.7 93 | 318 | 5:20/7:26 |
| Example 84 | (63) | 6,200 | Hydrophilic resin (73) | 12.8 | 0.30 | 18.5 4.0 — | 17.4 3.8 94 | 15.5 3.8 84 | 12.0 3.9 65 | 349 | 5:18/7:21 |
| Example for comparison 6 | — | — | Water-soluble polymer (63) | — | 0.14 | 18.6 4.0 — | 8.0 4.2 43 | — — — | — — — | 301 | 5:50/7:58 |

(*1) Measured by G.P.C.
(*2) Measured by a B type rotational viscometer at 20° C. and 20%
(*3) Residual percentage of slump (%) = $\dfrac{\text{slump after 60 min. (90 min. or 120 min.)}}{\text{slump immediately after kneading}} \times 100$

EXAMPLE 85

Into a glass-made reaction vessel equipped with a thermometer, a stirrer, a dropping funnel, a gas-inlet tube, and a reflux condenser was placed 760.9 parts of IPA and the inside atmosphere of the flask was replaced with stirring by nitrogen gas and the flask was warmed up to the boiling point under the nitrogen atmosphere. Next, to this were added a mixture solution composed of 48.0 parts of a compound having the structure as below-pictured ("Kayarad R-526", made by Nippon Kayaku Co., Ltd.), 278.0 parts of methoxypolyethylene glycol monomethacrylate ( "NK-ester M-9G", made by SHIN-NAKAMURA Chemical Co., Ltd.; an average mole number of added ethylene oxide is 9), 108.2 parts of methacrylic acid, 15.1 parts of sodium methacrylate, and 624.2 parts of water, and 151.7 parts of an aqueous 2.5% ammonium persulfate solution during 4 hours and, after the addition finished, was further added 37.9 parts of an aqueous 2.5% ammonium persulfate solution during 1 hour. After the addition finished, the reaction mixture was maintained at the boiling point for 1 hour to complete a polymerization reaction, treated with distillation to remove IPA, and completely neutralized with an aqueous sodium hydroxide solution, whereby an aqueous solution of a copolymer (85) was obtained. The viscosity of a 20% aqueous solution of this copolymer (85) was as shown in

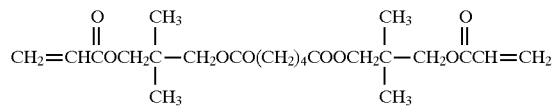

Figure 3:
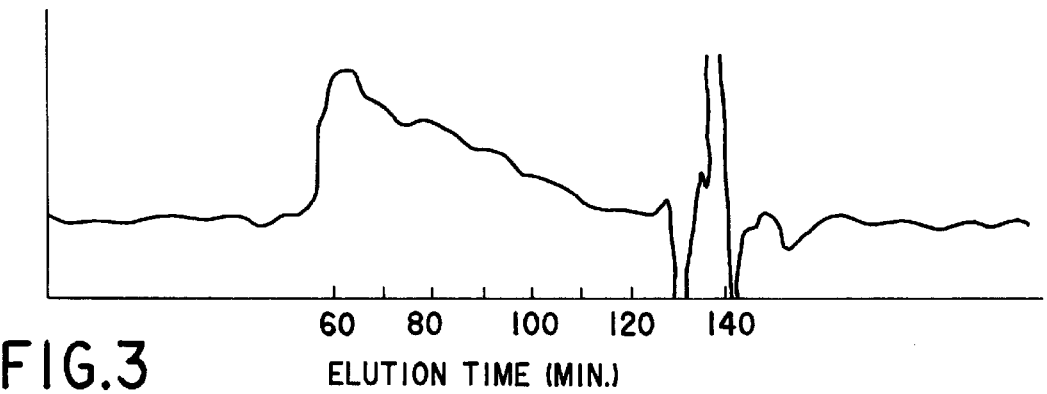
FIG. 3 is a GPC eluding curve for a copolymer which was obtained from the example 35.

GPC of the copolymer (85) was measured and its eluding curve was shown in FIG. 3. To an aqueous solution of the copolymer (85) was added sodium hydroxide to adjust pH at 12 while stirring at room temperature. The GPC after stirring for 30 minutes and 120 minutes were measured. A GPC eluding curve after stirring for 30 minutes is shown in FIG. 4, and a GPC eluding curve after stirring for 120 minutes is shown in FIG. 5.

Figure 4:
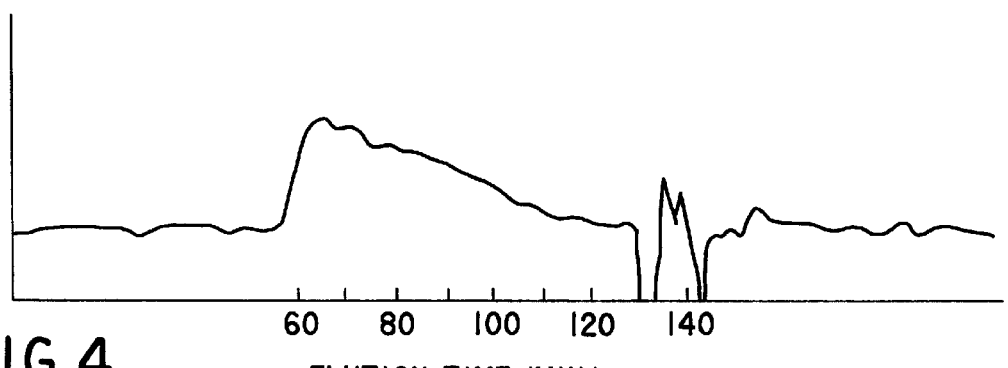
FIG. 4 is a GPC eluding curve for an aqueous solution of the same copolymer which was adjusted at pH 12 by adding an aqueous sodium hydroxide solution and stirred at room temperature for 30 minutes.
Figure 5:
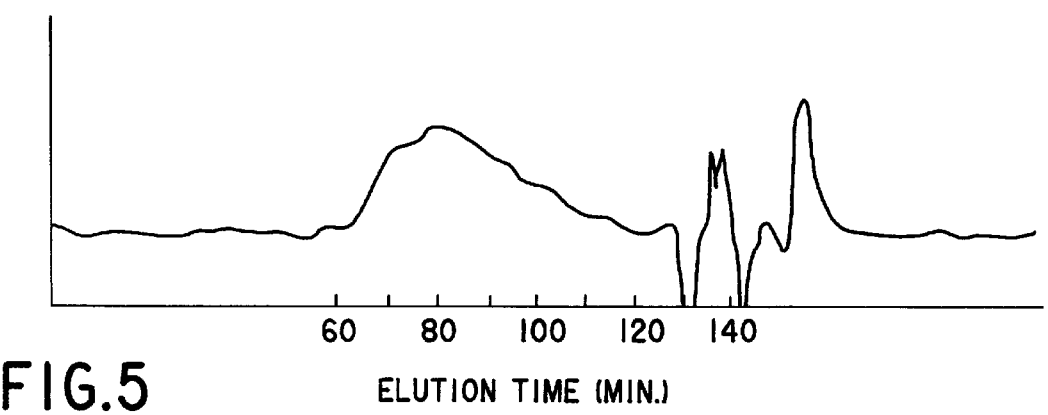
FIG. 5 is a GPC eluding curve for an aqueous solution of the same copolymer which was adjusted at pH 12 by adding an aqueous sodium hydroxide solution and stirred at room temperature for 120 minutes.

As shown in FIGS. 3–5, a material of high molecular weight having a eluding time of about 60 minutes decreased, and a portion in a eluding time of about 80 minutes which has a cement dispersion character increased.

EXAMPLE 86

Into a glass-made reaction vessel equipped with a thermometer, a stirrer, a dropping funnel, a gas-inlet tube, and a reflux condenser were placed 836.5 parts of IPA and the inside atmosphere of the flask was replaced with stirring by nitrogen gas and the flask was warmed up to the boiling point under the nitrogen atmosphere. Next, to this was added a mixture solution composed of 48.0 parts of a compound used in the example 85 ("Kayarad R-526", made by Nippon Kayaku Co., Ltd. ), 278.0 parts of methoxypolyethylene glycol monomethacrylate ("NK-ester M-9G", made by SHIN-NAKAMURA Chemical Co., Ltd.; an average mole number of added ethylene oxide is 9), 108.2 parts of metliacrylic acid, 15.1 parts of sodium methacrylate, and 624.2 parts of water, and furthermore, were added 91.2 parts of an aqueous 2.5% ammonium persulfate solution during 4 hours and, after the addition finished, was further added 22.8 parts of an aqueous 2.5% ammonium persulfate solution during 1 hour. After the addition finished, the reaction mixture was maintained at the boiling point for 1 hour to complete a polymerization reaction, treated with distillation to remove IPA, and completely neutralized with an aqueous sodium hydroxide solution, whereby an aqueous solution of a copolymer (86) was obtained. The viscosity of a 20% aqueous solution of this copolymer (86) was as shown in Table 4.

EXAMPLE 87

Into a glass-made reaction vessel equipped with a thermometer, a stirrer, a dropping funnel, a gas-inlet tube, and a reflux condenser was placed 760.9 parts of IPA and the inside atmosphere of the flask was replaced with stirring by nitrogen gas and the flask was warmed up to the boiling point under the nitrogen atmosphere. Next, to this was added a mixture solution composed of 48.0 parts of a compound having the structure below-pictured ("Kayarad Manda", made by Nippon Kayaku Co., Ltd.), 278.0 parts of methoxypolyethylene glycol monomethacrylate ("NK-ester M-9G ", made by SHIN-NAKAMURA Chemical Co., Ltd.; an average mole number of added ethylene oxide is 9), 108.2 parts of methacrylic acid, 15.1 parts of sodium methacrylate, and 624.2 parts of water, and furthermore, were added 151.7 parts of an aqueous 2.5% ammonium persulfate solution during 4 hours and, after the addition finished, was further added 37.9 parts of an aqueous 2.5% ammonium persulfate solution during 1 hour. After the addition finished, the reaction mixture was maintained at the boiling point for 1 hour to complete a polymerization reaction, treated with distillation to remove IPA, and completely neutralized with an aqueous sodium hydroxide solution, whereby an aqueous solution of a copolymer (87) was obtained. The viscosity of a 20% aqueous solution of this copolymer (87) was as shown in Table 4.

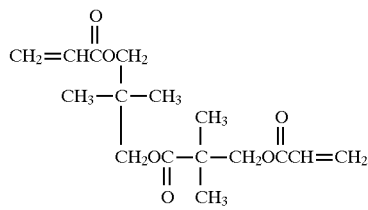

EXAMPLE 88

Into a glass-made reaction vessel equipped with a thermometer, a stirrer, a dropping funnel, a gas-inlet tube, and a reflux condenser were placed 760.9 parts of IPA and the inside atmosphere of the flask was replaced with stirring by nitrogen gas and the flask was warmed up to the boiling point under the nitrogen atmosphere. Next, to this was added a mixture solution composed of 48.0 parts of a compound having the structure below-pictured ("Kayarad HX-220", made by Nippon Kayaku Co., Ltd.), 278.0 parts of methoxypolyethylene glycol monomethacrylate ("NK-ester M-9G ", made by SHIN-NAKAMURA Chemical Co., Ltd.; an average mole number of added ethylene oxide is 9), 108.2 parts of methacrylic acid, 15.1 parts of sodium methacrylate, and 624.2 parts of water, and 151.7 parts of an aqueous 2.5% ammonium persulfate solution during 4 hours and, after the addition finished, was further added 37.9 parts of an aqueous 2.5% ammonium persulfate solution during 1 hour. After the addition finished, the reaction mixture was maintained at the boiling point for 1 hour to complete a polymerization reaction, treated with distillation to remove IPA, and completely neutralized with an aqueous sodium hydroxide solution, whereby an aqueous solution of a copolymer (88) was obtained. The viscosity of a 20% aqueous solution of this copolymer (88) was as shown in Table 4.

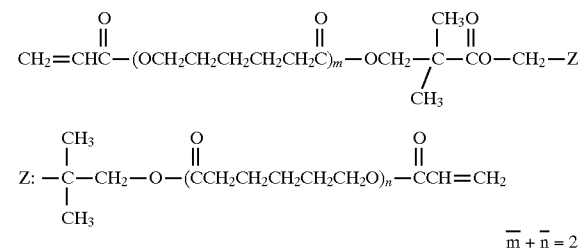

($\bar{m}$ and $\bar{n}$ indicate the mean values of m and n, respectively.)

EXAMPLE 89

Into a glass-made reaction vessel equipped with a thermometer, a stirrer, a dropping funnel, a gas-inlet tube, and a reflux condenser were placed 760.9 parts of IPA and the inside atmosphere of the flask was replaced with stirring by nitrogen gas and the flask was warmed up to the boiling point under the nitrogen atmosphere. Next, to this was added a mixture solution composed of 48.0 parts of a compound having the structure below-pictured ("Kayarad DPCA-20", made by Nippon Kayaku Co., Ltd.), 278.0 parts of methoxypolyethylene glycol monomethacrylate ( "NK-ester M-9G", made by SHIN-NAKAMURA Chemical Co., Ltd.; an average mole number of added ethylene oxide is 9), 108.2 parts of methacrylic acid, 15.1 parts of sodium methacrylate, and 624.2 parts of water, and furthermore, were added 151.7 parts of an aqueous 2.5% ammonium persulfate solution during 4 hours and, after the addition finished, was further added 37.9 parts of an aqueous 2.5% ammonium persulfate solution during 1 hour. After the addition finished, the reaction mixture was maintained at the boiling point for 1 hour to complete a polymerization reaction, treated with distillation to remove IPA, and completely neutralized with an aqueous sodium hydroxide solution, whereby an aqueous solution of a copolymer (89) was obtained. The viscosity of a 20% aqueous solution of this copolymer (89) was as shown in Table 4.

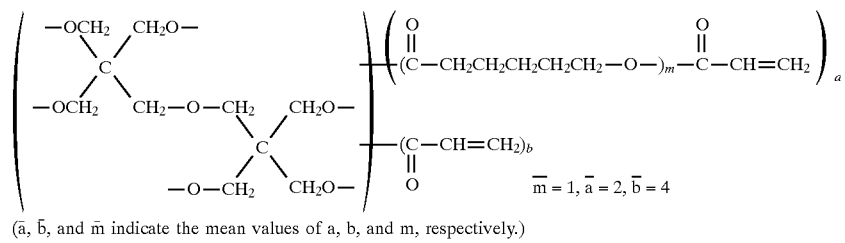

($\bar{a}$, $\bar{b}$, and $\bar{m}$ indicate the mean values of a, b, and m, respectively.)

EXAMPLE 90

Into a glass-made reaction vessel equipped with a thermometer, a stirrer, a dropping funnel, a gas-inlet tube, and a reflux condenser were placed 797.0 parts of IPA and the inside atmosphere of the flask was replaced with stirring by nitrogen gas and the flask was warmed up to the boiling point under the nitrogen atmosphere. Next, to this was added a mixture solution composed of 48.0 parts of the compound used in the example 88 ("Kayarad HX-220", made by Nippon Kayaku Co., Ltd.), 314.5 parts of methoxypolyethylene glycol monomethacrylate ("NK-ester M-9G", made by SHIN-NAKAMURA Co., Ltd.; an average mole number of added ethylene oxide is 9), 75.0 parts of methacrylic acid, 10.5 parts of sodium methacrylate, and 625.5 parts of water, and furthermore, were added 122.8 parts of an aqueous 2.5% ammonium persulfate solution during 4 hours and, after the addition finished, was further added 30.7 parts of an aqueous 2.5% ammonium persulfate solution during 1 hour. After the addition finished, the reaction mixture was maintained at the boiling point for 1 hour to complete a polymerization reaction, treated with distillation to remove IPA, and completely neutralized with an aqueous sodium hydroxide solution, whereby an aqueous solution of a copolymer (90) was obtained. The viscosity of a 20% aqueous solution of this copolymer (90) was as shown in Table 4.

EXAMPLE 91

Into a glass-made reaction vessel equipped with a thermometer, a stirrer, a dropping funnel, a gas-inlet tube, and a reflux condenser were placed 164.2 parts of IPA and the inside atmosphere of the flask was replaced with stirring by nitrogen gas and the flask was warmed up to the boiling point under the nitrogen atmosphere. Next, to this was added a mixture solution composed of 9.6 parts of a compound used in the example 85 ("Kayarad R-526", made by Nippon Kayaku Co., Ltd.), 62.9 parts of polyethylene glycol polypropylene glycol methacrylate ("Blenmer 70PEP-350B", made by NIPPON OIL & FATS Co., Ltd.; an average mole number of added ethylene oxide is 7 and that of added propylene oxide is 3), 16.7 parts of methacrylic acid, and 125.5 parts of water, and furthermore, were added 24.6 parts of an aqueous 2.5% ammonium persulfate solution during 4 hours and, after the addition finished, was further added 6.1 parts of an aqueous 2.5% ammonium persulfate solution during 1 hour. After the addition finished, the reaction mixture was maintained at the boiling point for 1 hour to complete a polymerization reaction, treated with distillation to remove IPA, and completely neutralized with an aqueous sodium hydroxide solution, whereby an aqueous solution of a copolymer (91) was obtained. The viscosity of a 20% aqueous solution of this copolymer (91) was as shown in Table 4.

EXAMPLE 92

Into a glass-made reaction vessel equipped with a thermometer, a stirrer, a dropping funnel, a gas-inlet tube, and a reflux condenser were placed 760.9 parts of IPA and the inside atmosphere of the flask was replaced with stirring by nitrogen gas and the flask was warmed up to the boiling point under the nitrogen atmosphere. Next, to this was added a mixture solution composed of 48.0 parts of a compound used in the example 85 ("Kayarad R-526", made by Nippon Kayaku Co. , Ltd.), 278.0 parts of methoxypolyethylene glycol monomethacrylate ("NK-ester M-23G", made by SHIN-NAKAMURA CIIEMICAL Co., Ltd.; an average mole number of added ethylene oxide is 23), 108.2 parts of methacrylic acid, 15.1 parts of sodium methacrylate, and 624.2 parts of water, and 151.7 parts of an aqueous 2.5% ammonium persulfate solution during 4 hours and, after the addition finished, was further added 37.9 parts of an aqueous 2.5% ammonium persulfate solution during 1 hour. After the addition finished, the reaction mixture was maintained at the boiling point for 1 hour to complete a polymerization reaction, treated with distillation to remove IPA, and completely neutralized with an aqueous sodium hydroxide solution, whereby an aqueous solution of a copolymer (92) was obtained. The viscosity of a 20% aqueous solution of this copolymer (92) was as shown in Table 4 .

EXAMPLE 93

The procedure of example 85 was repeated except that the compound used in the example 85 ("Kayarad R-526", made by Nippon Kayaku Co., Ltd.) was 72.0 parts in amount, whereby a copolymer (93) was obtained. The viscosity of a 20% aqueous solution of this copolymer (93) is as shown in Table 4.

EXAMPLE 94

The procedure of example 85 was repeated except that the compound used in the example 85 ("Kayarad R-526", made by Nippon Kayaku Co., Ltd.) was 24.0 parts in amount, whereby a copolymer (94) was obtained. The viscosity of a 20% aqueous solution of this copolymer (94) is as shown in Table 4.

EXAMPLE 95

The procedure of example 85 was repeated except that 108.2 parts of acrylic acid were used instead of methacrylic acid used in the example 85 and 15.1 parts of sodium acrylate instead of sodium methacrylate, whereby a copolymer (95) was obtained. The viscosity of a 20% aqueous solution of this copolymer (95) is as shown in Table 4.

EXAMPLE 96

Into a glass-made reaction vessel equipped with a thermometer, a stirrer, a dropping funnel, a gas-inlet tube, and a reflux condenser was placed a mixture composed of 4.00 g of a compound used in the example 85 ("Kayarad R-526", made by Nippon Kayaku Co., Ltd.), 17.6 parts of HEMA, 14.4 parts of methacrylic acid, 1.0 part of BPO, and 127.0 parts of IPA, and the inside atmosphere of the flask was replaced with stirring by nitrogen gas and the flask was warmed up to the boiling point under the nitrogen atmosphere. Next, to this mixture was added a mixture composed of 4.66 parts of a compound used in the example 85 ("Kayarad R-526", made by Nippon Kayaku Co., Ltd.), 20.9 parts of HEMA, 17.1 parts of methacrylic acid, 1.1 parts of BPO, and 150.9 parts of IPA during 2 hours and, after the addition finished, were further added 10.7 parts of a 7% IPA solution of BP0 during 1 hour. After the addition finished, the reaction mixture was maintained at the boiling point for 1 hour to complete a polymerization reaction, treated with distillation to remove IPA, and completely neutralized with an aqueous sodium hydroxide solution, whereby an aqueous solution of a copolymer (96) was obtained. The viscosity of a 20% aqueous solution of this copolymer (96) was as shown in Table 4.

Example for comparison 7

Into a glass-made reaction vessel equipped with a thermometer, a stirrer, a dropping funnel, a gas-inlet tube, and a reflux condenser were placed 390.0 parts of IPA and the inside atmosphere of the flask was replaced with stirring by nitrogen gas and the flask was warmed up to the boiling point under the nitrogen atmosphere. Next, to this was added a mixture solution composed of 133.0 parts of methoxy-polyethylene glycol monomethacrylate ("NK-ester M-9G", made by SHIN-NAKAMURA CHMICAL Co., Ltd.; an average mole number of added ethylene oxide is 9), 27.0 parts of methacrylic acid, 2.4 parts of BPO, and 240.0 parts of IPA during 2 hours and, after the addition finished, were further added 10.5 parts of a 4.9% BPO solution during 1 hour. After the addition finished, the reaction mixture was maintained at the boiling point for 2 hours to complete a polymerization reaction, treated with distillation to remove IPA, and completely neutralized with an aqueous sodium hydroxide solution, whereby an aqueous solution of a copolymer for comparison (1) was obtained. The viscosity of a 20% aqueous solution of this copolymer for comparison (1) was as shown in Table 4

EXAMPLE 97

Ordinary portland cement was used as cement (made by Sumitomo Cement Co., Ltd.), river sand taken from Yodogawa as a fine aggregate (specific gravity of 2.51 and a fineness modulas [F.M.] of 2.78), crashed stones from Takatsuki (specific gravity of 2.68 and a fineness modulas [F.M.] of 6.73) as a coarse aggregate, and the copolymer (1) obtained from the example 85 as a cement additive, and these materials were respectively weighted to make 30 l in amount of a kneaded mixture with a composition of a unit ratio of 320 kg/m³ for cement, a unit ratio of 173 kg/m³ for water (a ratio of water to cement was 54.2%), a unit ratio of 934 kg/m³ for fine aggregate, a unit ratio of 876 kg/m³ for coarse aggregate (a ratio of fine aggregate was 52%), and an addition amount 0.10% (a ratio of the solid portion against cement) of the copolymer (85), which is a cement additive, and then all the materials were placed into a tilting mixer. Immediately, the mixing and kneading were carried out with a rotation number of 35 r.p.m. for 3 minutes, a flowing concrete having an object slump of 18 cm and an object air amount of 4.5 % was prepared (in a case of that the object air amount is not attained, a slight amount of an air-entraining agent, [Vinsol] made by Yamaso Chemical Co., Ltd., was used). An obtained flowing concrete immediately after the kneading was sampled and its slump and air amount were measured.

After the kneading finished, the rotational number of the tilting mixer was reduced to 3 r.p.m., the kneading was further continued, and the slump and air amount after 60 minutes, 90 minutes, and 120 minutes were measured to investigate their changes with time-passage.

Also, the compressive strength and setting time of the flowing concrete obtained were measured. Results obtained are shown in Table 4.

Besides, the measurement methods of the slump, air amount, compressive strength, and setting time and the method to take a sample for testing the compressive strength are based on the Japanese Industrial standards (JIS A6204).

EXAMPLES 98 to 108

The procedure of example 97 was repeated except that the copolymers (86) to (96) obtained from the examples 86 to 96 as shown in Table 4 were used as cement additives in the amounts for adding shown in Table 4, and flowing concretes thus-prepared were measured in the slump, air amount, compressive strength, and setting time. Results obtained are shown in Table 4.

EXAMPLE 109

The procedure of example 97 was repeated except that the copolymer (85) obtained from the example 85 and the copolymer for comparison (1) obtained from the example for comparison 7 were used as cement additives in the amounts for adding shown in Table 4, and a flowing concrete thus-prepared was measured in the slump, air amount, compressive strength, and setting time. Results obtained are shown in Table 4.

EXAMPLE 110

The procedure of example 97 was repeated except that the copolymer (85) obtained from the, example 85 and a sodium naphthalenesulfonate-formalin condensation product were used as cement additives in the amounts for adding shown in Table 4, and a flowing concrete thus-obtained was measured in the slump, air amount, compressive strength, and setting time. Results obtained are shown in Table 4.

EXAMPLE 111

The procedure of example 97 was repeated except that the copolymer (85) obtained from the example 85 and sodium ligninsulfonate were used as cement additives in the amounts for adding shown in Table 4, and a flowing concrete thus-obtained was measured in the slump, air amount, compressive strength, and setting time. Results obtained are shown in Table 4.

Example for comparison 8

The procedure of example 97 was repeated except that the copolymer for comparison (1) obtained from the example for comparison 7 was used as a cement additive in an amount of 0.10 % (against cement) instead of the copolymer (85), and a flowing concrete for comparison thus-prepared was measured in the slump, air amount, compressive strength, and setting time. Results obtained are shown in Table 4.

TABLE 4

| | Cement admixture used | | | The upper side: Slump (cm) The middle side: Air amount (%) The under side: Residual % of slump (*3) | | | | Condensation strength at | Setting time | Molecular weight after hydrolysis |
|---|---|---|---|---|---|---|---|---|---|---|
| | | Viscosity (cps) (*2) | | Addition amount (solid portion, %) | Immediately after | after 60 | after 90 | after 120 | age of 28 days | (hour:minute) (beginning/ | of copolymer |
| | | 20° C. | 25° C. | (against cement) | kneading | minutes | minutes | minutes | (kg/cm²) | finishing) | (*1) |
| Example 97 | Copolymer (85) | 83.2 | 77.5 | 0.10 | 17.8 5.2 — | 18.9 5.0 106 | 18.5 5.1 104 | 17.3 4.9 97 | 323 | 5:18/7:30 | 20,000 |

TABLE 4-continued

| | Cement admixture used | | | The upper side: Slump (cm) The middle side: Air amount (%) The under side: Residual % of slump (*3) | | | | Condensation strength at age of 28 days (kg/cm²) | Setting time (hour:minute) (beginning/ finishing) | Molecular weight after hydrolysis of copolymer (*1) |
|---|---|---|---|---|---|---|---|---|---|---|
| | | Viscosity (cps) (*2) | | Addition amount (solid portion, %) (against cement) | Immediately after kneading | after 60 minutes | after 90 minutes | after 120 minutes | | | |
| | | 20° C. | 25° C. | | | | | | | | |
| Example 98 | Copolymer (86) | 290 | 260 | 0.10 | 16.8 4.9 — | 18.0 4.8 107 | 18.2 4.9 108 | 17.0 4.7 101 | 340 | 5:25/7:29 | 35,000 |
| Example 99 | Copolymer (87) | 71.3 | 68.2 | 0.12 | 18.4 4.5 — | 18.3 4.8 99 | 18.0 4.7 98 | 17.8 4.4 97 | 338 | 5:09/7:13 | 18,000 |
| Example 100 | Copolymer (88) | 90.8 | 80.4 | 0.10 | 18.8 4.9 — | 18.6 4.3 99 | 18.2 4.2 97 | 17.6 4.0 94 | 325 | 5:15/7:20 | 24,000 |
| Example 101 | Copolymer (89) | 129 | 103 | 0.10 | 17.8 5.2 — | 17.9 5.0 101 | 18.0 4.8 101 | 17.6 4.4 99 | 320 | 5:13/7:12 | 28,000 |
| Example 102 | Copolymer (90) | 60.3 | 54.8 | 0.10 | 18.3 5.0 — | 17.2 4.8 94 | 17.2 4.7 94 | 17.0 4.3 93 | 331 | 5:21/7:25 | 12,000 |
| Example 103 | Copolymer (91) | 82.1 | 74.5 | 0.08 | 18.5 4.9 — | 18.8 4.5 102 | 18.6 4.4 101 | 18.0 4.0 97 | 343 | 5:26/7:18 | 21,000 |
| Example 104 | Copolymer (92) | 103 | 94.8 | 0.14 | 18.2 4.3 — | 19.0 4.5 104 | 19.0 4.7 104 | 18.5 4.6 102 | 329 | 5:25/7:28 | 26,000 |
| Example 105 | Copolymer (93) | 140 | 121.0 | 0.14 | 17.3 4.8 — | 19.4 4.9 112 | 19.0 5.1 110 | 18.5 5.0 107 | 340 | 5:13/7:24 | 20,000 |
| Example 106 | Copolymer (94) | 46.3 | 41.5 | 0.10 | 18.5 4.1 — | 18.0 4.3 97 | 17.5 4.2 95 | 17.0 3.9 92 | 333 | 5:11/7:29 | 20,000 |
| Example 107 | Copolymer (95) | 68.4 | 63.7 | 0.11 | 17.5 4.4 — | 18.0 5.0 103 | 17.8 5.1 102 | 17.0 4.5 97 | 319 | 5:19/7:15 | 18,000 |
| Example 108 | Copolymer (96) | 61.4 | 58.4 | 0.23 | 17.8 3.8 — | 18.8 4.0 106 | 18.7 4.4 105 | 17.9 4.0 101 | 324 | 5:10/7:11 | 12,000 |
| Example 109 | Copolymer (85) + Copolymer for comparison (1) | — | — | 0.05 + 0.05 | 19.1 4.6 — | 18.8 4.5 98 | 18.0 4.4 94 | 17.2 4.0 90 | 330 | 5:18/7:25 | — |
| Example 110 | Copolymer (85) + NSF (*4) | — | — | 0.05 + 0.16 | 18.3 4.2 — | 18.5 4.4 101 | 17.8 4.0 97 | 17.0 4.0 93 | 319 | 5:12/7:13 | — |
| Example 111 | Copolymer (85) + LS (*5) | — | — | 0.05 + 0.16 | 17.9 4.0 — | 18.3 4.1 102 | 17.8 4.2 99 | 17.1 4.0 96 | 327 | 5:20/7:18 | — |
| Example for comparison 8 | Copolymer for comparison (1) | 25.0 | 23.1 | 0.10 | 18.2 4.0 — | 13.4 4.5 74 | — — — | — — — | 330 | 5:28/7:21 | — |

(*1) Measured by G.P.C.
(*2) Measured by a B type rotational viscometer at 20° C. and 25° C. and 20%
(*3) Residual percentage of slump (%) = $\frac{\text{slump after 60 min. (90 min. or 120 min.)}}{\text{slump immediately after kneading}} \times 100$
(*4) NSF: Sodium naphthalenesulfonate-formalin condensation product
(*5) LS: Sodium ligninsulfonate

EXAMPLE 112

Into a glass-made reaction vessel equipped with a thermometer, a stirrer, a dropping funnel, a gas-inlet tube, and a reflux condenser were placed 707.5 parts of water and the inside atmosphere of the flask was replaced with stirring by nitrogen gas and the flask was warmed up to the boiling point under the nitrogen atmosphere. To this were added 200.0 parts of a 80% aqueous acrylic acid solution and 195.6 parts of a 5% aqueous sodium persulfate solution during 4 hours. After completion of the addition, the mixture was further maintained at the boiling point for 1 hour to complete a polymerization reaction and partially neutralized with an aqueous sodium hydroxide solution, whereby a water-soluble polymer (112) having an average molecular weight of 4000 was obtained. Next, after water was distilled off, to 536.3 parts of an aqueous solution of the water-soluble polymer (112), whose concentration was adjusted at 40%, were added 17.2 parts of a compound used in the example 16 ("DENACOL EX-202", made by NAGASE CHEMICALS Co., Ltd.) and the reaction mixture was maintained at the boiling point for 3 hours to complete a reaction and then, completely neutralized with an aqueous sodium hydroxide solution, whereby a hydrophilic resin (112) was obtained.

EXAMPLE 113

The procedure of example 112 was repeated except that 10.7 parts of polyethylene glycol diglycidyl ether ("DENACOL EX-841", made by NAGASE CHEMICALS Co., Ltd.) was added instead of the compound used in the example 16, whereby a lydrophilic resin (113) was obtained.

EXAMPLE 114

Into a glass-made reaction vessel equipped with a thermometer, a stirrer, a dropping funnel, a nitrogen gas-inlet tube, and a reflux condenser were placed 300 parts of water and the inside atmosphere of the flask was replaced with stirring by nitrogen gas and the flask was warmed up to 95° C. under the nitrogen atmosphere.

Next, to this were added during 2 hours a monomer solution composed of 107.7 parts of a quarternary salt of N,N-dimethylaminoethyl methacrylate and 100.0 parts of water, a monomer solution composed of 52.3 parts of sodium acrylate, and 162.2 parts of water, and 77.8 parts of a 5% aqueous ammonium persulfate solution, respectively. After completion of the addition, the mixture was further maintained at 95° C. for 1 hour to complete a polymerization reaction, whereby a water-soluble polymer (113) having an average molecular weight of 28000 was obtained.

Next, to this were added 12.8 parts of o-phthalic acid diglycidyl ester ("DENACOL EX-721", made by NAGASE CHEMICALS Co., Ltd.) and the reaction mixture was maintained at the boiling point for 3 hours to complete a reaction, whereby a hydrophilic resin (114) was obtained.

EXAMPLE 115

Into a glass-made reaction vessel equipped with a thermometer, a stirrer, a dropping funnel, a gas-inlet tube, and a reflux condenser were placed 378.9 parts of polyalkyleneglycol monoallyl ether (an average mole number of added ethylene oxide is 10) and 188.5 parts of water, and the inside atmosphere of the flask was replaced with stirring by nitrogen gas and the flask was warmed up to 95° C. under the nitrogen atmosphere. Next, to this was added a mixture solution composed of 88.2 parts of maleic acid, 14 parts of ammonium persulfate, and 132.3 parts of water during 120 minutes and, after the addition finished, were further added 14 parts of a 20% aqueous ammonium persulfate solution during 20 minutes. After the addition finished, the reaction mixture was maintained at 95° C. for 100 minutes to complete a polymerization reaction and then, partially neutralized with an 40% aqueous sodium hydroxide solution, whereby a water-soluble polymer (114) having an avarage molecular weight of 3000 was obtained.

Next, to this polymer were added 28.4 parts of the compound used in the example 16 ("DENACOL EX-202", made by NAGASE CHEMICALS Co., Ltd.) and the mixture was maintained at the boiling point for 3 hours to complete a reaction and then, completely neutralized with an aqueous sodium hydroxide solution, whereby a hydrophilic resin (115) was obtained.

EXAMPLE 116

Into a glass-made reaction vessel equipped with a thermometer, a stirrer, a dropping funnel, a nitrogen gas-inlet tube, and a reflux condenser were placed 30 parts of polyethyleneglycol monoallyl ether (an average mole number of ethylene oxide added is 10) and 475 parts of water, and the inside atmosphere of the flask was replaced with stirring by nitrogen gas and the flask was warmed up to 95° C. under the nitrogen atmosphere. Next, to this were added during 120 minutes 447 parts of a 38% aqueous sodium acrylate solution and 40 parts of a 5% aqueous ammonium persulfate solution, respectively. After the addition finished, were further added 8 parts of a 5% aqueous ammonium persulfate solution during 20 minutes. After this addition finished, the reaction mixture was maintained at 95° C. for 120 minutes to complete a polymerization reaction, whereby a water-soluble polymer (115) having an average molecular weight of 5200 was obtained.

Next, to this polymer were added 20.0 parts of the compound used in the example 16 ("DENACOL EX-202", made by NAGASE CHEMICALS Co., Ltd.) and the mixture was maintained at the boiling point for 3 hours to complete a reaction, whereby a hydrophilic resin (116) was obtained.

EXAMPLE 117

Into a glass-made reaction vessel equipped with a thermometer, a stirrer, a dropping funnel, a gas-inlet tube, and a reflux condenser were placed 60 parts of polyethyleneglycol monoallyl ether (an average mole number of ethylene oxide added is 30) and 524 parts of water, and the inside atmosphere of the flask was replaced with stirring by nitrogen gas and the flask was warmed up to 95° C. under the nitrogen atmosphere. Next, to this were added during 120 minutes 368 parts of 38% sodium methacrylate and 40 parts of a 5% aqueous ammonium persulfate solution, respectively. After the addition finished, was further added 8 parts of a 5% aqueous ammonium persulfate solution during 20 minutes. After this addition finished, the reaction mixture was maintained at 95° C. for 120 minutes to complete a polymerization reaction, whereby a water-soluble polymer (116) having an average molecular weight of 18000 was obtained.

Next, to this polymer were added 20.0 parts of the compound used in the example 16 ("DENACOL EX-202", made by NAGASE CHEMICALS Co., Ltd.) and the mixture was maintained at the boiling point for 3 hours to complete a reaction, whereby a hydrophilic resin (117) was obtained.

EXAMPLE 118

The procedure of example 117 was repeated except that 20.0 parts of polyethyleneglycol diglycidyl ether ("DENACOL EX-830", made by NAGASE CHEMICALS Co., Ltd.) was added instead of the compound used the example 16, whereby a hydrophilic resin (118) was obtained.

EXAMPLE 119

Into a glass-made reaction vessel equipped with a thermometer, a stirrer, three dropping funnels, a gas-inlet tube, and a reflux condenser were placed 801.2 parts of water, and the inside atmosphere of the flask was replaced with stirring by nitrogen gas and the flask was warmed up to 95° C. under the nitrogen atmosphere. Next, to this were added a mixture composed of 314.4 parts of acrylic acid, 45.6 parts of sodium acrylate, and 360 parts of water, a mixture composed of 11.1 parts of ammonium persulfate and 99.6 parts of water, and a mixture composed of 50.5 parts of sodium hydrogen sulfite and 117.7 parts of water during 240 minutes through the individual funnels. After the addition finished, the reaction mixture was maintained at 95° C. for 60 minutes to complete a polymerization reaction.

Next, a polymerization product obtained was cooled to 40° C., to which 166.7 parts of ethyleneimine were added during 1 hour. After the addition finished, the reaction mixture was warmed up to 90° C. and maintained at this temperature for 120 minutes to complete an addition reaction, whereby a water-soluble polymer (117) was obtained. The aminoethylated percentage of this polymer (117) was measured with quantitative determination of unreacting carboxyl groups by conductivity titration and the result indicated that the reacting mole number of ethyleneimine per one mole carboxyl group in this polymer was 0.8.

Next, to this polymer were added 35.3 parts of the compound used in the example 16 ("DENACOL EX-202", made by NAGASE CIIEMICALS Co., Ltd.) and the mixture was maintained at the boiling point for 3 hours to complete a reaction, whereby a hydrophilic resin (119) was obtained.

EXAMPLE 120

Into a glass-made reaction vessel equipped with a thermometer, a stirrer, three dropping funnels, a gas-inlet tube, and a reflux condenser were placed 278.6 parts of water, and the inside atmosphere of the flask was replaced with stirring by nitrogen gas and the flask was warmed up to 95° C. under the nitrogen atmosphere. Next, to this were added a mixture composed of 160 parts of methacrylic acid and 240 parts of water and a mixture composed of 12.1 parts of ammonium persulfate and 68.8 parts of water during 120 minutes, respectively. Subsequently, a mixture composed of 6.1 parts of ammonium persulfate and 44.4 parts of water was added during 60 minutes. After the addition finished, the reaction mixture was maintained at 95° C. for 60 minutes to complete a polymerization reaction.

Next, a polymerization product obtained was cooled to 30° C., to which 255.6 parts of water were added, and the mixture was warmed up to 40° C., to which 63.9 parts of ethyleneimine were added during 1 hour. After the addition finished, the reaction mixture was warmed up to 90° C. and maintained at this temperature for 120 minutes to complete an addition reaction, whereby an aqueous solution of a water-soluble polymer (118) was obtained. The aminoethylated percentage of this polymer (118) was measured with quantitative determination of unreacting carboxyl groups by conductivity titration and the result indicated that the reacting mole number of ethyleneimine per one mole carboxyl group in this polymer was 0.8.

Next, to this polymer were added 15.43 parts of the compound used in the example 16 ("DENACOL EX-202", made by NAGASE CIIEMICALS Co., Ltd.) and the mixture was maintained at the boiling point for 3 hours to complete a reaction, whereby a hydrophilic resin (120) was obtained.

EXAMPLE 121

Into a steel-made autoclave equipped with a thermometer, a stirrer, a pressure meter, and two gas-inlet tubes were placed 89 parts of maleic anhydride, 15.0 parts of BPO, and 875 parts of dichloroethane, the inside air of the autoclave was sufficiently replaced with stirring by ethylene gas by repeatedly applying a pressure and withdrawing it with 10 kg/cm$^2$ of ethylene, and a polymerization reaction was carried out at 70° C. during 10 hours keeping a pressure of 20 to 30 kg/cm$^2$ with further addition of ethylene. A reactione product was taken out easily with filtration and dried under vacuum, whereby 95.1 parts of a polymer having a carboxyl group was obtained.

The composition ratio of maleic anhydride to ethylene in the polymer having a carboxyl group thus-obtained was determined by titration analysis with an aqueous sodium hydroxide solution and an analysis result indicated a 29:71 mole ratio of maleic anhydride to ethylene. In addition, a number average molecular weight of the polymer having a carboxyl group was shown as 21,000 with high performance liquid chromatography.

Next, into a glass-made reaction vessel equipped with a thermometer, a stirrer, a dropping funnel, a gas-inlet tube, and a reflux condenser were placed 95.1 parts of the polymer having a carboxyl group and 403.2 parts of water, and the inside atmosphere of the flask was replaced with stirring by nitrogen gas and the flask was warmed at 80° C. for 2 hours under the nitrogen atmosphere, whereby an aqueous solution of the polymer having a carboxyl group was obtained. Next, this aqueous solution was cooled to 40° C. and to this solution were added 39.3 parts of ethylenimine during 1 hour while maintaining the temperature at 40° C. After the addition finished, the reaction mixture was warmed up to 90° C. and maintained at this temperature for 120 minutes to complete an addition reaction, whereby an aqueous solution of a water-soluble polymer (119) was obtained.

The aminoethylated percentage of this polymer (119) was measured with quantitative determination of unreacting carboxyl groups by conductivity titration and the result indicated that the reacting mole number of ethyleneimine per one mole carboxyl group in this polymer (119) was 0.8. Next, to this polymer were added 8.1 parts of o-phthalic acid diglycidyl ester ("DENACOL EX-721", made by NAGASE CHEMICALS Co., Ltd.) and the mixture was maintained at the boiling point for 3 hours to complete a reaction, whereby a hydrophilic resin (121) was obtained.

EXAMPLE 122

Into the same glass-made reaction vessel as used for the example 121 were placed 136.3 parts of maleic anhydride and 221.3 parts of methyl ethyl ketone, and the inside atmosphere of the flask was replaced with stirring by nitrogen gas and the flask was warmed up to 92° C. under the nitrogen atmosphere. Next, to this were added a mixture composed of 144.9 parts of styrene and 144.9 parts of methyl ethyl ketone and a mixture composed of 13.9 parts of BPO and 55.6 parts of methyl ethyl ketone during 120 minutes. After addition finished, the reaction mixture was maintained at 92° C. for 60 minutes to complete a polymerization reaction and, then evaporated, whereby 280.7 parts of a polymer having a carboxyl group was obtained.

The number average molecular weight of the polymer having a carboxyl group thus-obtained was measured as 35,000.

Next, into the same glass-made reaction vessel as used above were placed 280.7 parts of the polymer having a carboxyl group and 1076 parts of water, and the inside atmosphere of the flask was replaced with stirring by nitrogen gas and the flask was warmed up to 40° C. under the nitrogen atmosphere. Next, while maintaining at this temperature, to this flask were added 78.0 parts of ethyleneimine during 1 hour. After addition finished, the reaction mixture was warmed up to 90° C. and maintained at this temperature for 120 minutes to complete an addition reaction, whereby an aqueous solution of a water-soluble polymer (120) was obtained.

The aminoethylated percentage of this water-soluble polymer (120) was measured with quantitative determination of unreacting carboxyl groups by conductivity titration and the result indicated that the reacting mole number of ethyleneimine per one mole carboxyl group in this polymer (120) was 8.0.

Next, to this polymer were added 21.5 parts of o-phthalic acid diglycidyl ester ("DENACOL EX-721", made by NAGASE CHEMICALS Co., Ltd.) and the mixture was maintained at the boiling point for 3 hours to complete a reaction, whereby a hydrophilic resin (122) was obtained.

EXAMPLE 123

Into a glass-made reaction vessel equipped with a thermometer, a stirrer, a dropping funnel, a gas-inlet tube, and a reflux condenser were placed 320.0 parts of water, and the inside atmosphere of the flask was replaced with stirring by nitrogen gas and the flask was warmed up to 95° C. under the nitrogen atmosphere. Next, to this was added a mixture solution composed of 136.0 parts of sodium p-styrenesulfonate, 24.0 parts of acrylic acid, and 160.0 parts of water, and furthermore, were added 106.7 parts of a 10% aqueous ammonium persulfate solution during 2 hours and, after the addition finished, 53.3 parts of a 10% aqueous ammonium persulfate solution were further added during 1 hour. After the addition finished, the reaction mixture was maintained at 95° C. for 1 hour to complete a polymerization reaction, whereby a water-soluble polymer having an average molecular weight of 17,000 (121) was obtained.

Next, to this polymer were added 128.0 parts of o-phthalic acid diglycidyl ester ("DENACOL EX-721", made by NAGASE CHEMICALS Co., Ltd.) and the mixture was maintained at the boiling point for 3 hours to complete a reaction and completely neutralized with an aqueous sodium hydroxide solution, whereby a hydrophilic resin (123) was obtained.

EXAMPLE 124

Into an autoclave a mixture composed of 98 parts of maleic anhydride, 110 parts of a $C_5$-olefinic mixture (in a composition of 15.34% of iso-pentene, 15.28% of n-pentane, 41.97% of 2-methylbutene-1, 26.56% of pentene-1, and 0.85% of isoprene ), 4 parts of BPO, and 400 parts of benzene was subjected to reacting at 70° to 75° C. for 8 hours with heating and stirring. After the reaction finished, a reaction product separated was collected with filtration and dried, whereby 96 parts of a polymer were obtained. A mixture of 84 parts of this polymer and 400 parts of a 10% aqueous sodium hydroxide solution was warmed up to 80° to 90° C. with stirring, whereby a water-soluble polymer having an average molecular weight of 4500 (122) was obtained. Next, to this polymer were added 10.1 parts of o-phthalic acid diglycidyl ester ("DENACOL EX-721", made by NAGASE CHEMICALS Co., Ltd.) and the mixture was maintained at the boiling point for 3 hours to complete a reaction, whereby a hydrophilic resin (124) was obtained.

EXAMPLE 125

Into a glass-made reaction vessel equipped with a thermometer, a stirrer, a dropping funnel, a gas-inlet tube, and a reflux condenser were placed 2326 parts of water, and the inside atmosphere of the flask was replaced with stirring by nitrogen gas and the flask was warmed up to 95° C. under the nitrogen atmosphere. Next, to this were added a mixture solution composed of 386.8 parts of sodium 2-sulfoethyl methacrylate, 53.8 parts of acrylic acid, and 13.5 parts of water, a mixture solution composed of 485.4 parts of sodium acrylate, and 826.6 parts of water, and 251.4 parts of a 10% aqueous ammonium persulfate solution during 2 hours. After the addition finished, 41.9 parts of 10% aqueous ammonium persulfate solution were further added during 20 minutes. After the addition finished, the reaction mixture was maintained at 95° C. for 1 hour to complete a polymerization reaction, whereby a water-soluble polymer having an average molecular weight of 4000 (123) was obtained.

Next, to 100 parts of this polymer (123) were added 100 parts of the water-soluble polymer (1) obtained from the example 1 and 2.34 parts of o-phthalic acid diglycidyl ester ("DENACOL EX-721", made by NAGASE CHEMICALS Co., Ltd.) and the mixture was maintained at the boiling point for 3 hours to complete a reaction and completely neutralized with an aqueous sodium hydroxide solution, whereby a hydrophilic resin (125) was obtained.

Example for comparison 9

Into a glass-made reaction vessel equipped with a thermometer, a stirrer, a dropping funnel, a gas-inlet tube, and a reflux condenser were placed 16.0 parts of methyl acrylate, 16.0 parts of acrylic acid, 0.64 parts of BPO, and 124.8 parts of IPA, and the inside atmosphere of the flask was replaced with stirring by nitrogen gas, the mixture in the flask was warmed up to the boiling point under the nitrogen atmosphere and maintained at this temperature for 30 minutes. Next, to this mixture was added a mixture solution composed of 64.0 parts of methyl acrylate, 64.0 parts of acrylic acid, 2.56 parts of BPO, and 499.2 parts of IPA during 3 hours and, after the addtition finished, were further added a dispersed solution composed of 0.32 parts of BPO and 6.08 parts of IPA twice with an hour interval. After the addition finished, the reaction mixture was maintained at the boiling point for 2 hours to complete a polymerization reaction, treated with distillation to remove IPA, and completely neutralized with an aqueous sodium hydroxide solution, whereby a copolymer for comparison (3) having an average molecular weight of 18,000 was obtained.

Example for comparison 10

Into a glass-made reaction vessel equipped with a thermometer, a stirrer, a dropping funnel, a gas-inlet tube, and a reflux condenser was placed a mixture composed of 5.30 parts of polyethyleneglycol dimethacrylate (an average mole number of added ethylene oxide is 9), 32.0 parts of methacrylic acid, 1.0 part of BPO, and 127.0 parts of IPA, and the inside atmosphere of the flask was replaced with stirring by nitrogen gas, the mixture in the flask was warmed up to the boiling point under the nitrogen atmosphere. Next, to this mixture was added a mixture composed of 6.17 parts of polyethyleneglycol dimethacrylate, 38.0 parts of methacrylic acid, 1.1 parts of BPO, and 150.9 parts of IPA during 2 hours and, after the addtition finished, was further added 10.7 parts of a 7% IPA solution of BPO during 1 hour. After the addition finished, the reaction mixture was maintained at the boiling point for 1 hour to complete a polymerization reaction, treated with distillation to remove IPA, and completely neutralized with an aqueous sodium hydroxide solution, whereby an aqueous solution of a copolymer for comparison (4) was obtained.

The average molucular weights (weight average) of the above-obtained water-soluble polymers and the average molucular weights (weight average) after hydrolysis (in said way) of the above-obtained copolymers were measured by GPC under said condition and results obtained are shown in the Table 5.

Also, viscosity of the hydrophilic resins and the copolymers above-obtained was measured in said way and results obtained are shown in the Table 5.

EXAMPLE 126

Ordinary portland cement was used as cement (made by Sumitomo Cement Co., Ltd.), river sand taken from Yodogawa as a fine aggregate (specific gravity of 2.51 and a fineness modulas [F.M.] of 2.78 ), crashed stones from Takatsuki ( specific gravity of 2.68 and a fineness modulas [F. M.] of 6.73 ) as a coarse aggregate, and the hydrophilic resin (112) obtained from the example 112 as a cement additive, and these materials were respectively weighted to make 30 l in amount of a kneaded mixture with a composition of a unit ratio of 320 kg/m$^3$ for cement, a unit ratio of 173 kg/m$^3$ for water (a ratio of water to cement was 54.2 %), a unit ratio of 934 kg/m$^3$ for fine aggregate, a unit ratio of 876 kg/m$^3$ for coarse aggregate (a ratio of fine aggregate was 52%), and an addition amount 0.12% (a ratio of the solid portion against cement) of the hydrophilic resin (112), and all the materials were placed into a tilting mixer. Immediately, the mixing and kneading were carried out for 3 minutes with a rotation number of 35 r.p.m., and a fluid concrete having an object slump of 18 cm and an object air amount of 4.5% was prepared ( in a case of that the object air amount is not attained, a slight amount of an air-entraining agent, [Vinsol] made by Yamaso Chemical Co., Ltd., was used). An flowing concrete obtained immediately after the kneading was sampled and its slump and air amount were measured.

After the kneading finished, the rotation number of the tilting mixer was reduced to 2 r.p.m., the mixing and kneading were further continued, and the slump and air amount were measured after 60 minutes, 90 minutes, and 120 minutes, to investigate their changes with time-passage.

Also, the compressive strength and setting time of the flowing concrete obtained were measured. Results obtained are shown in Table 5.

Besides, the measurement methods of the slump, air amount, compressive strength, and setting time and the method to take a sample for testing the compressive strength are based on the Japanese Industrial standards (JIS A6204).

EXAMPLES 127 to 139

The procedure of example 126 was repeated except that the hydrophilic resins (113) to (125) obtained from the examples 113 to 125 as shown in Table 5 were used as cement additives in the amounts for adding shown in Table 5, and flowing concretes thus-prepared were measured in the slump, air amount, compressive strength, and setting time. Results obtained are shown in Table 5.

Example for comparison 11

The procedure of example 126 was repeated except that the copolymer for comparison (3) was used as a cement additive in an amount for adding of 0.40% (against cement) instead of the hydrophilic resin (112), and a flowing concrete for comparison thus-prepared was measured in the slump, air amount, compressive strength, and setting time. Results obtained are shown in Table 5.

Example for comparison 12

The procedure of example 126 was repeated except that the copolymer for comparison (4) was used as a cement additive in an amount for adding of 0.35% (against cement) instead of the hydrophilic resin (112), and a flowing concrete for comparison thus-prepared was measured in the slump, air amount, compressive strength, and setting time. Results obtained are shown in Table 5.

TABLE 5

| | Water-soluble polymer | | Cement admixture used | | | The upper side: Slump (cm) The middle side: Air amount (%) The under side: Residual % of slump (*3) | | | | Condensation strength at | Setting time |
|---|---|---|---|---|---|---|---|---|---|---|---|
| | No. | Molecular weight (*1) | | Viscosity (cps) (*2) | Addition amount (solid portion, %) (against cement) | Immediately after kneading | after 60 minutes | after 90 minutes | after 120 minutes | age of 28 days (kg/cm$^2$) | (hour:minute) (beginning/ finishing) |
| Example 126 | (112) | 4,000 | Hydrophilic resin (112) | 8,000 | 0.30 | 12.3 4.0 — | 17.4 4.9 141 | 18.5 5.1 150 | 17.0 5.0 138 | 318 | 5:48/7:41 |
| Example 127 | (112) | 4,000 | Hydrophilic resin (113) | 9,000 | 0.40 | 18.0 4.0 — | 16.9 3.9 94 | 14.8 3.8 82 | 10.9 3.7 61 | 303 | 5:58/7:48 |
| Example 128 | (113) | 28,000 | Hydrophilic resin (114) | 49.1 | 0.30 | 17.8 4.5 — | 17.7 4.2 99 | 17.4 4.3 98 | 17.0 4.0 96 | 340 | 5:13/7:25 |
| Example 129 | (114) | 3,000 | Hydrophilic resin (115) | 30.4 | 0.20 | 18.3 4.9 — | 19.0 4.9 104 | 18.0 4.9 98 | 17.4 4.3 95 | 339 | 5:40/7:50 |
| Example 130 | (115) | 5,200 | Hydrophilic resin (116) | 46.7 | 0.20 | 17.8 4.5 — | 18.4 4.6 103 | 17.9 4.7 101 | 17.1 4.3 96 | 325 | 5:27/7:41 |
| Example 131 | (116) | 18,000 | Hydrophilic resin (117) | 73.4 | 0.22 | 17.8 4.1 — | 18.4 4.5 103 | 18.0 4.6 101 | 17.4 4.3 98 | 318 | 5:38/7:44 |
| Example 132 | (116) | 18,000 | Hydrophilic resin (118) | 84.3 | 0.35 | 17.3 4.3 — | 17.0 4.3 98 | 14.8 4.2 86 | 12.1 4.0 70 | 329 | 5:17/7:24 |
| Example 133 | (117) | 6,400 | Hydrophilic resin (119) | 38.1 | 0.30 | 18.3 4.0 — | 18.7 4.2 102 | 18.4 4.5 101 | 17.8 4.4 97 | 331 | 5:24/7:19 |
| Example 134 | (118) | 7,800 | Hydrophilic resin (120) | 55.8 | 0.30 | 17.2 3.8 — | 18.8 4.0 109 | 18.4 4.7 107 | 17.3 4.4 101 | 320 | 5:31/7:28 |
| Example 135 | (119) | 25,000 | Hydrophilic resin (121) | 80.4 | 0.30 | 18.8 4.5 — | 18.5 4.8 98 | 18.0 4.5 96 | 17.0 4.3 90 | 311 | 5:19/7:30 |

TABLE 5-continued

| | Water-soluble polymer | | Cement admixture used | | | The upper side: Slump (cm) The middle side: Air amount (%) The under side: Residual % of slump (*3) | | | | Con- densation strength at | Setting time |
|---|---|---|---|---|---|---|---|---|---|---|---|
| | No. | Molecular weight (*1) | | Viscosity (cps) (*2) | Addition amount (solid portion, %) (against cement) | Immediately after kneading | after 60 minutes | after 90 minutes | after 120 minutes | age of 28 days (kg/cm²) | (hour:minute) (beginning/ finishing) |
| Example 136 | (120) | 40,000 | Hydrophilic resin (122) | 104.5 | 0.30 | 18.3 4.7 — | 18.0 4.3 98 | 17.3 4.2 95 | 17.1 4.0 93 | 340 | 5:13/7:28 |
| Example 137 | (121) | 17,000 | Hydrophilic resin (123) | 43.1 | 0.26 | 18.4 3.7 — | 18.0 3.9 98 | 17.4 4.0 95 | 16.8 3.7 91 | 333 | 5:04/7:11 |
| Example 138 | (122) | 4,500 | Hydrophilic resin (124) | 31.3 | 0.23 | 17.8 4.0 — | 17.6 4.5 99 | 17.0 4.3 96 | 16.6 4.0 93 | 314 | 5:20/7:14 |
| Example 139 | (123) (1) | 4,000 20,000 | Hydrophilic resin (125) | 52.0 | 0.20 | 16.2 4.3 — | 19.8 4.5 122 | 19.2 4.4 119 | 19.0 4.3 117 | 353 | 5:18/7:24 |
| Example for comparison 11 | — | 18,000 | Copolymer for compari- son (3) | 18.4 | 0.40 | 17.9 3.8 — | 8.1 4.0 45 | — — — | — — — | 338 | 5:45/7:51 |
| Example for comparison 12 | — | 20,000 | Copolymer for compari- son (4) | 41.3 | 0.35 | 18.2 4.2 — | 7.5 4.0 41 | — — — | — — — | 302 | 6:25/8:31 |

(*1) Measured by G.P.C.
(*2) Measured by a B type rotational viscometer at 20° C. and 20%
(*3) Residual percentage of slump (%) = $\frac{\text{slump after 60 min. (90 min. or 120 min.)}}{\text{slump immediately after kneading}} \times 100$

EXAMPLE 140

Into a glass-made reaction vessel equipped with a thermometer, a stirrer, a dropping funnel, a gas-inlet tube, and a reflux condenser were placed 58.1 parts of water, and the inside atmosphere of the flask was replaced with stirring by nitrogen gas and the flask was warmed up to 50° C. under the nitrogen atmosphere. Next, to this were added a monomer mixture solution composed of 5.21 parts of 2-acrylamido-2-methylpropanesulfonic acid, 0.42 parts of sodium methacrylate, 20.5 parts of methacrylic acid, 93.9 parts of methoxypolyethyleneglycol monomethacrylate (an average mole number of added ethylene oxide is 9), and 187.7 parts of water and, in addition, 18.2 parts of a 20% aqueous ammonium persulfate solution and 9.12 parts of a 20% sodium hydrogen sulfite solution during 4 hours and, after the addition finished, 4.6 parts of a 20% aqueous ammonium persulfate solution and 2.3 parts of a 20% sodium hydrogen sulfite solution were further added during 1 hour. After the addition finished, the reaction mixture was maintained at 50° C. for 1 hour to complete a polymerization reaction, whereby an aqueous solution of a water-soluble polymer having an average molecular weight of 12,000 (140) was obtained.

Next, to this polymer were added 200.0 parts of water and 4.0 parts of o-phthalic acid diglycidyl ester ("DENACOL EX-721", made by NAGASE CHEMICALS Co., Ltd.) and the mixture was maintained at the boiling point for 3 hours to complete a reaction and completely neutralized with an aqueous sodium hydroxide solution, whereby a hydrophilic resin (140) was obtained.

EXAMPLE 141

Into a glass-made reaction vessel equipped with a thermometer, a stirrer, a dropping funnel, a nitrogen gas-inlet tube, and a reflux condenser were placed 58.1 parts of water, and the inside atmosphere of the flask was replaced with stirring by nitrogen gas and the flask was warmed up to 50° C. under the nitrogen atmosphere. Next, to this were added a monomer mixture solution composed of 5.21 parts of sodium 2-sulfoethylmethacrylate, 0.42 parts of sodium methacrylate, 20.5 parts of methacrylic acid, 93.9 parts of methoxypolyethylene glycol monomethacrylate (an average mole number of added ethylene oxide is 9), and 187.7 parts of water and, in addition, 18.2 parts of a 20% aqueous ammonium persulfate solution and 9.12 parts of a 20% sodium hydrogen sulfite solution during 4 hours, respectively and, after the addition finished, 4.6 parts of a 20% aqueous ammonium persulfate solution and 2.3 parts of a 20% sodium hydrogen sulfite solution were further added during 1 hour. After the addition finished, the reaction mixture was maintained at 50° C. for 1 hour to complete a polymerization reaction, whereby a 20% aqueous solution of a water-soluble polymer having an average molecular weight of 10,000 (141) was obtained. Next, to this polymer were added 3.2 parts of o-phthalic acid diglycidyl ester ("DENACOL EX-721", made by NAGASE CHEMICALS Co., Ltd.) and the mixture was maintained at the boiling point for 3 hours to complete a reaction and completely neutralized with an aqueous sodium hydroxide solution, whereby a hydrophilic resin (141) was obtained.

EXAMPLE 142

Into a glass-made reaction vessel equipped with a thermometer, a stirrer, a dropping funnel, a gas-inlet tube, and a reflux condenser were placed 707.5 parts of water, and the inside atmosphere of the flask was replaced with stirring by nitrogen gas and the flask was warmed up to the boiling point under the nitrogen atmosphere. Next, to this were added 180.0 parts of a 80% aqueous acrylic acid solution, 16.0 parts of vinylsulfonic acid and 195.6 parts of an 5% aqueous sodium persulfate solution during 4 hours. After the addition finished, the reaction mixture was maintained at the boiling point for 1 hour to complete a polymerization reaction and then, partially neutralized with an aqueous sodium hydroxide solution, whereby a water-soluble polymer having an average molecular weight of 5000 (142) was obtained. Next, to 500.0 parts of the aqueous solution of the water-soluble polymer (142) whose concentration was adjusted at 40% by distilling water were added 10.0 parts of the compound used in the example 16 ("DENACOL EX-202", made by NAGASE CHEMICALS Co., Ltd.) and the mixture was maintained at the boiling point for 3 hours to complete a reaction and completely neutralized with an aqueous sodium hydroxide solution, whereby a hydrophilic resin (142) was obtained.

EXAMPLE 143

Into a glass-made reaction vessel equipped with a thermometer, a stirrer, a dropping funnel, a gas-inlet tube, and a reflux condenser were placed 707.5 parts of water, and the inside atmosphere of the flask was replaced with stirring by nitrogen gas and the flask was warmed up to the boiling point under the nitrogen atmosphere. Next, to this were added 180.0 parts of a 80% aqueous acrylic acid solution, 16.0 parts of diethylaminoethylmethacrylamide, and 195.6 parts of an 5% aqueous sodium persulfate solution during 4 hours. After the addition finished, the reaction mixture was maintained at the boiling point for 1 hour to complete a polymerization reaction and then, partially neutralized with an aqueous sodium hydroxide solution, whereby a water-soluble polymer having an average molecular weight of 6000 (143) was obtained. Next, to 500.0 parts of the aqueous solution of the water-soluble polymer (143) whose concentration was adjusted at 40% by distilling water were added 10.0 parts of the compound used in the example 16 ("DENACOL EX-202", made by NAGASE CHEMICALS Co., Ltd.) and the mixture was maintained at the boiling point for 3 hours to complete a reaction and completely neutralized with an aqueous sodium hydroxide solution, whereby a hydrophilic resin (143) was obtained.

EXAMPLE 144

Into a glass-made reaction vessel equipped with a thermometer, a stirrer, a dropping funnel, a gas-inlet tube, and a reflux condenser were placed 760.9 parts of IPA, and the inside atmosphere of the flask was replaced with stirring by nitrogen gas and the flask was warmed up to the boiling point under the nitrogen atmosphere. Next, to this were added a mixture solution composed of 48.0 parts of a compound having the forementioned structure ("Kayarad R-526", made by Nippon Kayaku Co., Ltd.), 40.1 parts of 2-acrylamido-2-methylpropanesulfonic acid, 237.9 parts of methoxypolyethylene glycol monomethacrylate ("NK-ester M-9G", made by SHIN-NAKAMURA CHEMICAL Co., Ltd.; an average mole number of added ethylene oxide is 9), 108.2 parts of methacrylic acid, 15.1 parts of sodium methacrylate, and 624. 2 parts of water and, in addition, 151.7 parts of a 2.5% aqueous ammonium persulfate solution during 4 hours and, after the addition finished, 37.9 parts of a 2.5% aqueous ammonium persulfate solution were added during 1 hour. After the addition finished, the reaction mixture was maintained at the boiling point for 1 hour to complete a polymerization reaction, then treated with distillation to remove IPA, and completely neutralized with an aqueous sodium hydroxide solution, whereby an aqueous solution of a copolymer (144) was obtained. The viscosity of a 20% aqueous solution of this copolymer (144) is as shown in the table 6.

EXAMPLE 145

Into a glass-made reaction vessel equipped with a thermometer, a stirrer, a dropping funnel, a gas-inlet tube, and a reflux condenser were placed 760.9 parts of IPA, and the inside atmosphere of the flask was replaced with stirring by nitrogen gas and the flask was warmed up to the boiling point under the nitrogen atmosphere. Next, to this were added a mixture solution composed of 48.0 parts of a compound having the following structure ("DA-721", made by NAGASE CHEMICALS Co., Ltd.), 40.1 parts of 2-sulfoethylmethacrylate, 237.9 parts of methoxypolyethylene glycol monomethacrylate ("NK-ester M-9G ", made by SHIN-NAKAMURA CHEMICAL Co., Ltd.; an average mole number of added ethylene oxide is 9), 108.2 parts of methacrylic acid, 15.1 parts of sodium methacrylate, and 624.2 parts of water and, in addition, 151.7 parts of a 2.5% aqueous ammonium persulfate solution during 4 hours and, after the addition finished, 37.9 parts of a 2.5% aqueous ammonium persulfate solution were added during 1 hour. After the addition finished, the reaction mixture was maintained at the boiling point for 1 hour to complete a polymerization reaction, then treated with distillation to remove IPA, and completely neutralized with an aqueous sodium hydroxide solution, whereby an aqueous solution of a copolymer (145) was obtained. The viscosity of a 20% aqueous solution of this copolymer (145) is as shown in the Table 6.

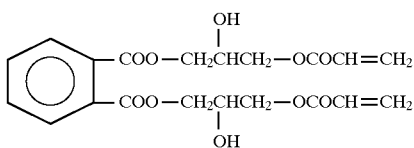

EXAMPLE 146

Into a glass-made reaction vessel equipped with a thermometer, a stirrer, a dropping funnel, a gas-inlet tube, and a reflux condenser were placed 760.9 parts of IPA, and the inside atmosphere of the flask was replaced with stirring by nitrogen gas and the flask was warmed up to the boiling point under the nitrogen atmosphere. Next, to this were added a mixture solution composed of 48.0 parts of a compound having the forementioned structure ("Kayarad R-526", made by Nippon Kayaku Co., Ltd.), 40.1 parts of N,N-dimethylaminoethyl methacrylate, 237.9 parts of methoxypolyethylene glycol monomethacrylate ("NK-ester M-9G", made by SHIN-NAKAMURA CHEM ICAL Co., Ltd.; an average mole number of added ethylene oxide is 9), 108.2 parts of methacrylic acid, 15.1 parts of sodium methacrylate, and 624.2 parts of water and, in addition, 151.7 parts of a 2.5% aqueous ammonium persulfate solution during 4 hours and, after the addition finished, 37.9 parts of a 2.5 % aqueous ammonium persulfate solution were added during 1 hour. After the addition finished, the reaction mixture was maintained at the boiling point for 1 hour to complete a polymerization reaction, then treated with distillation to remove IPA, and completely neutralized with an aqueous sodium hydroxide solution, whereby an aqueous solution of a copolymer (146) was obtained. The viscosity of a 20% aqueous solution of this copolymer (146) is as shown in the table 6.

EXAMPLE 147

Into a glass-made reaction vessel equipped with a thermometer, a stirrer, a dropping funnel, a gas-inlet tube, and a reflux condenser were placed 760.9 parts of IPA, and the inside atmosphere of the flask was replaced with stirring by nitrogen gas and the flask was warmed up to the boiling point under the nitrogen atmosphere. Next, to this were added a mixture solution composed of 48.0 parts of a compound having the forementioned structure ("Kayarad R-526", made by Nippon Kayaku Co., Ltd.), 60.2 parts of styrenesulfonic acid, 217.8 parts of methoxypolyethylene glycol monomethacrylate ("NK-ester M-9G", made by SHIN-NAKAMURA CHEMICAL Co., Ltd.; an average mole number of added ethylene oxide is 9), 108.2 parts of methacrylic acid, 15.1 parts of sodium methacrylate, and 624.2 parts of water and, in addition, 151.7 parts of a 2.5% aqueous ammonium persulfate solution during 4 hours and, after the addition finished, 37.9 parts of a 2.5% aqueous ammonium persulfate solution were added during 1 hour. After the addition finished, the reaction mixture was maintained at the boiling point for 1 hour to complete a polymerization reaction, then treated with distillation to remove IPA, and completely neutralized with an aqueous sodium hydroxide solution, whereby an aqueous solution of a copolymer (147) was obtained. The viscosity of a 20% aqueous solution of this copolymer (147) is as shown in the Table 6.

EXAMPLE 148

Into a glass-made reaction vessel equipped with a thermometer, a stirrer, a dropping funnel, a gas-inlet tube, and a reflux condenser were placed 760.9 parts of IPA, and the inside atmosphere of the flask was replaced with stirring by nitrogen gas and the flask was warmed up to the boiling point under the nitrogen atmosphere. Next, to this were added a mixture solution composed of 48.0 parts of a compound having the forementioned structure ("Kayarad R-526", made by Nippon Kayaku Co., Ltd.), 60.2 parts of vinylsulfonic acid, 217.8 parts of methoxypolyethylene glycol monomethacrylate ("NK-ester M-9G", made by SHIN-NAKAMURA CHEMICAL Co., Ltd.; an average mole number of added ethylene oxide is 9), 108.2 parts of methacrylic acid, 15.1 parts of sodium methacrylate, and 624.2 parts of water and, in addition, 151.7 parts of a 2.5% aqueous ammonium persulfate solution during 4 hours and, after the addition finished, 37.9 parts of a 2.5% aqueous ammonium persulfate solution were added during 1 hour. After the addition finished, the reaction mixture was maintained at the boiling point for 1 hour to complete a polymerization reaction, then treated with distillation to remove IPA, and completely neutralized with an aqueous sodium hydroxide solution, whereby an aqueous solution of a copolymer (148) was obtained. The viscosity of a 20% aqueous solution of this copolymer (148) is as shown in the Table 6.

EXAMPLE 149

Into a glass-made reaction vessel equipped with a thermometer, a stirrer, a dropping funnel, a gas-inlet tube, and a reflux condenser were placed 760.9 parts of IPA, and the inside atmosphere of the flask was replaced with stirring by nitrogen gas and the flask was warmed up to the boiling point under the nitrogen atmosphere. Next, to this were added a mixture solution composed of 50.0 parts of a compound having the following structure ("DM-832", made by NAGASE CHEMICALS Co., Ltd.), 80.3 parts of diethylaminoethylmethacrylamide$_1$ 197.7 parts of methoxypolyethylene glycol monomethacrylate ("NK-ester M-9G", made by SHIN-NAKAMURA CHEMICAL Co., Ltd.; an average mole number of added ethylene oxide is 9), 108.2 parts of methacrylic acid, 15.1 parts of sodium methacrylate, and 624.2 parts of water and, in addition, 151.7 parts of a 2.5% aqueous ammonium persulfate solution during 4 hours and, after the addition finished, 37.9 parts of a 2.5 % aqueous ammonium persulfate solution were added during 1 hour. After the addition finished, the reaction mixture was maintained at the boiling point for 1 hour to complete a polymerization reaction, then treated with distillation to remove IPA, and completely neutralized with an aqueous sodium hydroxide solution, whereby an aqueous solution of a copolymer (149) was obtained. The viscosity of a 20% aqueous solution of this copolymer (149) is as shown in the Table 6.

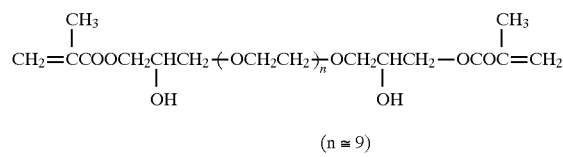

The average molucular weights (weight average) of the above-obtained water-soluble polymers and the average molucular weights (weight average) after hydrolysis (in said way) of the above-obtained copolymers were measured by GPC under said condition and results obtained are shown in the Table 6.

Also, viscosity of the hydrophilic resins and the copolymers above-obtained was measured in said way and results obtained are shown in the Table 6.

EXAMPLE 150

Ordinary portland cement was used as cement (made by Sumitomo Cement Co., Ltd.), river sand taken from Yodogawa as a fine aggregate (specific gravity of 2.51 and a fineness modulas [F.M.] of 2.78), crashed stones from Takatsuki (specific gravity of 2.68 and a fineness modulas [F.M.] of 6.73) as a coarse aggregate, and the hydrophilic resin (140) obtained from the example 140 as a cement additive, and these materials were respectively weighted to make 30 l in amount of a kneaded mixture with a composition of a unit ratio of 320 kg/m$^3$ for cement, a unit ratio of 173 kg/m$^3$ for water (a ratio of water to cement was 54.2%), a unit ratio of 934 kg/m$^3$ for fine aggregate, a unit ratio of 876 kg/m$^3$ for coarse aggregate (a ratio of fine aggregate was 52%), and an addition amount 0.15% (a ratio of the solid portion against cement) of the hydrophilic resin (140), and all the materials were placed into a tilting mixer. Immediately, the mixing and kneading were carried out for 3 minutes with a rotation number of 35 r.p.m., and a flowing concrete having an object slump of 18 cm and an object air amount of 4.5% was prepared (in a case of that the object air amount is not attained, a slight amount of an air-entraining agent, [Vinsol] made by Yamaso Chemical Co., Ltd., was used). An flowing concrete obtained immediately after the kneading was sampled and its slump and air amount were measured.

After the kneading finished, the rotation number of the tilting mixer was reduced to 3 r.p.m., the mixing and kneading were further continued, and the slump and air amount were measured after 60 minutes, 90 minutes, and 120 minutes, to investigate their changes with time-passage.

Also, the compressive strength and setting time of the flowing concrete obtained were measured. Results obtained are shown in Table 6.

Besides, the measurement methods of the slump, air amount, compressive strength, and setting time and the method to take a sample for testing the compressive strength are based on the Japanese Industrial standards (JIS A6204).

EXAMPLES 151 to 153

The procedure of example 150 was repeated except that the hydrophilic resins (141) to (143) obtained from the examples 141 to 143 as shown in Table 6 were used as cement additives in the amounts for adding shown in Table 6, and flowing concretes thus-prepared were measured in the slump, air amount, compressive strength, and setting time. Results obtained are shown in Table 6.

EXAMPLES 154 to 159

The procedure of example 150 was repeated except that the copolymers (144) to (149) obtained from the examples 144 to 149 as shown in Table 6 were used as cement additives in the amounts for adding shown in Table 6, and flowing concretes thus-prepared were measured in the slump, air amount, compressive strength, and setting time. Results obtained are shown in Table 6.

structural unit at least one divalent group having the following formula (I) is formed $$-R^1-\underset{\underset{O}{\|}}{C}-O-R^2- \qquad (I)$$

wherein $R^1$ and $R^2$ independently are selected from the group consisting of:

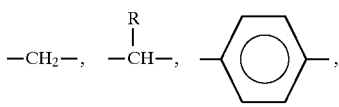

TABLE 6

| | Water-soluble polymer | | Cement admixture used | | | The upper side: Slump (cm) The middle side: Air amount (%) The under side: Residual % of slump (*3) | | | | Condensation strength | Setting time |
|---|---|---|---|---|---|---|---|---|---|---|---|
| | No. | Molecular weight (*1) | | Viscosity (cps) (*2) | Addition amount (solid portion, %) (against cement) | Immediately after kneading | after 60 minutes | after 90 minutes | after 120 minutes | at age of 28 days (kg/cm²) | (hour:minute) (beginning/finishing) |
| Example 150 | (140) | 12,000 | Hydrophilic resin (140) | 2,100 | 0.15 | 18.9 5.1 — | 18.9 5.1 100 | 18.0 5.0 95 | 17.5 4.9 93 | 338 | 5:10/7:40 |
| Example 151 | (141) | 10,000 | Hydrophilic resin (141) | 900 | 0.15 | 18.4 4.8 — | 18.0 4.9 98 | 17.4 4.7 95 | 17.0 4.6 92 | 350 | 5:12/7:29 |
| Example 152 | (142) | 5,000 | Hydrophilic resin (142) | 1,200 | 0.22 | 18.6 4.3 — | 18.8 4.5 101 | 18.3 4.8 98 | 17.5 4.5 94 | 343 | 5:40/7:51 |
| Example 153 | (143) | 6,000 | Hydrophilic resin (143) | 1,800 | 0.26 | 18.0 4.0 — | 18.3 4.3 102 | 18.4 4.7 102 | 17.8 4.5 99 | 330 | 5:38/7:43 |
| Example 154 | — | 15,000 (*4) | Copolymer (144) | 90.4 | 0.12 | 18.3 4.5 — | 18.5 4.7 101 | 18.4 4.9 101 | 17.8 4.6 97 | 337 | 5:30/7:40 |
| Example 155 | — | 12,000 (*4) | Copolymer (145) | 68.3 | 0.12 | 17.8 4.3 — | 18.5 4.6 104 | 18.2 4.5 102 | 17.1 4.1 96 | 351 | 5:21/7:15 |
| Example 156 | — | 13,000 (*4) | Copolymer (146) | 75.4 | 0.14 | 18.3 4.0 — | 18.5 4.5 101 | 18.0 4.7 98 | 17.3 4.1 95 | 320 | 5:13/7:27 |
| Example 157 | — | 13,000 (*4) | Copolymer (147) | 80.1 | 0.12 | 18.1 4.3 — | 18.3 4.6 101 | 18.5 4.8 102 | 18.0 4.2 99 | 341 | 5:18/7:21 |
| Example 158 | — | 10,000 (*4) | Copolymer (148) | 61.8 | 0.12 | 17.8 4.0 — | 18.0 4.4 101 | 18.2 4.6 102 | 17.5 4.2 98 | 323 | 5:29/7:41 |
| Example 159 | — | 12,000 (*4) | Copolymer (149) | 78.5 | 0.12 | 18.5 4.8 — | 17.8 4.7 96 | 16.5 4.5 89 | 12.4 4.1 67 | 337 | 5:10/7:15 |

(*1) Measured by G.P.C.
(*2) Measured by a B type rotational viscometer at 20° C. and 20%
(*3) Residual percentage of slump (%) =slump after 60 min. (90 min. or 120 min.)/slump immediately after kneading × 100
(*4) Molecular weight after hydrolysis of copolymer From the result as shown in the Tables 1 to 6, it is apparent that cement additives of the peresent invention show almost no retardation of setting and manifest a superior property to prevent a slump loss.

We claim:

1. A hydraulic composition comprising a hydraulic material, water and a cement additive comprising a crosslinked polymer in which, between main chains having a water-soluble polymer structure of a weight average molecular weight from 500 to 100,000, a bond having as a -continued

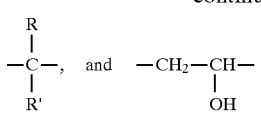

with the proviso that R¹ is not required if R²is

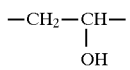

and wherein R and R' independently denote an alkyl group of carbon number of 1 to 5,
   wherein said main chains comprise at least one member selected from the group consisting of —COOM,  —COO—(R⁵O)$_m$—R⁶—SO₃M, —CONH—R⁷—SO₃M,  —(CH₂)$_n$—SO₃M, and

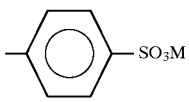

wherein m is 0 or an integral number of 1 to 50;
   n is 0 or 1;
   M is at least one member selected from the group consisting of a hydrogen atom, a monovalent, divalent or trivalent metal group, an ammonium group and an organic amine group;
   R¹ and R⁶ independently denote an alkylene group of carbon number 2 to 4;
   R⁷ denotes an alkylene group of carbon number 1 to 5;
   with the proviso that when m is at least 2, a plurality of R⁵O may be the same or different and, when a plurality of R⁵O are different from one another, their arrangement may be regular or irregular;
   and wherein said crosslinked polymer is capable of forming a water-soluble polymer by cleavage of the divalent group in an alkaline medium.

2. A hydraulic composition as claimed in claim 1, wherein said main chains comprise said —COOM.

3. A hydraulic composition as claimed in claim 1, wherein said main chains comprise said —COOM and at least one member selected from the group consisting of said —COO—(R⁵O)$_m$—R⁶—SO₃M, said —CONH—R⁷—SO₃M, said —(CH₂)$_n$—SO₃M, and

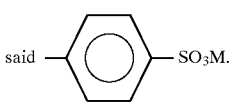

4. A hydraulic composition as claimed in claim 3, wherein said main chains comprise said —COOM and said —COO—(R⁵O)$_m$—R⁶—SO₃M.

5. A hydraulic composition as claimed in claim 3, wherein said main chains comprise said —COOM and said —CONH—R⁷—SO₃M.

6. A hydraulic composition as claimed in claim 3, wherein said main chains comprise said —COOM and said —(CH₂)$_n$—SO₃

7. A hydraulic composition as claimed in claim 3, wherein said main chains comprise said —COOM and

8. A hydraulic composition comprising a hydraulic material, water and a cement additive obtained from a method for producing a cement additive which comprises obtaining a crosslinked polymer by combining water-soluble polymers having a weight average molecular weight of 500 to 100,000 to one another by using a crosslinking agent which has a structural unit or is capable of forming at least one divalent group having the following formula (I):

$$-R^1-\underset{\underset{O}{\|}}{C}-O-R^2-\qquad(I)$$

wherein R¹ and R² independently are selected from the group consisting of:

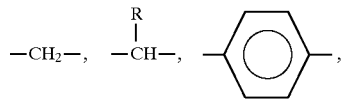

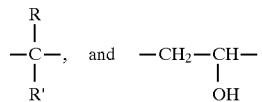

with the proviso that R¹ is not required if R² is

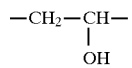

and wherein R and R' independently denote an alkyl group of carbon number of 1 to 5,
   wherein the water-soluble polymer comprises at least one member selected from the group consisting of —COOM,  —COO—(R⁵O)$_m$—R⁶—SO₃M, —CONH—R⁷—SO₃M,  —(CH₂)$_n$—SO₃M, and

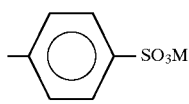

wherein m is 0 or an integral number of 1 to 50;
   n is 0 or 1;
   M is at least one member selected from the group consisting of a hydrogen atom, a monovalent, divalent or trivalent metal group, an ammonium group and an organic amine group;
   R⁵ and R⁶ independently denote an alkylene group of carbon number 2 to 4;
   R⁷ denotes an alkylene group of carbon number 1 to 5;
   with the proviso that when m is at least 2, a plurality of R⁵O may be the same or different and when a plurality of $R^5O$ are different from one another, their arrangement may be regular or irregular;

and wherein said crosslinked polymer is capable of forming a water-soluble polymer by cleavage of the divalent group in an alkaline medium.

9. A hydraulic composition as claimed in claim 8, wherein said method comprises obtaining a crosslinked polymer by reacting a water-soluble polymer with a crosslinking agent, wherein the water-soluble polymer is derived from an undermentioned monomer (iv) present in an amount of 1 to 99% by weight and an undermentioned monomer (i) present in an amount of 1 to 99% by weight such that the total of (iv) and (i) is 100% by weight and the crosslinking agent has a functional group capable of reacting with a functional group selected from the group consisting of a carboxyl group and a sulfonate group contained in the water-soluble polymer, and the crosslinking agent and water-soluble polymer are used in an amount of 0.001 to 1.0 in the mole ratio between a functional group of the agent and a functional group of the polymer

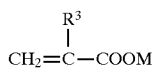    (i)

wherein M is at least one member selected from the group consisting of a hydrogen atom, a monovalent, divalent or trivalent metal group, an ammonium group, and an organic amine group; $R^3$ denotes H or $CH_3$

    (iv)

wherein M and $R^3$ are defined above; and $R^7$ denotes an alkylene group of carbon number of 1 to 5.

10. A hydraulic composition as claimed in claim 8, wherein said method comprises obtaining a crosslinked polymer by reacting a water-soluble polymer with a crosslinking agent, wherein the water-soluble polymer is derived from an undermentioned monomer (iv) present in an amount of 1 to 98 % by weight, an undermentioned monomer (i) present in an amount of 1 to 98% by weight, and an undermentioned monomer (xiv) in a series of (poly) alkyleneglycol mono(meth)acrylic acid esters present in an amount of 1 to 70% by weight, such that the total mount of (iv), (i), and (xiv) is 100% by weight, and the crosslinking agent has a functional group capable of reacting with a functional group selected from the group consisting of a carboxyl group, a sulfonate group and a hydroxyl group contained in the water-soluble polymer, and the crosslinking agent and water-soluble polymer are present in an amount of 0.001 to 1.0 in the mole ratio between a functional group of the agent and a functional group of the polymer

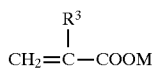    (i)

wherein M is at least one member selected from the group consisting of a hydrogen atom, a monovalent, divalent or trivalent metal groups, an ammonium group and an organic amine group; $R^3$ denotes H or $CH_3$

    (iv)

wherein M and $R^3$ are defined above; $R^7$ denotes an alkylene group of carbon number of 1 to 5

    (xiv)

wherein u is an integral number of 1 to 100; $R^3$ is defined above; $R^5$ denotes an alkylene group of carbon number 2 to 4; $R^{10}$ denotes H or an alkyl group of carbon number 1 to 5 with the proviso that, when u is at least 2, a plurality of $R^5O$ may be the same or different and, when a plurality of $R^5O$ are different from one another, their arrangement may be regular or irregular.

11. A hydraulic composition as claimed in claim 8, wherein said method comprises obtaining a crosslinked polymer by reacting a water-soluble polymer and a crosslinking agent, wherein the water-soluble polymer is derived from an undermentioned monomer (iii) present in an amount of 1 to 99% by weight and an undermentioned monomer (i) present in an amount of 1 to 99 % by weight such that the total amount of (iii) and (i) is 100% by weight and the crosslinking agent has a functional group capable of reacting with a functional group selected from the group consisting of a carboxyl group and a sulfonate group being contained in the water-soluble polymer, and the crosslinking agent and water-soluble polymer are present in an amount of 0.001 to 1.0 in the mole ratio between a functional group of the agent and a functional group of the polymer

    (i)

wherein M is at least one member selected from the group consisting of a hydrogen atom, a monovalent, divalent or trivalent metal group, or an ammonium group or an organic amine group; $R^3$ denotes H or $CH_3$

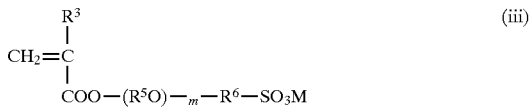    (iii)

wherein m is 0 or an integral number of 1 to 50; M and $R^3$ are defined above; $R^5$ and $R^6$ independently denote an alkylene group of carbon number 2 to 4 with the proviso that when m is two or more, a plurality of $R^5O$ may be the same or different and, when a plurality of $R^5O$ are different from one another, their arrangement may be regular or irregular.

12. A hydraulic composition as claimed in claim 8, wherein said method comprises obtaining a crosslinked polymer by reacting a water-soluble polymer with a crosslinking agent, wherein the water-soluble polymer is derived from an undermentioned monomer (iii) present in an amount of 1 to 98% by weight, an undermentioned monomer (i) present in an amount of 1 to 98% by weight, and an undermentioned monomer (xiv) in a series of (poly) alkyleneglycol mono(meth)acrylic acid esters present in an amount of 1 to 70% by weight such that the total amount of (iii), (i) and (xiv) is 100% by weight, and the crosslinking agent has a functional group capable of reacting with a functional group selected from the group consisting of a carboxyl group, a sulfonate group and a hydroxyl group being contained in the water-soluble polymer, and the crosslinking agent and water-soluble polymer are present in an amount of 0.001 to 1.0 in the mole ratio between a functional group of the agent and a functional group of the polymer

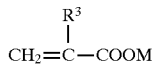 (i)

wherein M is at least one member selected from the group consisting of a hydrogen atom, a monovalent, divalent or trivalent metal group, an ammonium group, and an organic amine group; $R^3$ denotes H or $CH_3$

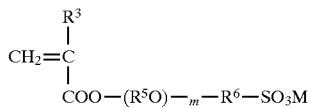 (iii)

wherein m is 0 or an integral number of 1 to 50; M and $R^3$ are defined above; $R^5$ and $R^6$ independently denote an alkylene group of carbon number 2 to 4, with the proviso that when m is two or more, a plurality of $R^5O$ may be the same or different, and, when a plurality of $R^5O$ are different from one another, their arrangement may be regular or irregular

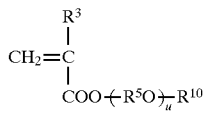 (xiv)

wherein u is an integral number of 1 to 100; $R^3$ and $R^5$ are defined above; $R^{10}$ denotes H or an alkyl group of carbon number 1 to 5 with the proviso that when u is at least 2, a plurality of $R^5O$ may be the same or different and, when a plurality of $R^5O$ are different from one another, their arrangement may be regular or irregular.

13. A hydraulic composition comprising a hydraulic material, water and a cement additive obtained from a method for producing a cement additive which comprises obtaining a crosslinked polymer by a polymerization reaction of a monomer (e), which has at least two polymerizable double bonds and has as a structural unit at least one divalent group having the below- described formula (I) between the double bonds, with a monomer (f), which has one polymerizable double bond capable of copolymerizing with the double bond in (e) and is able to form a main chain structure capable of leading to a water-soluble polymer of a weight average molecular weight of 500 to 100,000

 (I)

wherein $R^1$ and $R^2$ independently are selected from the group consisting of:

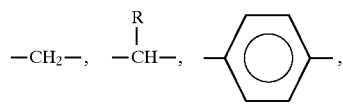

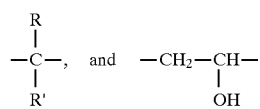

with the proviso that $R^1$ is not required if

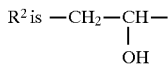

and wherein R and R' independently denote an alkyl group of carbon number of 1 to 5,
wherein the water-soluble polymer comprises at least one member selected from the group consisting of

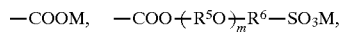

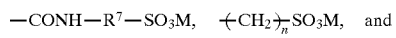 and

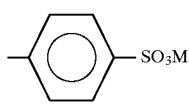

wherein m is 0 or an integral number of 1 to 50;
n is 0 or 1;
M is at least one member selected from the group consisting of a hydrogen atom, a monovalent, divalent or trivalent metal group, an ammonium group and an organic amine group;
$R^5$ and $R^6$ independently denote an alkylene group of carbon number 2 to 4;
$R^7$ denotes an alkylene group of carbon number 1 to 5;
with the proviso that when m is at least 2, a plurality of $R^5O$ may be the same or different and, when a plurality of $R^5O$ are different from one another, their arrangement may be regular or irregular;
and wherein said crosslinked polymer is capable of forming a water-soluble polymer by cleavage of the divalent group in an alkaline medium.

14. A hydraulic composition as claimed in claim 13, wherein said method comprises obtaining a crosslinked polymer by copolymerizing said monomer (e), a below-described monomer (iv), a below described monomer in a ratio of 0.1 to 50% by weight of the monomer (e), 1 to 98.9% by weight of the monomer (iv), and 1 to 98.9% by weight of the monomer [in a series of (meth)acrylic acids] (i) such that the total of (e), (iv), and (i) is 100% by weight

 (i)

wherein M is at least one member selected from the group consisting of a hydrogen atom, a monovalent, divalent or trivalent metal group, an ammonium group and an organic amine group; $R^3$ denotes H or $CH_3$

 (iv)

wherein M and $R^3$ are as defined above; and $R^7$ denotes alkylene group of carbon number of 1 to 5.

15. A hydraulic composition as claimed in claim 13, wherein said method comprises obtaining a crosslinked polymer by copolymerizing said monomer (e), a monomer (xiv) in a series of (poly)alkyleneglycol mono(meth) acrylates, a monomer (iv), and a monomer (i) in a ratio of 0.1 to 50% by weight of the monomer (e), 1 to 70% by weight of the monomer (xiv) in the series of (poly)alkyleneglycol (meth)acrylates, I to 97.9% by weight of the monomer (iv), and 1 to 97.9% by weight of the monomer (i) such that the total amount of (e), (xiv), (iv) and (i) is 100% by weight

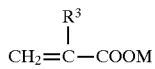 (i)

wherein M is at least one member selected from the group consisting of a hydrogen atom, a monovalent, divalent or trivalent metal group, an ammonium group and an organic amine group; $R^3$ denotes H or $CH_3$

 (iv)

wherein M and $R^3$ are defined above; $R^7$ denotes an alkylene group of carbon number of 1 to 5

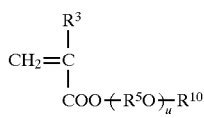 (xiv)

wherein u is an integral number of 1 to 100; $R^3$ is defined above; $R^5$ denotes an alkylene group of carbon number 2 to 4; $R^{10}$ denotes H or an allyl group of carbon number 1 to 5 with the proviso that when u is at least 2, a plurality of $R^5O$ may be the same or different and, when a plurality of $R^5O$ are different from one another, their arrangement may be regular or irregular.

16. A hydraulic composition as claimed in claim 13, where said method comprises obtaining a crosslinked polymer by copolymerizing said monomer (e), a monomer (iii), and a monomer (i) in a ratio of 0.1 to 50% by weight of the monomer (e), 1 to 98.9% by weight of the monomer (iii), and 1 to 98.9% by weight of the monomer (i), such that the total of (e), (iii) and (i) is 100% by weight

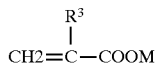 (i)

wherein M is at least one member selected from the group consisting of a hydrogen atom, a monovalent, divalent or trivalent metal group, an ammonium group, and an organic amine group; $R_3$ denotes H or $CH_3$

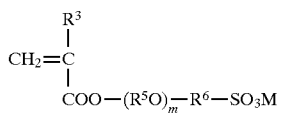 (iii)

wherein m is 0 or an integral number of 1 to 50; M and $R^3$ are defined above; $R^5$ and $R^6$ independently denote an alkylene group of carbon number 2 to 4, with the proviso that when m is at least two, a plurality of $R^5O$ may be the same or different and, when a plurality of $R^5O$ are different from one another, their arrangement may be regular or irregular.

17. A hydraulic composition as claimed in claim 13, where said method comprises obtaining a crosslinked polymer by copolymerizing said monomer (e), a monomer (xiv) in a series of (poly)alkyleneglycol mono(meth)acrylates, a monomer (iii), and a monomer (i) in a ratio of 0.1 to 50% by weight of the monomer (xiv) in a series of (poly) alkyleneglycol mono(meth)acrylates, 1 to 97.9% by weight of the monomer (i), such that the total of (e), (xiv), (iii) and (i) is 100% by weight

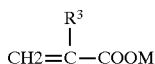 (i)

wherein M is at least one member selected from the group consisting of a hydrogen atom, a monovalent, divalent or trivalent metal group, an ammonium group, and an organic amine group; $R_3$ denotes H or $CH_3$

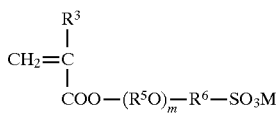 (iii)

wherein m is 0 or an integral number of 1 to 50; M and $R^3$ are defined above; $R^5$ and $R^6$ independently denote an alkylene group of carbon number 2 to 4, with the proviso that when m is two or more, a plurality of $R^5O$ may be the same or different and, when a plurality of $R^5O$ are different from one another, their arrangement may be regular or irregular.

18. A hydraulic composition as claimed in claim 13, in which a monomer (e) is at least one member selected from the group consisting of:

a product from a reaction of at least one compound selected from monoester diols and polyester polyols with a polymerizable monomer having a functional group capable of reacting with a hydroxy group in said diols and polyols;

a product from a reaction of at least one compound selected from monoester dicarboxylic acids and polyester polycarboxylic acids with a polymerizable monomer having a functional group capable of reacting with a carboxyl group in said acids;

a product from a reaction of at least one compound selected from polyols and polyepoxy compounds with a polymerizable monomer having a carboxyl group separated from a polymerizable double bond by at least one carbon atom;

a product from a reaction of at least one compound selected from polycarboxylic acids with a polymerizable monomer having a hydroxyl group or an epoxy group separated from a polymerizable double bond by at least one carbon atom; and a product from a reaction of at least one compound selected from monoester polyepoxy compounds and polyester polyepoxy compound having a functional group capable of reacting with the epoxy group in said polyoxy compound.

19. A method of dispersing a hydraulic material, comprising mixing a cement additive, water and a hydraulic material, wherein said cement additive comprises a crosslinked polymer in which, between main chains having a water-soluble polymer structure of a weight average molecular weight from 500 to 100,000, a bond having as a structural unit at least one divalent group having the following formula (I) is formed

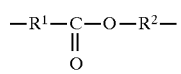 (I)

wherein $R^1$ and $R^2$ independently are selected from the group consisting of:

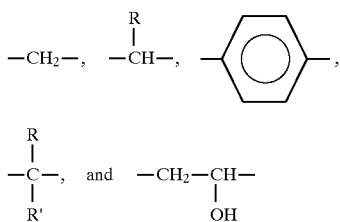

with the proviso that R' is not required if

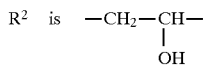

and wherein R and $R^1$ independently denote an alkyl group of carbon number of 1 to 5, wherein said main chains comprise at least one member selected from the group consisting of

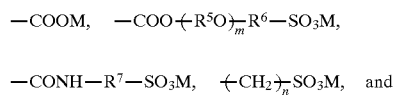

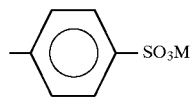

wherein m is 0 or an integral number of 1 to 50;
n is 0 or 1;
M is at least one member selected from the group consisting of a hydrogen atom, a monovalent, divalent or trivalent metal group, an ammonium group and an organic amine group;
$R^5$ and $R^6$ independently denote an alkylene group of carbon number 2 to 4;
$R^7$ denotes an alkylene group of carbon number 1 to 5;
with the proviso that when m is at least 2, a plurality of $R^5O$ may be the same or different and, when a plurality of $R^5O$ are different from one another, their arrangement may be regular or irregular;
and said crosslinked polymer forming said water-soluble polymer by cleavage of the divalent group of said crosslinked polymer, in an alkaline medium to maintain dispersion of said hydraulic material to water.

20. A method for dispersing a hydraulic material as claimed in claim 19, wherein said main chains comprise said —COOM.

21. A method of dispersing a hydraulic material as claimed in claim 19, wherein said main chains comprise said —COOM and at least one member selected from the group consisting of said $-COO$$\cdot$$(R^5O)_{\overline{m}}R^6-SO_3M$, said $-CONH-R^7-SO_3M$,

22. A method of dispersing a hydraulic material as claimed in claim 21, wherein said main chains comprise said —COOM and said $-COO$$\cdot$$(R^5O)_{\overline{m}}R^6-SO_3M$.

23. A method of dispersing a hydraulic material as claimed in claim 21, wherein said main chains comprise said —COOM and said $-CONH-R^7-SO_3M$.

24. A method of dispersing a hydraulic material as claimed in claim 21, wherein said main chains comprise said —COOM and said $-$($CH_2$)$_{\overline{n}}$$SO_3M$.

25. A method of dispersing a hydraulic material as claimed in claim 21, wherein said main chains comprise said —COOM and

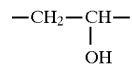

26. A method of dispersing a hydraulic material comprising mixing a cement additive, water and a hydraulic material, wherein said cement additive is obtained from a method for producing a cement additive which comprises obtaining a crosslinked polymer by combining water-soluble polymers having a weight average molecular weight of 500 to 100,000 to one another by using a crosslinking agent which has a structural unit or is capable of forming at least one divalent group having the following formula (I):

$$-R^1-\underset{\underset{O}{\|}}{C}-O-R^2- \qquad (I)$$

wherein $R^1$ and $R^2$ independently are selected from the group consisting of:

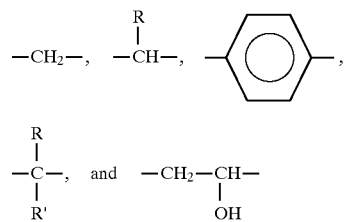

with the proviso that $R^1$ is not required if $R^2$ is $$-CH_2-\underset{\underset{OH}{|}}{CH}-$$

and wherein R and R' independently denote an alkyl group of carbon number of 1 to 5, wherein the water-soluble polymer comprises at least one member selected from the group consisting of $-COOM$, $-COO$$\cdot$$(R^5O)_{\overline{m}}R^6-SO_3M$, $-CONH-R^7-SO_3M$, $-$($CH_2$)$_{\overline{n}}$$SO_3M$, and -continued

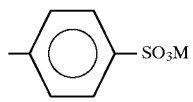

wherein m is 0 or an integral number of 1 to 50;
n is 0 or 1;
M is at least one member selected from the group consisting of a hydrogen atom, a monovalent, divalent or trivalent metal group, an ammonium group and an organic amine group;
$R^5$ and $R^6$ independently denote an alkylene group of carbon number 2 to 4;
$R^7$ denotes an alkylene group of carbon number 1 to 5;
with the proviso that when m is at least 2, a plurality of $R^5O$ may be the same or different and when a plurality of $R^5O$ are different from one another, their arrangement may be regular or irregular;
and said crosslinked polymer forming a water-soluble polymer by cleavage of the divalent group of said crosslinked polymer in an alkaline medium.

27. A method of dispersing a hydraulic material as claimed in claim 26, wherein said method for producing a cement additive comprises obtaining a crosslinked polymer by reacting a water-soluble polymer with a crosslinking agent, wherein the water-soluble polymer is derived from an undermentioned monomer (iv) present in an amount of 1 to 99% by weight and an undermentioned monomer (i) present in an amount of 1 to 99% by weight such that the total of (iv) and (i) is 100% by weight and the crosslinking agent has a functional group capable of reacting with a functional group selected from the group consisting of a carboxyl group and a sulfonate group contained in the water-soluble polymer, and the crosslinking agent and water-soluble polymer are used in an amount of 0.001 to 1.0 in the mole ratio between a functional group of the agent and a functional group of the polymer

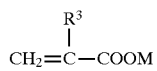

wherein M is at least one member selected from the group consisting of a hydrogen atom, a monovalent, divalent or trivalent metal group, an ammonium group, and an organic amine group, $R^3$ denotes H or $CH_3$

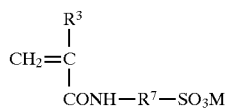

wherein M and $R^3$ are defined above; and $R^7$ denotes an alkylene group of carbon number of 1 to 5.

28. A method of dispersing a hydraulic material as claimed in claim 26 wherein said method for producing a cement additive comprises obtaining a crosslinked polymer by reacting a water-soluble polymer with a crosslinking agent, wherein the water-soluble polymer is derived from an undermentioned monomer (iv) present in an amount of 1 to 98 % by weight, an undermentioned monomer (i) selected from the present in an amount of 1 to 98% by weight, and an undermentioned monomer (xiv) in a series of (poly) alkyleneglycol mono(meth)acrylic acid esters present in an amount of 1 to 70% by weight, such that the total mount of (iv), (i), and (xiv) is 100% by weight, and the crosslinking agent has a functional group capable of reacting with a functional group selected from the group consisting of a carboxyl group, a sulfonate group and a hydroxyl group contained in the water-soluble polymer, and the crosslinking agent and water-soluble polymer are present in an amount of 0.001 to 1.0 in the mole ratio between a functional group of the agent and a functional group of the polymer

wherein M is at least one member selected from the group consisting of a hydrogen atom, a monovalent, divalent or trivalent metal groups, an ammonium group and an organic amine group; $R^3$ denotes H or $CH_3$

wherein M and $R^3$ are defined above; $R^7$ denotes an alkylene group of carbon number of 1 to 5

wherein u is an integral number of 1 to 100; $R^3$ is defined above; $R^5$ denotes an alkylene group of carbon number 2 to 4; $R^{10}$ denotes H or an alkyl group of carbon number 1 to 5 with the proviso that, when u is at least 2, a plurality of $R^5O$ may be the same or different and, when a plurality of $R^5O$ are different from one another, their arrangement may be regular or irregular.

29. A method of dispersing a hydraulic material as claimed in claim 26 wherein said method for producing a cement additive comprises obtaining a crosslinked polymer by reacting a water-soluble polymer and a crosslinking agent, wherein the water-soluble polymer is derived from an undermentioned monomer (iii) present in an amount of 1 to 99% by weight and an undermentioned monomer (i) present in an amount of 1 to 99% by weight such that the total amount of (iii) and (i) is 100% by weight and the crosslinking agent has a functional group capable of reacting with a functional group selected from the group consisting of a carboxyl group and a sulfonate group being contained in the water-soluble polymer, and the crosslinking agent and water-soluble polymer are present in an amount of 0.001 to 1.0 in the mole ratio between a functional group of the agent and a functional group of the polymer

wherein M is at least one member selected from the group consisting of a hydrogen atom, a monovalent, divalent or trivalent metal group, or an ammonium group or an organic amine group; $R^3$ denotes H or $CH_3$

wherein m is 0 or an integral number of 1 to 50; M and $R^3$ are defined above; $R^5$ and $R^6$ independently denote an alkylene group of carbon number 2 to 4 with the proviso that when m is two or more, a plurality of $R^5O$ may be the same or different and, when a plurality of $R^5O$ are different from one another, their arrangement may be regular or irregular.

30. A method of dispersing a hydraulic material as claimed in claim 26 wherein said method for producing a cement additive comprises obtaining a crosslinked polymer by reacting a water-soluble polymer with a crosslinking agent, wherein the water-soluble polymer is derived from an undermentioned monomer (iii) present in an amount of 1 to 98% by weight, an undermentioned monomer (i) present in an amount of 1 to 98% by weight, and an undermentioned monomer (xiv) in a series of (poly)alkyleneglycol mono (meth)acrylic acid esters present in an amount of 1 to 70% by weight such that the total amount of (iii), (i) and (xiv) is 100% by weight, and the crosslinking agent has a functional group capable of reacting with a functional group selected from the group consisting of a carboxyl group, a sulfonate group and a hydroxyl group being contained in the water-soluble polymer, and the crosslinking agent and water-soluble polymer are present in an amount of 0.001 to 1.0 in the mole ratio between a functional group of the agent and a functional group of the polymer

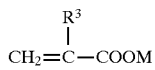 (i)

wherein M is at least one member selected from the group consisting of a hydrogen atom, a monovalent, divalent or trivalent metal group, an ammonium group, and an organic amine group; $R^3$ denotes H or $CH_3$

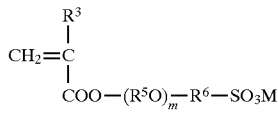 (iii)

wherein m is 0 or an integral number of 1 to 50; M and $R^3$ are defined above; $R^5$ and $R^6$ independently denote an alkylene group of carbon number 2 to 4, with the proviso that when m is two or more, a plurality of $R^5O$ may be the same or different, and, when a plurality of $R^5O$ are different from one another, their arrangement may be regular or irregular

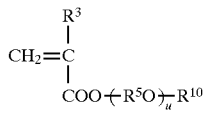 (xiv)

wherein u is an integral number of 1 to 100; $R^3$ and $R^5$ are defined above; $R^{10}$ denotes H or an alkyl group of carbon number 1 to 5 with the proviso that when u is at least 2, a plurality of $R^5O$ may be the same or different and, when a plurality of $R^5O$ are different from one another, their arrangement may be regular or irregular.

31. A method of dispersing a hydraulic material, comprising mixing a cement additive, water and a hydraulic material, wherein said cement additive is obtained from a method for producing a cement additive which comprises obtaining a crosslinked polymer by a polymerization reaction of a monomer (e), which has at least two polymerizable double bonds and has as a structural unit at least one divalent group having the below-described formula (I) between the double bonds, with a monomer (f), which has one polymerizable double bond capable of copolymerizing with the double bond in (e) and is able to form a main chain structure capable of leading to a water-soluble polymer of a weight average molecular weight of 500 to 100,000

 (I)

wherein $R^1$ and $R^2$ independently are selected from the group consisting of:

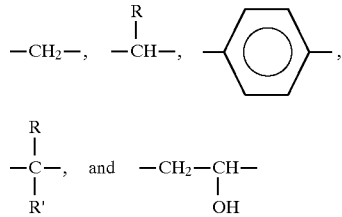

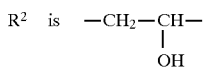

with the proviso that $R^1$ is not required if $R^2$ is $—CH_2—CH—$
                   $|$
                   $OH$ and wherein R and R' independently denote an alkyl group of carbon number of 1 to 5, wherein the water-soluble polymer comprises at least one member selected from the group consisting of

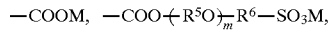

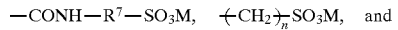

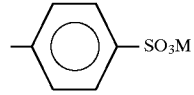

wherein m is 0 or an integral number of 1 to 50;

n is 0 or 1;

M is at least one member selected from the group consisting of a hydrogen atom, a monovalent, divalent or trivalent metal group, an ammonium group and an organic amine group;

$R^5$ and $R^6$ independently denote an alkylene group of carbon number 2 to 4;

$R^7$ denotes an alkylene group of carbon number 1 to 5;

with the proviso that when m is at least 2, a plurality of $R^5O$ may be the same or different and, when a plurality of $R^5O$ are different from one another, their arrangement may be regular or irregular;

and wherein said crosslinked polymer is capable of forming a water-soluble polymer by cleavage of the divalent group in an alkaline medium.

32. A method of dispersing a hydraulic material as claimed in claim 31, wherein said method for producing a cement additive comprises obtaining a crosslinked polymer by copolymerizing said monomer (e), a below-described monomer (iv), a monomer described as (i) in a ratio of 0.1 to 50% by weight of the monomer (e), 1 to 98.9% by weight of the monomer (iv), and 1 to 98.9% by weight of the monomer (i) such that the total of (e), (iv), and (i) is 100% by weight

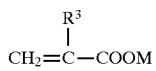 (i)

wherein M is at least one member selected from the group consisting of a hydrogen atom, a monovalent, divalent or trivalent metal group, an ammonium group and an organic amine group; $R^3$ denotes H or $CH_3$

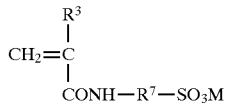 (iv)

wherein M and $R^3$ are as defined above; and $R^7$ denotes an alkylene group of carbon number of 1 to 5.

33. A method of dispersing a hydraulic material as claimed in claim 31, wherein said method for producing a cement additive comprises obtaining a crosslinked polymer by copolymerizing said monomer (e), a monomer (xiv) in a series of (poly)alkyleneglycol mono(meth)acrylates, a monomer (iv), and a monomer (i) in a ratio of 0.1 to 50% by weight of the monomer (e), 1 to 70% by weight of the monomer (xiv) in the series of (poly)alkyleneglycol (meth) acrylates, 1 to 97.9% by weight of the monomer (iv), and 1 to 97.9% by weight of the monomer (i) such that the total amount of (e), (xiv), (iv) and (i) is 100% by weight

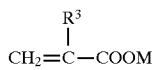 (i)

wherein M is at least one member selected from the group consisting of a hydrogen atom, a monovalent, divalent or trivalent metal group, an ammonium group and an organic amine group; $R^3$ denotes H or $CH_3$

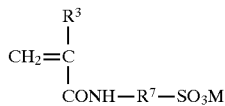 (iv)

wherein M and $R^3$ are defined above; $R^7$ denotes an alkylene group of carbon number of 1 to 5

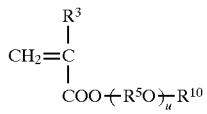 (xiv)

wherein u is an integral number of 1 to 100; $R^3$ is defined above; $R^5$ denotes an alkylene group of carbon number 2 to 4; $R^{10}$ denotes H or an alkyl group of carbon number 1 to 5 with the proviso that when u is at least 2, a plurality of $R^5O$ may be the same or different and, when a plurality of $R^5O$ are different from one another, their arrangement may be regular or irregular.

34. A method of dispersing a hydraulic material as claimed in claim 31 wherein said method for producing a cement additive comprises obtaining a crosslinked polymer by copolymerizing said monomer (e), a monomer (iii), and a monomer (i) in a ratio of 0.1 to 50% by weight of the monomer (e), 1 to 98.9% by weight of the monomer (iii), and 1 to 98.9% by weight of the monomer [in a series of (meth)acrylic acids] (i), such that the total of (e), (iii) and (i) is 100% by weight

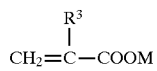 (i)

wherein M is at least one member selected from the group consisting of a hydrogen atom, a monovalent, divalent or trivalent metal group, an ammonium group, and an organic amine group; $R^3$ denotes H or $CH_3$

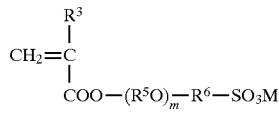 (iii)

wherein m is 0 or an integral number of 1 to 50; M and $R^3$ are defined above; $R^5$ and $R^6$ independently denote an alkylene group of carbon number 2 to 4, with the proviso that when m is at least two, a plurality of $R^5O$ may be the same or different and, when a plurality of $R^5O$ are different from one another, their arrangement may be regular or irregular.

35. A method of dispersing a hydraulic material as claimed in claim 31, wherein said method for producing a cement additive comprises obtaining a crosslinked polymer by copolymerizing said monomer (e), a monomer (xiv) in a series of (poly)alkyleneglycol mono(meth)acrylates, a monomer (iii), and a monomer (i) in a ratio of 0.1 to 50% by weight of the monomer (e), 1 to 70% by weight of the monomer (xiv) in a series of (poly)alkyleneglycol mono (meth)acrylates, 1 to 97.9% by weight of the monomer (iii), and 1 to 97.9% by weight of the monomer (i), such that the total amount of (e), (xiv), (iii) and (i) is 100% by weight

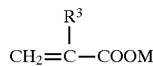 (i)

wherein M is at least one member selected from the group consisting of a hydrogen atom, a monovalent, divalent or trivalent metal group, an ammonium group, and an organic amine group; $R^3$ denotes H or $CH_3$

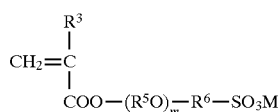 (iii)

wherein m is 0 or an integral number of 1 to 50; M and $R^3$ are defined above; $R^5$ and $R^6$ independently denote an alkylene group of carbon number 2 to 4, with the proviso that when m is two or more, a plurality of $R^5O$ may be the same or different and, when a plurality of $R^5O$ are different from one another, their arrangement may be regular or irregular

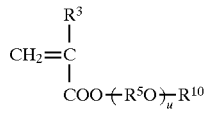 (xiv)

wherein u is an integral number of 1 to 100; $R^3$ and $R^5$ are defined above; $R^{10}$ denotes H or an alkyl group of carbon number 1 to 5, with the proviso that when u is at least 2, a plurality of $R^5O$ may be the same or different and, when a plurality of $R^5O$ are different from one another, their arrangement may be regular or irregular.

36. A method of dispersing a hydraulic material as claimed in claim 31, in which a monomer (e) is at least one member selected from the group consisting of:
a product from a reaction of at least one compound selected from monoester diols and polyester polyols with a polymerizable monomer having a functional group capable of reacting with a hydroxy group in said diols and polyols;

a product from a reaction of at least one compound selected from monoester dicarboxylic acids and polyester polycarboxylic acids with a polymerizable monomer having a functional group capable of reacting with a carboxyl group in said acids;

a product from a reaction of at least one compound selected from polyols and polyepoxy compounds with a polymerizable monomer having a carboxyl group separated from a polymerizable double bond by at least one carbon atom;

a product from a reaction of at least one compound selected from polycarboxylic acids with a polymerizable monomer having a hydroxyl group or an epoxy group separated from a polymerizable double bond by at least one carbon atom; and a product from a reaction of at least one compound selected from monoester polyepoxy compounds and polyester polyepoxy compound having a functional group capable of reacting with the epoxy group in said polyoxy compound.

37. A method of dispersing a hydraulic material as claimed in claim 19, wherein said mixing step comprises dissolving or dispersing said cement additive into water and mixing said hydraulic material with said water in which said cement additive is dissolved or dispersed.

38. A method for dispersing a hydraulic material as claimed in claim 19, wherein said mixing step comprises dispersing said hydraulic material into water and dissolving or dispersing said cement additive into said water in which said hydraulic material is dispersed.

* * * * *